United States Patent [19]

Hruby et al.

[11] 4,125,868

[45] Nov. 14, 1978

[54] TYPESETTING TERMINAL APPARATUS HAVING SEARCHING AND MERGING FEATURES

[75] Inventors: John F. Hruby, Woodinville; Rex McCleary; Jerome M. O'Hogan, both of Redmond; Nathan H. Searle, Woodinville, all of Wash.

[73] Assignee: Automix Keyboards, Inc., Redmond, Wash.

[21] Appl. No.: 626,075

[22] Filed: Oct. 28, 1975

[51] Int. Cl.[2] .......... G06F 7/36; G06F 7/28; G06F 15/40; G11B 27/02

[52] U.S. Cl. .......... 364/900

[58] Field of Search .......... 340/172.5, 324 A, 324 AD; 354/7; 95/4.5 R, 4.5 J; 197/19, 20; 364/900 MS File, 200 MS File; 199/18

[56] References Cited

U.S. PATENT DOCUMENTS

| | | | |
|---|---|---|---|
| Re. 27,974 | 4/1974 | Kolb et al. | 95/4.5 R |
| 3,289,176 | 11/1966 | Garth, Jr. et al. | 364/900 |
| 3,307,154 | 2/1967 | Garth, Jr. et al. | 364/900 |
| 3,328,764 | 6/1967 | Sorensen et al. | 340/172.5 |
| 3,573,735 | 4/1971 | Clark | 340/172.5 |
| 3,573,735 | 4/1971 | Clark | 364/900 |
| 3,579,196 | 5/1971 | Gregg, Jr. et al. | 364/900 |
| 3,618,032 | 11/1971 | Goldsberry et al. | 364/900 |
| 3,626,824 | 12/1971 | Kolb | 95/4.5 R |
| 3,648,271 | 3/1972 | McConnell et al. | 340/172.5 X |
| 3,668,685 | 6/1972 | Horvath | 95/4.5 R X |
| 3,676,856 | 7/1972 | Manly | 364/900 |
| 3,685,019 | 8/1972 | Conroy et al. | 364/900 |
| 3,701,972 | 10/1972 | Berkeley et al. | 364/200 |
| 3,706,075 | 12/1972 | Fredrickson et al. | 364/900 |
| 3,774,156 | 11/1973 | Marsalka et al. | 364/200 |
| 3,781,816 | 12/1973 | Coleman et al. | 340/172.5 |
| 3,810,107 | 5/1974 | Goldman et al. | 364/200 |
| 3,815,104 | 6/1974 | Goldman et al. | 364/200 |
| 3,819,854 | 6/1974 | Kolb | 95/4.5 R X |
| 3,828,319 | 8/1974 | Owen et al. | 364/200 |
| 3,872,460 | 3/1975 | Fredrickson et al. | 340/324 AD |
| 3,913,721 | 10/1975 | Koplow et al. | 340/172.5 X |
| 3,968,868 | 7/1976 | Greek, Jr. et al. | 197/19 |
| 3,980,994 | 9/1976 | Ying et al. | 364/200 |
| 4,028,681 | 6/1977 | Vittorelli | 364/900 |
| 4,051,459 | 9/1977 | Steranko et al. | 364/900 |

FOREIGN PATENT DOCUMENTS 1,340,189 12/1973 United Kingdom.

*Primary Examiner*—Melvin B. Chapnick
*Attorney, Agent, or Firm*—Klarquist, Sparkman, Campbell, Leigh, Hall & Whinston

[57] ABSTRACT

A typesetting terminal adapted for operating a photo typesetter includes a data processor with a plurality of peripheral devices coupled thereto, such as a keyboard, cathode ray tube display, cursor control and a plurality of tape transports. Information from the keyboard and selected tape transports is read into the data processor memory for access and display by the cathode ray tube and outputting to a further tape device. Desired information can be searched in the various input tapes for display, editing and combination with information derived from another input.

16 Claims, 42 Drawing Figures

FIG. I

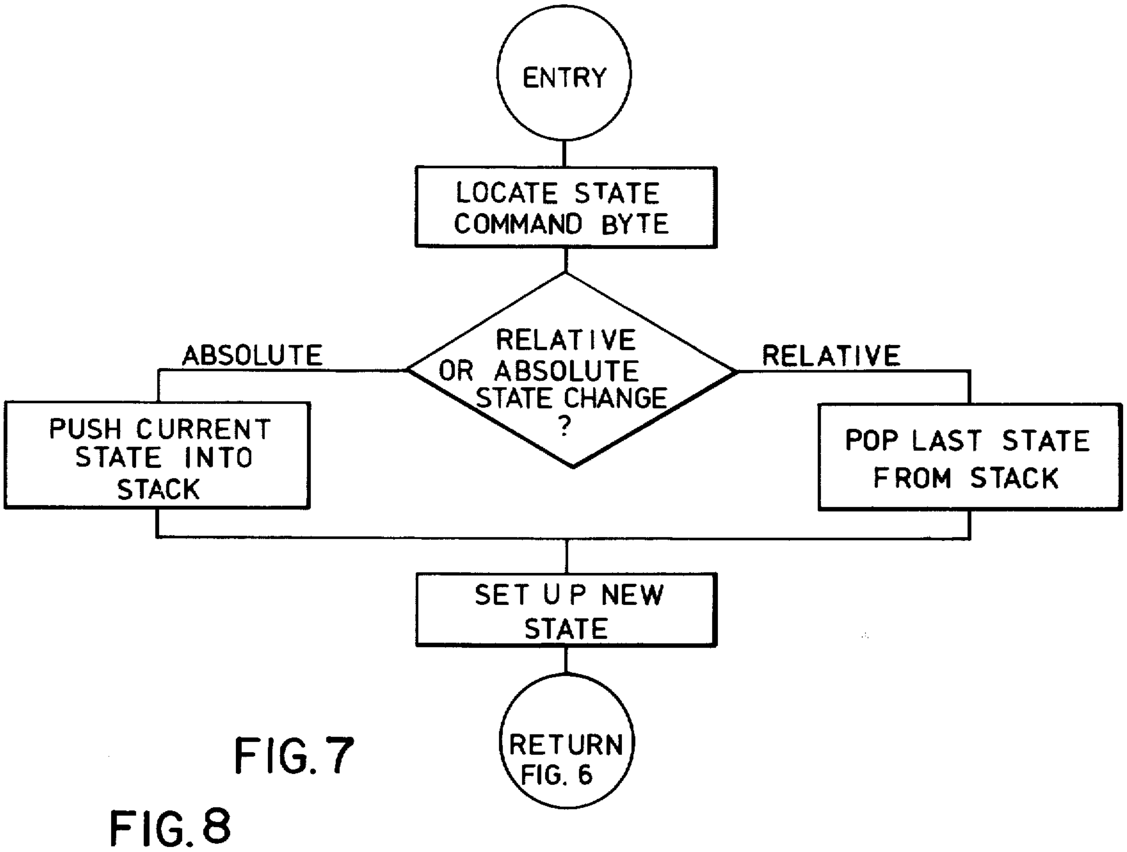
FIG. 7
FIG. 8
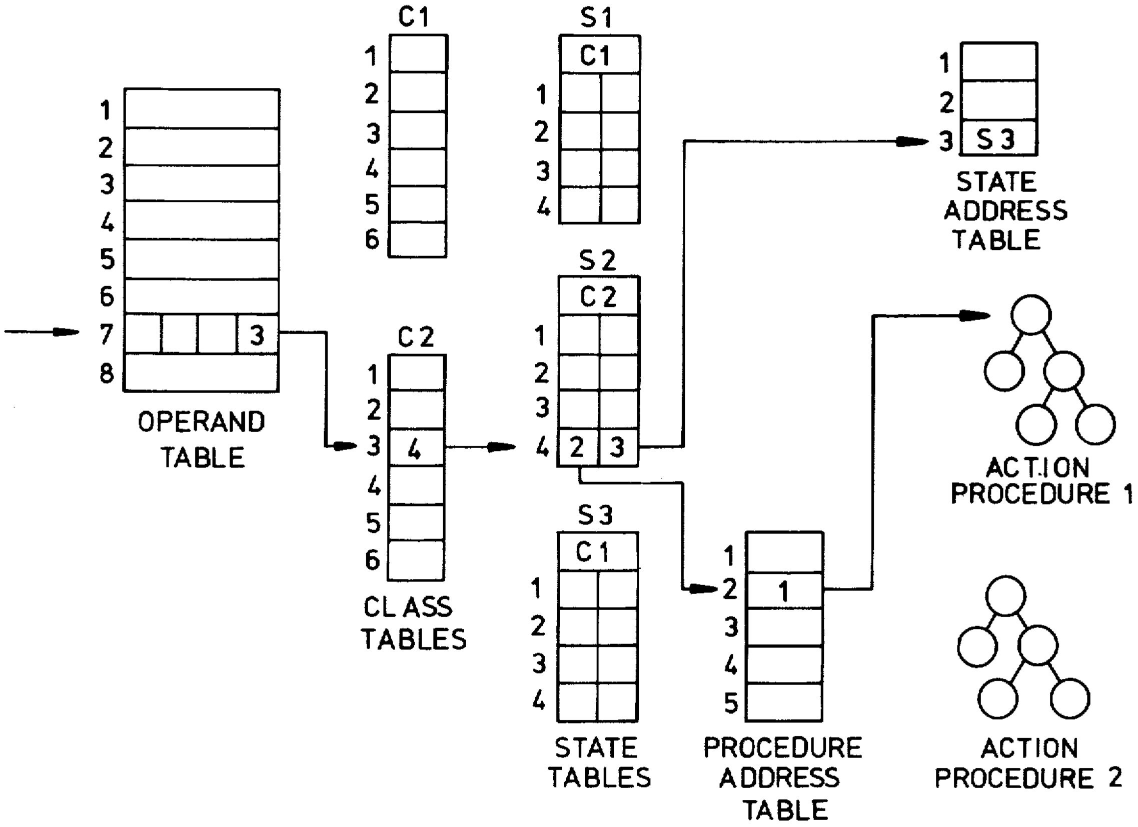

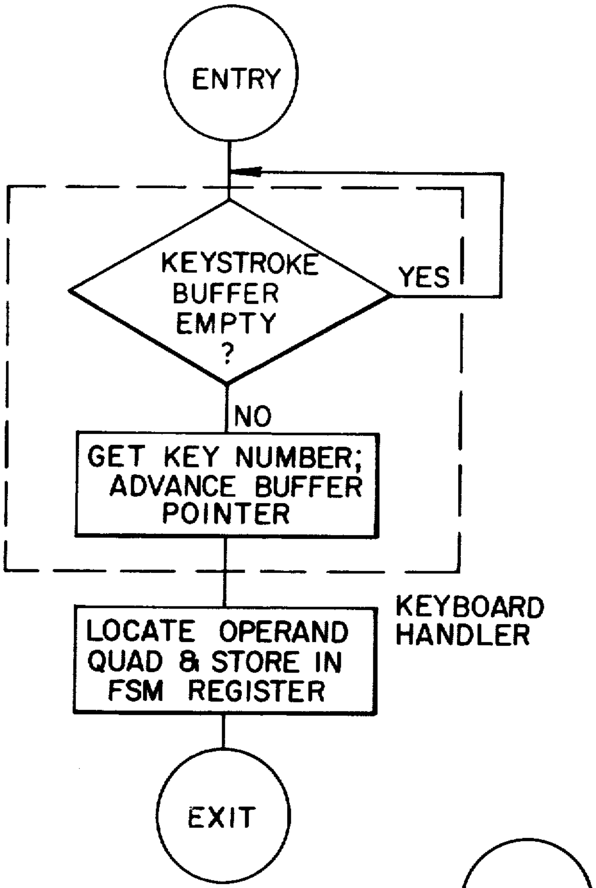
FIG. 10
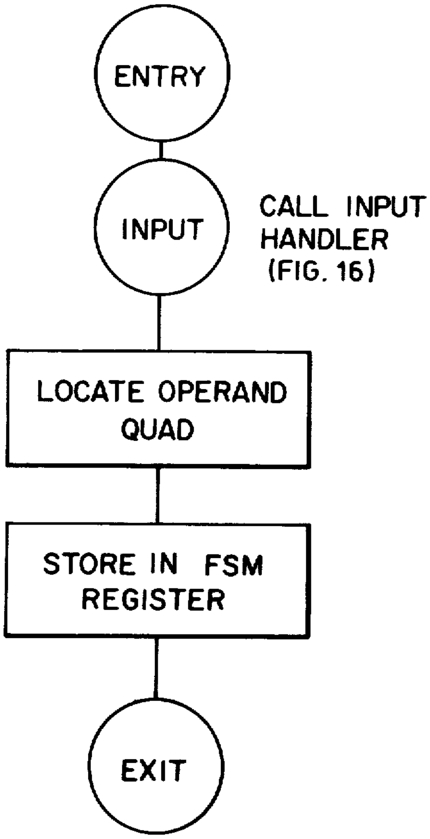
FIG. 11
FIG. 12
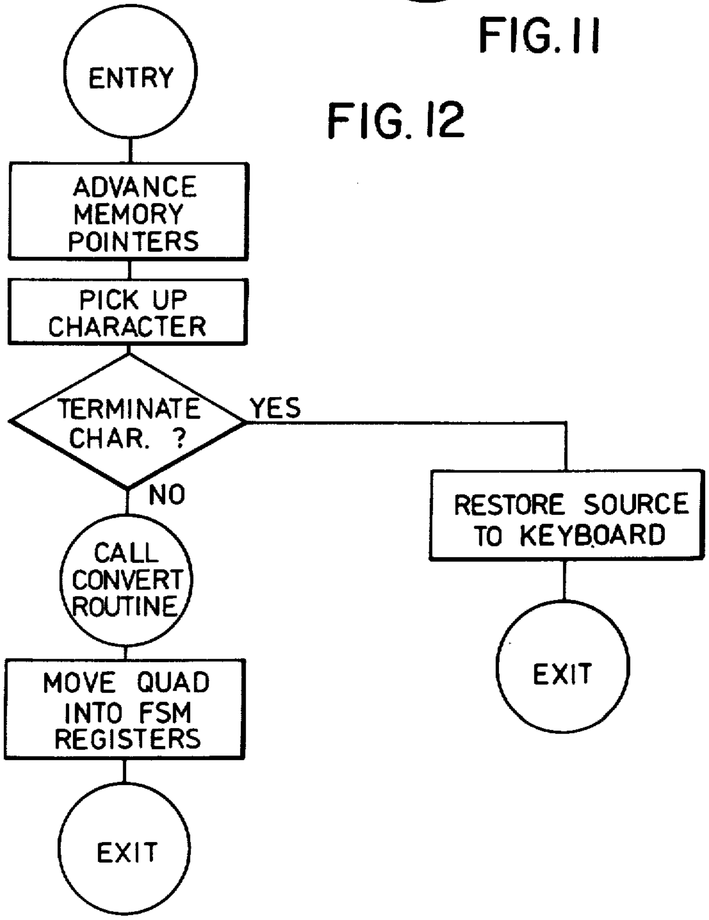

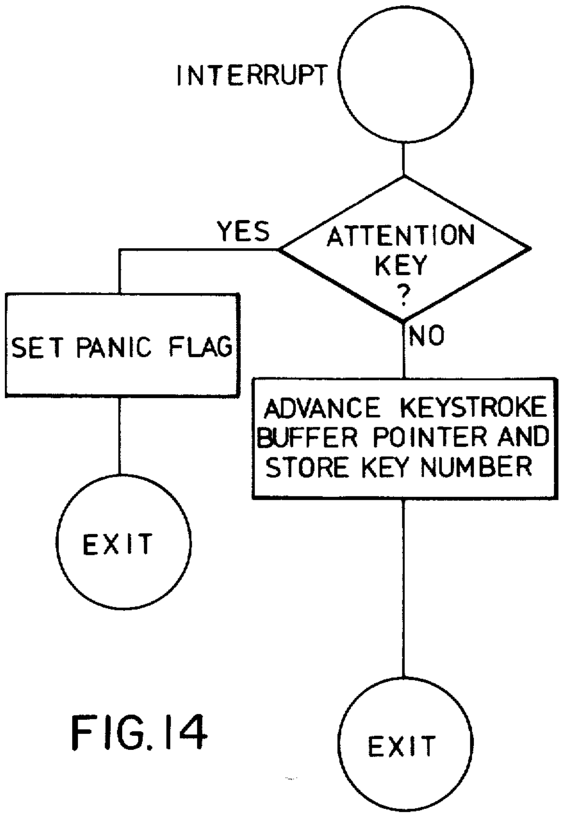
FIG. 14
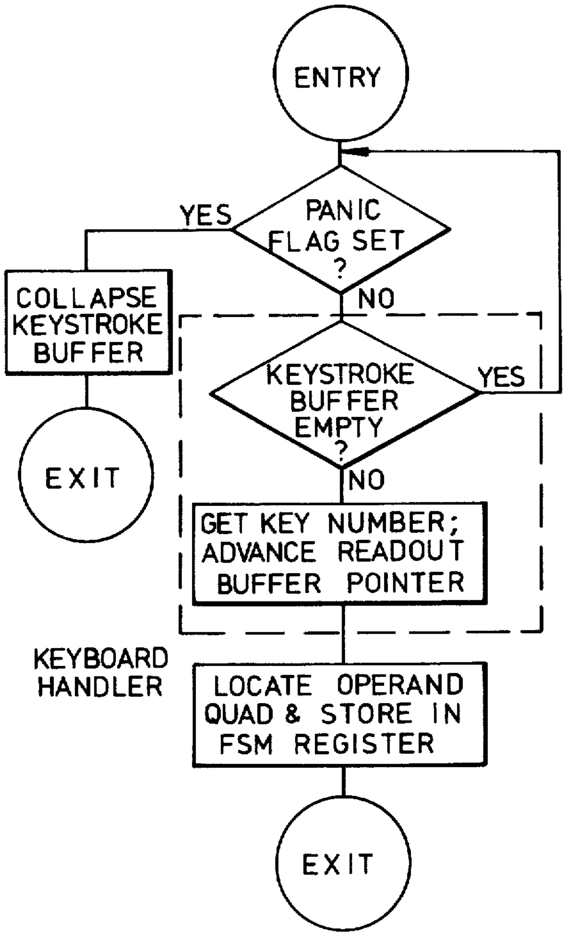
FIG. 15
FIG. 16
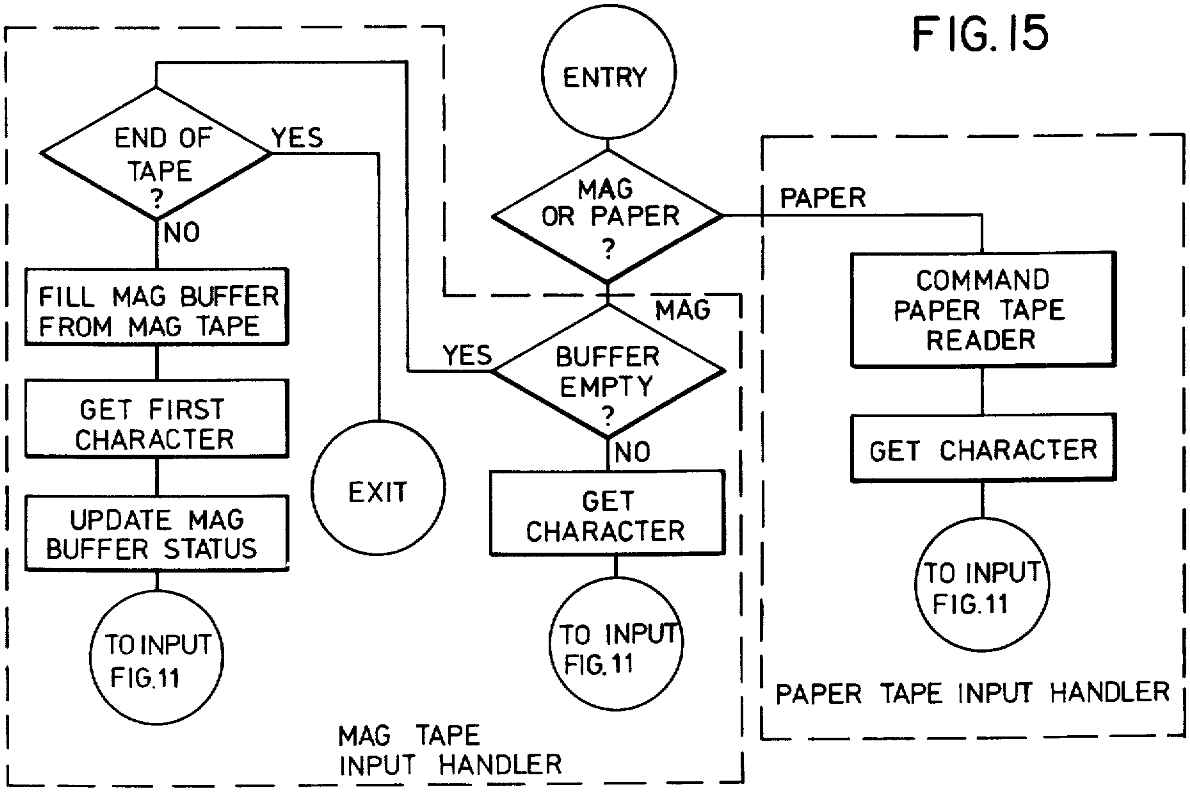

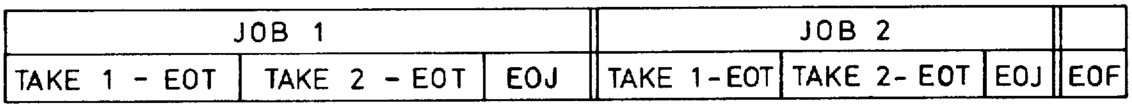
FIG.18
FIG.20
FIG.19
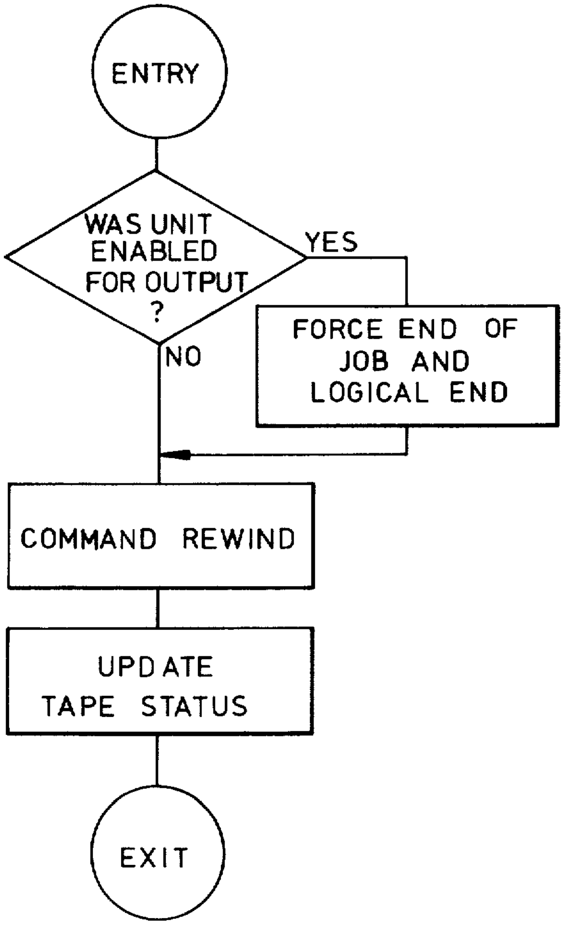
FIG.21
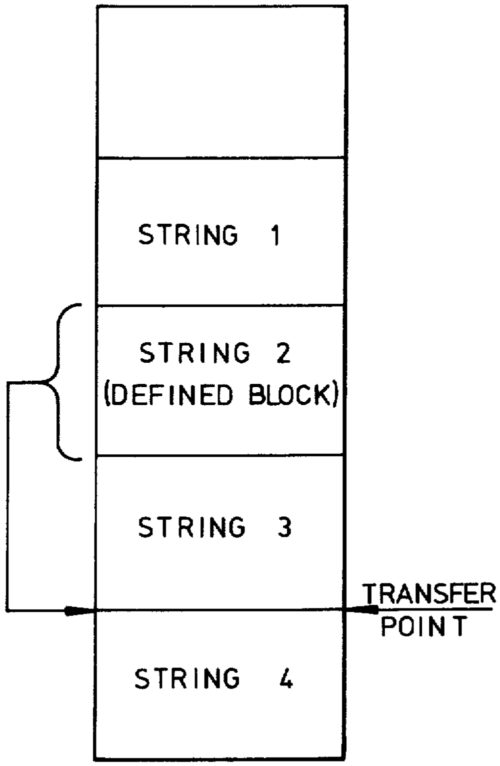

SEARCH ARGUMENT

| |
|---|
| A |
| B |
| C |
| D |

STRING 1

| | |
|---|---|
| 1 | X |
| 2 | A |
| 3 | X |
| 4 | X |
| 5 | B |
| 6 | X |
| 7 | C |
| 8 | X |
| 9 | X |
| 10 | X |
| 11 | D |
| 12 | X |

STRING 2

| | |
|---|---|
| 1 | X |
| 2 | A |
| 3 | X |
| 4 | X |
| 5 | B |
| 6 | X |
| 7 | C |
| 8 | A |
| 9 | B |
| 10 | C |
| 11 | D |
| 12 | X |

JOB/TAKE SEARCH

TYPESETTING TERMINAL APPARATUS HAVING SEARCHING AND MERGING FEATURES

BACKGROUND OF THE INVENTION

This invention relates to a typesetting terminal apparatus, and more particularly to such an apparatus having improved searching and merging features.

Stand alone typesetting keyboards conventionally comprise a typewriter keyboard operating a paper tape punch which generates a paper tape used as an input for a separate typesetting apparatus, such as a photo typesetter. The keyboard may be provided with a hard copy typewriter or a cathode ray tube display and memory for viewing the information being composed. Such a keyboard apparatus may also be arranged to receive information from a paper tape or the like for correction or editing of the information on the keyboard. Systems of the foregoing type are very useful in composing and editing information, but lack speed and flexibility where large amounts of copy are involved. It may thus be desired to make extensive corrections in taped copy, or to make extensive insertions into taped copy wherein such information is located in another file. With the equipment available heretofore, such corrections, insertions or merging of information would be made by manually keyboarding the additional information or possibly by physically combining sections of paper tape.

SUMMARY OF THE INVENTION

According to the present invention, a typesetting terminal is provided with the ability for extensive file management and combination of files through the utilization of plural tape transport input devices from which designated information can be retrieved at will for viewing, editing merging and outputting in a common stream, e.g. to a common output device or tape, in final form. In the described embodiment, information is located on plural magnetic tapes according to groups called jobs and takes wherein the job is a major grouping and a take is a sub-grouping. For example, the chapters of a book may be identified as jobs and the paragraphs as takes. In the case of classified ads, classifications may be jobs and each ad a take. The operator may identify a particular job and take for viewing, editing and combining or merging with the main story or copy derived from another tape, and may quickly access the desired job and take without visually inspecting the extensive file of stored material. If the operator cannot identify the desired insert by job and take number, he may initiate a code search based upon selected characters recalled from the desired material. In this manner, vast storage capacity is provided to the system operator, but one which is rapidly usable for deriving the maximum and most efficient utilization of the apparatus and the operator's time.

Briefly, in accordance with an embodiment of the present invention, a typesetting terminal includes a keyboard for entering alpha numeric characters, a display means including cathode ray tube having character generator means and the cursor register for locating a cursor through which selected alpha numeric characters may be identified on the screen. A plurality of tape transport input devices contain tapes each comprising plural records, e.g., jobs and takes, adapted for entrance into the system in combination with other information such as may be entered thereinto from the keyboard or another tape. The system includes a data processor connected to the keyboard, the display means and input devices, the data processor having memory means for receiving and storing information from the keyboard and input devices, and for processing information for presentation by the display means. The operator can identify a particular record contained in a selected tape, and cause the searching of such tape for locating the record, after which at least a portion of the desired record is inserted into the processor memory for display on the cathode ray tube and selective coupling to an output device in combination with information theretofor inserted into processor memory, e.g., from a separate tape comprising the main stream of copy to be outputted.

It is accordingly an object of the present invention to provide an improved typesetting terminal system.

It is another object of the present invention to provide an improved typesetting terminal system having file management and merging capabilities wherein plural records are rapidly identifiable and may be combined or edited into a common output stream.

It is a further object to provide an improved typesetting terminal system having a large memory capacity.

It is a further object of the present invention to provide an improved typesetting terminal system wherein comparatively large blocks of information can be accessed as desired from a tape memory system, either on the numerical identification basis or on the basis of content and wherein the selected information can be manipulated and edited at will for combination in a common record.

It is a further object of the present invention, to provide an improved typesetting terminal system which is capable of handling large quantities of copy and is characterized by operator and equipment efficiency.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is an over-all block diagram of a typesetting terminal system according to the present invention, FIG. 2 is a block and schematic diagram of a portion of a cassette subsystem according to the present invention, particularly a processor portion thereof, FIG. 3 is a block and schematic diagram of a further portion of a cassette subsystem according to the present invention particularly illustrating peripheral devices, FIG. 4 is a flow diagram of command processing software logic employed with the typesetting terminal of FIG. 1, FIGS. 5, 6 and 7 are flow diagrams of software routines further implementing the process shown in FIG. 4, FIGS. 8 and 9 are diagrams illustrating steps in command processing sequences of FIG. 4, FIGS. 10 and 11 are flow diagrams of software routines which translate input character data into a form utilized by the command executive of FIG. 4, FIG. 12 is a flow diagram of a software routine which moves stored character data from a main memory storage area to a register area of main memory, FIG. 13 is a flow diagram of a software routine which moves stored character data from the scroll memory area in main memory to a register area of main memory, FIG. 14 is a flow diagram of a software routine which allows the system operator to interrupt processing by striking a key on the keyboard, FIG. 15 is a flow diagram of programming logic which allows the operator to terminate processing during any routine, FIG. 16 is a flow diagram of a software subroutine which obtains character data from a paper tape reader or cassette subsystem, FIG. 17 is a flow diagram of a software subroutine which transmits character data to a paper tape perforator or cassette subsystem, FIG. 18 is a diagram of a logical format for data stored on magnetic tapes, FIG. 19 is a flow diagram of a software routine which commands the cassette subsystem to perform a rewind, FIG. 20 is a diagram of a physical format for data stored on magnetic tapes, FIG. 21 is a diagram of a block transfer operation, FIG. 22 is a diagram of successful and unsuccessful code searches, FIG. 23 is a flow diagram of a software routine for searching strings of character codes to find a defined word or phrase, FIG. 24 is a flow diagram of a software routine which commands the cassette subsystem to move the magnetic tape to a defined position, FIG. 25 is a flow diagram of a software routine which establishes the position in the scroll memory where input data is to be inserted, FIG. 26 is a flow diagram of a software routine which checks operator keystroke commands for proper syntax and commands the initialization of hardware devices assigned for input or output, FIG. 27 is a flow diagram of a software routine which controls the sequence of input and output of data from and to peripheral devices, FIG. 28 is a diagram of command processing system sources and states and of state action procedures, FIG. 29*a* to FIG. 29*h* are diagrams of EXECU action procedures shown in FIG. 28 and of keystroke action procedures to which EXECU procedures are linked, FIG. 30 is a flow diagram of a cassette subsystem routine which continuously tests for commands from the main system, initializes cassette operations, and calls cassette subsystem subroutines, FIGS. 31 and 32 are flow diagrams of cassette sybsystem subroutines which control movement, positioning, writing on and reading from magnetic tapes, FIG. 33 is a flow diagram of a cassette subsystem subroutine which directs rewind and positioning of magnetic tape units, FIG. 34 is a flow diagram of cassette subsystem subroutines which direct operation of a magnetic tape unit during tape positioning operations, and FIG. 35 is a flow diagram of a cassette subsystem subroutine which posts the status of the cassette subsystem after each commanded operation is performed.

DETAILED DESCRIPTION

General System

Figure 1:
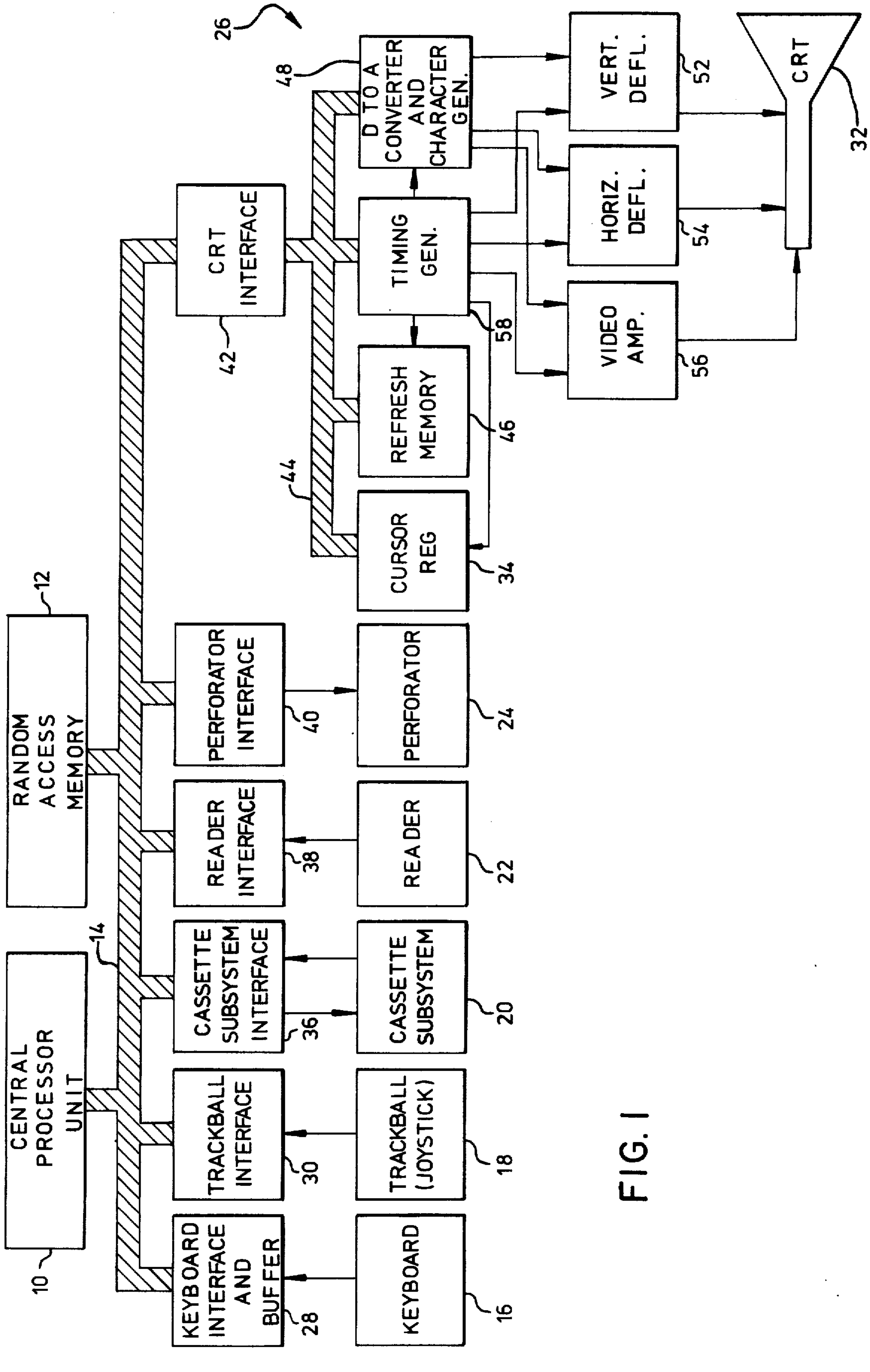

Referring to FIG. 1, the terminal apparatus according to the present invention includes a central processor unit 10 employed in conjunction with random access memory 12, forming a digital computer configuration. In the particular embodiment described, the unit 10 comprises an Intel Model 8008 eight bit parallel central processor unit of integrated circuit form manufactured by Intel Corp., Santa Clara, California. The random access memory is suitably of the semiconductor type and may also be provided with a read only memory (not shown) for initial loading purposes.

The terminal according to the present invention further includes a plurality of peripheral input/output units coupled in parallel to central processor unit 10 and memory 12 via a parallel bus 14 comprising a plurality of data and address lines interconnecting the various peripheral units. Each peripheral unit is connected to the bus via an interface which provides buffering and/or coupling to and from the parallel digital bus coding either from an analog input and/or output, or from a serial or parallel digital source. The various peripheral units include the keyboard 16, a track ball or joy stick 18, a magnetic tape cassette subsystem 20, a paper tape reader 22, a paper tape perforator 24, and cathode ray tube system generally indicated at 26. The keyboard comprises a conventional typewriter keyboard providing means for inputting alphanumeric characters and/or other codings, as well as a control keyboard for initiating various control and editing functions as hereinafter more fully indicated. The keyboard interface and buffer 28 translates key strokes or series of key strokes into digital words which may be addressed on bus 14 for bringing about a desired output and/or visual presentation via the cathode ray tube system 26. The track ball or joy stick 18 delivers two dimensional address information for the presentation of the marking cursor upon the screen of cathode ray tube 32 in system 26. The location of the coordinate position for such cursor is transformed from analog form to digital form by track ball interface 30 and information as to the cursor position is subsequently stored in cursor register 34 in system 26 for presentation on the cathode ray tube screen. The location of the cursor mark on the face of the cathode ray tube is also available to the central processor unit for identification of the particular character adjacent to the cursor also viewed on the screen of the cathode ray tube. Joy stick systems for identifying a character with a cursor are well known.

Cassette subsystem 20 as hereinafter more fully described provides storage of information and access to and from information as recorded on a plurality of magnetic tapes, e.g. magnetic tape cassettes which are easily transportable from place to place and which may be inserted in or withdrawn from the system. In the specific embodiment, three magnetic tape cassette transports are included, e.g. one cassette from which information is being read to the screen of cathode ray tube 32, a second cassette to which information is being outputted and a third cassette from which insertions are made into the stream of information viewed on the cathode ray tube screen and outputted to the second cassette. Various combinations of inputting, outputting and merging of information via tape transport systems are possible in accordance with the present invention.

The cassette subsystem employs its own processor circuitry as hereinafter more fully described in connection with FIGS. 2 and 3, and this system is buffered into the main bus 14 by way of cassette subsystem interface 36. The cassette subsystem interface includes buffer register means and status register means through which the central processor unit 10 and memory 12 communicate with cassette subsystem 20.

In addition to magnetic tape transport means for the inputting of and outputting of information, the system according to the present invention also preferably includes the paper tape reader 22 and paper tape perforator 24, both of standard construction, which communicate with main bus 14 via reader interface 38 and perforator interface 40 respectively. Under the control of central processor unit 10, as programmed, nearly any combination of magnetic tape or paper tape input and output can be selected. The reader interface 38 stores information read in parallel form by reader 22 for application in para'lel form to bus 14, and perforator interface 40 stores the information received in parallel form for parallel operation of perforator 24. The cathode ray tube system 26 communicates with main bus 14 by way of CRT interface 42. Information for display on the screen of cathode ray tube 42 is received in parallel a word at a time from random access memory 12 under the control of the central processor unit, and such information is stored via sub-bus 44 to refresh memory 46.

The refresh memory 46 cyclically applies digital information to D to A converter and character generator 48 by way of sub-bus 44. D to A converter and character generator 48 converts the digital information to analog values for generating cathode ray tube deflection and intensity signals in vertical deflection circuit 52, horizontal deflection circuit 54 and video amplifier 56. A standard character generator circuit is suitably included in circuit 48 for bringing about the generation of the correct deflection and intensity signals to portray alphanumeric characters on the cathode ray tube screen in the usual manner. As hereinbefore mentioned, position of a cursor mark is stored in cursor register 34 which periodically supplies coordinate information relative to cursor position to the D to A converter and character generator whereby such cursor is displayed at its proper location in the course of the deflection of the electron beam of cathode ray tube 32. Timing generator 58 synchronizes a general raster scan by the cathode ray tube, and at the same time coordinates the operation of refresh memory 46, D to A converter and character generator 48, cursor register 34 and video amplifier 56 so that desired information is cyclically available and displayed on the screen of cathode ray tube 32. The cyclic representation of information provides the viewer with the impression of a continuous display of the desired information.

As hereinbefore indicated, the information to be displayed is stored in random access memory 12 and is coupled via CRT interface 42 to refresh memory 46. A section of random access memory 12, termed a "scroll memory," can be addressed and new information stored for changing the display which will be viewed on the cathode ray tube. The scroll memory has greater storage capacity than the CRT's refresh memory and the scroll memory includes a buffer with the latter acting as a kind of viewing "window" into the information stored in the scroll memory. In response to commands scroll up and scroll down, changing portions of information from the scroll memory are applied to the refresh memory, giving the impression of moving a viewing "window" along the scroll, or winding the scroll relative to such window. The selection of the information viewed is controlled by timing an active period during which the CRT interface 42 couples information from the scroll memory into the refresh memory.

Relatively standard circuitry is utilized in the cathode ray tube system as well as in the other peripheral elements such as the joy stick, paper tape reader, and perforator, as well as in the interface buffering equipment, and has been heretofore available for typesetting function wherein the paper tape produced by the perforator is utilized as an input element for operating a phototypesetter. One such equipment comprises an "Ultracomp" terminal Model 808, 810 or 812 manufactured by Automix Keyboards, Inc., Redmond, Washington. However, the prior equipment did not include apparatus for file management, file searching, file merging, etc. employing the plurality of internally addressable tape transports. The following description is particularly directed to these features.

Cassette Subsystem

Figure 2:
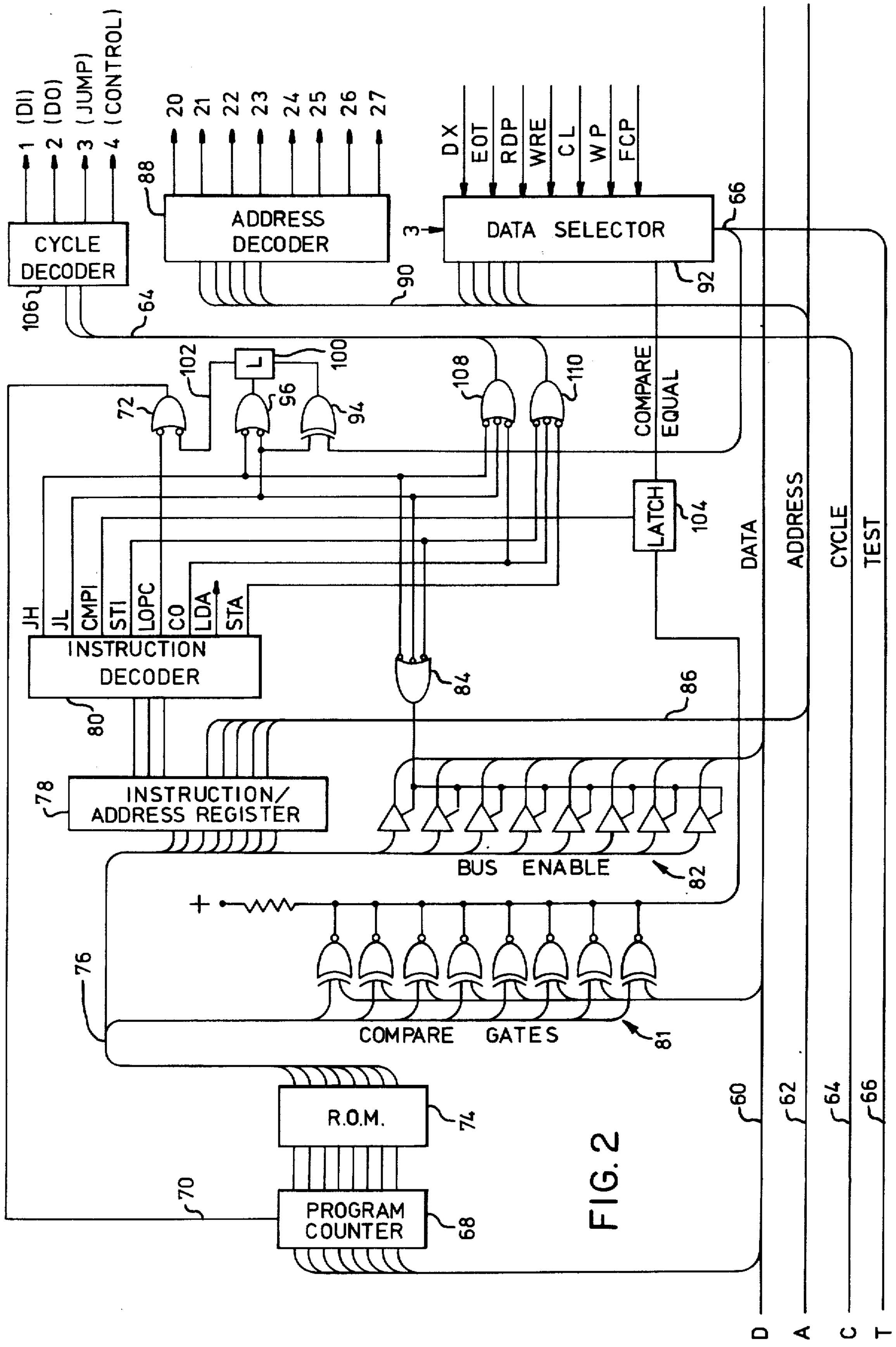
Figure 3:
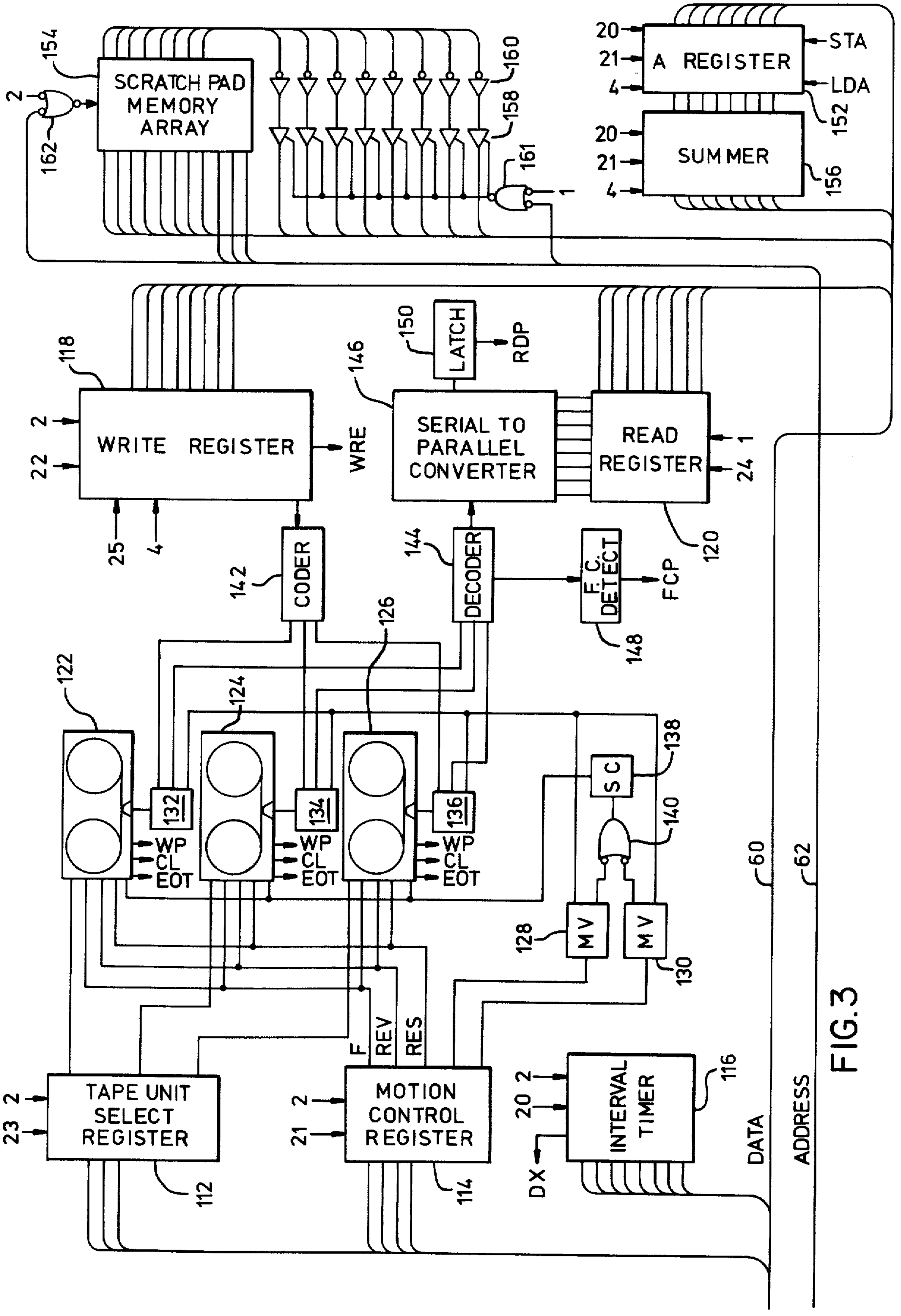

Referring to FIGS. 2 and 3, illustrating the cassette subsystem in greater detail, a bus connection to the cassette subsystem interface includes a data bus 60, an address bus 62, a cycle bus 64, and a test lead 66. The cassette subsystem itself includes its own microprocessor which is in general illustrated in FIG. 2 and a number of peripheral units illustrated in FIG. 3 which are joined to the same data bus 60 and in one instance to address bus 62. The microprocessor of FIG. 2 includes a program counter 68 addressable from data bus 60 and having coupled thereto a load enable connection 70 from or gate 72. The program counter 68 is employed to address a read only memory 74 which provides 256 bytes of selectable information on bus 76 to instruction/address register 78, compare gates 81, and bus enable devices 82. The compare gates 81 comprise eight exclusive or gates employed for comparing, on command, eight bits of information on the data bus with the selected output of the read only memory 74. The bus enable circuitry 82 comprises tri-state drivers for coupling the output of the read only memory to the data bus. Instruction/address register 78 stores a word from the read only memory, utilizing three bits of the same as an instruction applied to instruction decoder 80, the latter consisting of a binary to single line converter interpreting the instruction as one of the following:

JH: jump high (jump if test is high)
JL: jump low (jump if test is low)
CMPI: compare immediate
STI: store immediate
LOPC: load program counter
CO: control
LDA: load register A (from an address)
STA: store register A (to an address)

The bus enable circuitry is operated via or gate 84 from instructions JH, JL or STI. An address portion of the word stored in instruction/address register 78 is applied to the address bus 62 by way of bus 86. Some of the addresses are applied to address decoder 88 by way of bus 90 wherein the number of addresses are decoded to single lines numbered 20 through 27 in FIG. 2 for indicating various peripheral devices hereinafter described in connection with FIG. 3. The address may alternatively select a data selector 92 which receives a plurality of indications from peripheral equipment in FIG. 3 as follows:

DX: delay expired
EOT: end of tape
RDT: read data present
WRE: write register empty
CL: cassette loaded WP: write permit FCP: flux changes present If a test is selected by an address to data selector 92 and such test is true, then test lead 66 will so indicate and provide an output signal for application to exclusive or gate 94 in the program counter jump circuit.

It will be recalled the instruction JH requires a jump if the test is high, while the instruction JL requires a jump if the test is low. Exclusive or gate 94 compares the level of test lead 66 with the instruction JL, it being understood that JH or JL are present in the alternative whereby only the JL instruction need be applied to gate 94. If either JH or JL are present, latch 100 is set by means of or gate 96, and then as the latch is clocked (by means not shown), the data input from gate 94, indicating the presence of a comparison, will appear at output lead 102 of latch 100 for operating or gate 72 in conjunction with instruction LOPC (load program counter).

Another input to data selector 92 is derived from latch 104 operated from compare gates 81 when enabled by instruction CMPI (compare immediate) from instruction decoder 80. When the output of read only memory 74 compares with data on data bus 60, and latch 104 has been set by the instruction CMPI, data selector 92 will supply a true indication on test lead 66.

For operation of peripheral equipment as well as data selector 92, use is made of four operating cycles as follows:

1. (DI): data in, gate 108 output low, gate 110 output low
2. (DO): data out, gate 108 output low, gate 110 output high
3. (JUMP): gate 103 output high, gate 110 output low
4. (CONTROL): gate 108 output high, gate 110 output high These cycle indications are provided on four lines from cycle decoder 106, the input of which is connected to two lead cycle bus 64. Or gates 108 and 110 generate the binary indication of the cycle as indicated above in response to the instructions JH, JL, STI, CO and STA coupled as illustrated. It will be noted that data selector 92 is operational in cycle 3 while various of the peripheral equipment illustrated in FIG. 3 are indicated as operational during one of the cycles 1, 2 or 4 by a cycle lead applied thereto together with one or more of the two-digit addresses from address decoder 88.

Referring to FIG. 3, the following devices are seen to be coupled in parallel to data bus 60: tape unit select register 112, motion control register 114, interval timer 116, write register 118 and read register 120. Through the data bus, various words of information are coupled to a particular unit as addressed by one of the double digit addresses from the decoder 88 in FIG. 2, during cycle 1 in the case of read register 120 and during cycle 2 with respect to units 112, 114 and 116. Write register 118 functions during cycles 2 and 4.

The tape unit select register receives a digital word for indicating which of tape transports 122, 124 or 126 is selected for operation, and for energizing such unit. Motion control register 114 receives data regarding the direction of motion of the selected tape transport, i.e., forward and reverse, as well as regarding the desired speed of the tape transport. Signals are generated in motion control register 114 in response to the desired speed for operating speed control multivibrators 128 and 130, wherein multivibrator 128 is operable for controlling a tape speed of 10 inches per second while multivibrator 130 is operative to control a tape speed of 40 inches per second. The multivibrators receive second signals from read-write amplifiers 132, 134 and 136 associated with the respective tape transports, which signals are derived from a tape clock track for resetting multivibrators 128 and 130 appropriately when the tape is running at proper speed. The outputs of the multivibrators are connected to speed control circuit 138 via or gate 140 for bringing about servoing of the selected tape transports to the desired speed. Motion control register 114 also supplies a reset signal (RES) for resetting the selected tape transport to an initial condition. It is noted that the respective tape transports 122, 124 and 126 supply auxiliary outputs for indicating end of tape (EOT), cassette loaded (CL) and write permit (WP) indicative of the tab condition of the cassette. These signal indications for the selected tape transport are supplied to data selector 92 in FIG. 2.

Information is written into the selected tape transport by way of write register 118. The word to be recorded on tape is received in parallel form from data bus 60. Write register 118 comprises a shift register for shifting the information out in serial form to coder 142 where it generates the desired coding, e.g. bi-phase-level, for application to a particular read-write amplifier. For writing into the write register, address 22 is applied during cycle 2, while for serial writing of the shift register into coder 142, address 25 is applied in cycle 4. The write register also supplies a signal to data selector 92, namely WRE (write register empty).

For reading a tape, read register 120 and associated equipment are selected by address 24 during cycle 1. The information read from such tape passes through decoder 144 where it is converted to conventional digital format, and applied to serial to parallel converter 146.

From converter 146 the data is coupled in parallel fashion to read register 120 where the same is available to data bus 60. Address 24 during cycle 1 places the word on the data bus. A flux change deflector 148 is coupled to decoder 144 for indicating the presence of recorded information, and a latch 150 is set by serial to parallel converter 146 when a word is present. Elements 148 and 150 respectively provide the signals FCP (flux changes present) and RDP (read data present) to data selector 92.

Interval timer 116 receives the value of a particular time interval from data bus 60 when addressed by address 20 during cycle 2. The timer "times out" the period which has been entered, and supplies a signal DX (delay expired) to data selector 92 at the end of such period.

The A register 152 both receives information and supplies information to data bus 60. It is used as an accumulator when operated by an instruction LDA (load register A from an address) or STA (store register A to an address). The A register is frequently employed, for temporarily holding information, and in conjunction with a scratch pad memory array 154, hereinafter more fully described. Data entered into A register 152 is coupled via summer 156 wherein the data input may be incremented or decremented by adding one or subtracting one from the A register input as it passes through the summer, if the summer is appropriately addressed by a two digit address during cycle 4. Otherwise, data is entered into the A register without alteration.

Similarly, data may be entered into scratch pad memory array 154 from data bus 60, and may be retrieved from the scratch pad memory array back onto bus 60 through buffers 160 and tri state drivers 158. The scratch pad memory array is addressed via address bus 62 from instruction/address register 78 in FIG. 2 to select a particular register in the scratch pad memory array. The scratch pad memory array comprises a plurality of registers, for example 16 such registers, which are capable of selectively receiving parallel, eight bit words from data bus 60 during cycle 2 when an appropriate digit is received from the address bus by nand gate 162. When data is to be retrieved from the scratch pad memory array, the appropriate digit on address bus 62 operates nand gate 161 during cycle 1 which energizes tri state drivers 158 to place information from the addressed register in the scratch pad memory array upon the data bus.

GENERAL OPERATION

The terminal apparatus, according to the present invention, has for its purpose the generation of magnetic and/or paper tape which is then utilized as an input to a self-contained typesetting apparatus at a second location, e.g. a photo-typesetter. The operator of the terminal apparatus may compose and/or edit copy which appears in the form of an image on the screen of cathode ray tube 32 in FIG. 1, and which is then selectably included as an output, either on paper tape, via perforator 24, or on magnetic tape via cassette subsystem 20. When the operator views the copy on the face of cathode ray tube 32, certain conventional editing functions can be performed, such as the deletion of a character or word, or the insertion of additional material with the keyboard at a position selected by track ball or joy stick 18. In addition, a block of material may be selected and repositioned under the control of the operator as he views the copy on the face of the cathode ray tube.

Features, according to the present invention, include the management of files, e.g. as recorded on plural cassettes, searching for a particular file by identification number or content, and merging of information from plural tape searches into a common stream or tape outlet. For instance, an insert may be made to a selected portion of the cathode ray tube screen not only from the keyboard but from any location of any selected tape which can be designated by the operator. Thus, the operator may wish to type information up to a given point, or derive information from a tape input up to a given point, after which an insert may be selected from another tape and positioned, under operator control, at a desired location indexed for outputting in a continuous, merged and edited stream. In this way, a desired output tape for application to a photo-typesetter or the like, can be quickly composed in the final form while viewing such information on the face of the cathode ray tube.

To identify information contained on the plurality of tapes for selection at will, the material on the tapes is divided into groupings. Two groupings are used. The major grouping is called a JOB, and the minor grouping is called a TAKE. Thus, a job will include a plurality of takes. The lengths of groupings are determined as desired by the operator in the initial recording process of the tapes, wherein such recording may suitably take place via the keyboard of the present apparatus, or via a similar typesetting keyboard, terminal or the like. The manipulation of the data is software controlled by the central processing unit as hereinafter more fully described.

As hereinbefore indicated, important functions of the present invention relate to the searching of information in, and merging of information from, multiple input devices for selective viewing and possible editing on a cathode ray tube screen, together with outputting to selectable storage devices. The searching aspect typically involves a "take search," a "job search" or a "code search." In the instance of a job search, a particular numbered job and a particular designated tape transport may be searched in either direction. From the standpoint of the central processor unit, the operator designates the job number he is interested in locating, and such job number is stored at a memory location in random access memory 12. Random access memory 12 operates to register the particular job number and take number then being read or readable from each tape transport connected into the system, so when a particular job or take is designated by the operator, the job register in the main memory 12 is compared in central processor unit 10 with the desired job number as also inserted in memory 12, and motion is imparted to this selected tape transport until that job is found. The job may be inserted to the screen at a desired location. Under the control of the operator, the selected tape information is read into the scroll memory location within main memory 12 for coupling via interface 42 to refresh memory 46 whereby this information will appear on the screen of the cathode ray tube 32. This information may be inputted to the location of a cursor located in previous information on the cathode ray tube display and scroll memory, controlled by track ball or joy stick 18, and the information thereby merged with other information for outputting. The manner in which the function is implemented in the cassette subsystem is hereinafter more fully described. From the standpoint of the central processor unit, a similar operation occurs in the case of a "take search." The operator selects the desired take number and the particular job within which the take occurs, and such information is stored in main memory 12 for comparison with the information, also registered in the main memory, as to the job and take currently read or readable from a selected tape. The selected tape is then transported until in position for delivering the particular take to bus 14. Under the control of the operator, the selected tape may be read into the scroll memory location within main memory 12 for coupling via interface 42 to refresh memory 46 whereby this information will appear on the screen of cathode ray tube 32. This information may be inputted to the location of a cursor in the cathode ray tube display, controlled by track ball or joy stick 18, and the said information merged with other information above the cursor previously stored in the scroll memory for outputting as a continuous stream to a selected tape. Alternatively, information may be inputted to the screen, and outputted, if desired, up to the record being searched for.

The operator may have no record of the particular job and take where desired information is to be found, but may recall a starting code word or other identifying designation which would locate the desired job, take or sub-group. In such case, the operator would type in a "search argument" which is stored in a target buffer region of main memory 12. Blocks of information are read, e.g. from the cassette sub-system, and this information is read into the scroll memory portion of main memory 12. Then, in the particular embodiment, the "window" or buffer of the scroll memory selected for coupling to refresh memory 46 is inputted with information being searched, and characters appear on the screen of the cathode ray tube starting at the bottom line. As each line is formed, it moves upwardly or is scrolled up and characters are compared as they come onto the bottom line of the screen with the search argument stored in the target buffer. Comparison is made by the central processor unit. When a favorable comparison is reached, the process is stopped with the cursor in position at the point of comparison. As hereinafter more fully described in connection with the system software, the individual characters of the search argument are consecutively searched one at a time to ascertain their consecutive presence in the text being searched, but without regard to contiguity. Thus, if one were searching for the word TYPE the letters are searched in the incoming information without regard to whether the letters T, Y, P, E appear contiguously in one word. After all four letters have consecutively been found, a reverse search is made to see whether these letters are contiguous and if so the search routine is terminated. As in the case with the job search and take search, the thus identified information can be inserted at a location selected by the cursor and the data stored into the scroll memory, and may be outputted as a contiguous stream to a selected tape transport, e.g. with the information searched for immediately following the information theretofore inputted to the screen. The information as viewed on the screen may be corrected, edited or rearranged in a conventional manner before being outputted to a tape for application in operating a photo-typesetter or the like.

Turning to the general operation of the cassette subsystem, a particular command such as rewind, take search, job search forward, job search reverse, record a record or write a record is inserted by the central processing unit into the cassette subsystem interface 36. In an initial condition, program counter 68 in FIG. 2 addresses control rom 74 to place a word or byte in instruction/address register 78 which addresses the register in the cassette subsystem interface via bus 62 which may contain a command. The processor continues to ask the interface whether a command is present until test line 66 from the interface returns an indication that a command is present. Until such a command is found, the program counter 68 jumps back and continues making the inquiry. When the command is detected, the program will "fall through" to another section for placing the command code from the interface onto data bus 60. This command code from data bus 60 is first placed in A register 152 where it is "accumulated," after which the same is transfered to a register in scratch pad memory 154 under the control of control rom 74.

After the command is located in a particular register in scratch pad memory array 154, the program counter 68 and rom 74 go through a series of steps which compares the word stored in the scratch pad with successive words stored in the rom, executing the continuous cycle as hereinafter indicated in FIG. 30 with reference to the cassette subsystem program. A CMPI instruction from decoder 80 enables latch 104, and successive words in rom 74, selected as program counter 68 counts, are compared by compare gates 81 via data bus 60 with the command now stored in the scratch pad. A compare immediate instruction implies a second word or byte that has some data. The instruction splits off an address delivered to bus 86 which addresses the scratch pad location of the command, and the instruction portion (CMPI) of the same byte is applied to decoder 80 "turning on" the compare gates. The program counter steps another step, causing the rom 74 to present a command word for comparison in compare gates 81 with the command word residing in the scratch pad. If a comparison is produced indicating the command in rom 74 equals the command in the scratch pad, then latch 104 provides a compare equal output to data selector 92. Data selector 92 is addressed while a jump instruction from decoder 80 energizes bus enable drivers 82 via gate 84. Data selector 92 provides a jump indication on test lead 66 causing latch 100 to provide a jump command on lead 70 whereby program counter 68 then jumps to a next rom word enabled onto the data bus by drivers 82. Therefore, if a comparison has occurred between a rom word and a command word in scratch pad memory, a following rom word becomes the next address to which the program counter goes. In essence, a subroutine is accessed. As a result, the program counter will then step through a number of further instructions in the rom memory, starting with the instruction jumped to, whereby a subroutine such as read-write, rewind, forward job search, etc., will be executed as hereinafter described in the section of the specification regarding the cassette subsystem program. It is seen the rom 74 contains a collection of subroutines waiting to be used, and which are selected by a jump to such subroutine.

As indicated above, the instruction CMPI (compare immediate) is a two byte instruction. Other instructions which require two bytes to complete are STI (store immediate), JH (jump high) and JL (jump low). The instruction STI, for example, indicates that the next byte in rom 74 will be stored to the address that was given in the instruction. Another type of instruction is exemplified by STA (store A) which states that whatever is in the A register 152 should be stored to the address on the address bus. Therefore, the A register, rather than the rom, is enabled onto the data bus.

When the data selector 92 is addressed, it serves to latch certain test features which are addressed and defined above, i.e., DX, EOT, RDP, WRE, CL, WP and FCP. If the addressed test is true, an indication will be produced on test lead 66. The data selector is addressed via address bus 62 in conjunction with a jump instruction from decoder 80, whereby the aforesaid indication on test lead 66 will cause the program counter to jump to the next rom word. This next rom word prescribing a count in the program counter will now select a portion of the program.

Alternatively, the address reaching bus 62 via bus 86 may address the address decoder 88 or scratch pad memory 154 rather than data selector 92. As hereinbefore mentioned, address decoder 88 decodes selected addresses as indicated for operating certain of the peripheral devices illustrated in FIG. 3. The program defining the order of operations performed by the cassette subsystem is hereinafter described.

In the case of job search, the cassette subsystem causes a tape transport 122, 124 or 126 selected by register 112 to be read at 40 inches per second under the control of register 114. The selected tape is read and data selector 92 is addressed from the rom to indicate whether FCP (flux changes present) is indicated by detector 148. If flux changes are present, timer 116 is repeatedly reset to 175 milliseconds or the time spacing between jobs for a tape running at the given speed. If flux changes are not present, the data selector causes the program counter to jump to an instruction addressing the data selector to test for DX (delay expired). If the delay expires, i.e. timer 116 times out for 175 milliseconds with no flux changes, then program counter jumps the rom to provide a store immediate construction to the motion control register 114 for stopping the tape. Also, the status, i.e. end of job, will be stored in the scratch pad (see FIG. 35) for reporting to the status register in the interface (see FIG. 30). As hereinafter mentioned, the particular number designation of the job will be kept track of in the main memory 12 in FIG. 1, where such number is being incremented or decremented appropriately as each end of job status is reached. If the requested job number has not yet been reached, the central processor will supply another job search command to the cassette subsystem via interface 36.

Figure 31:
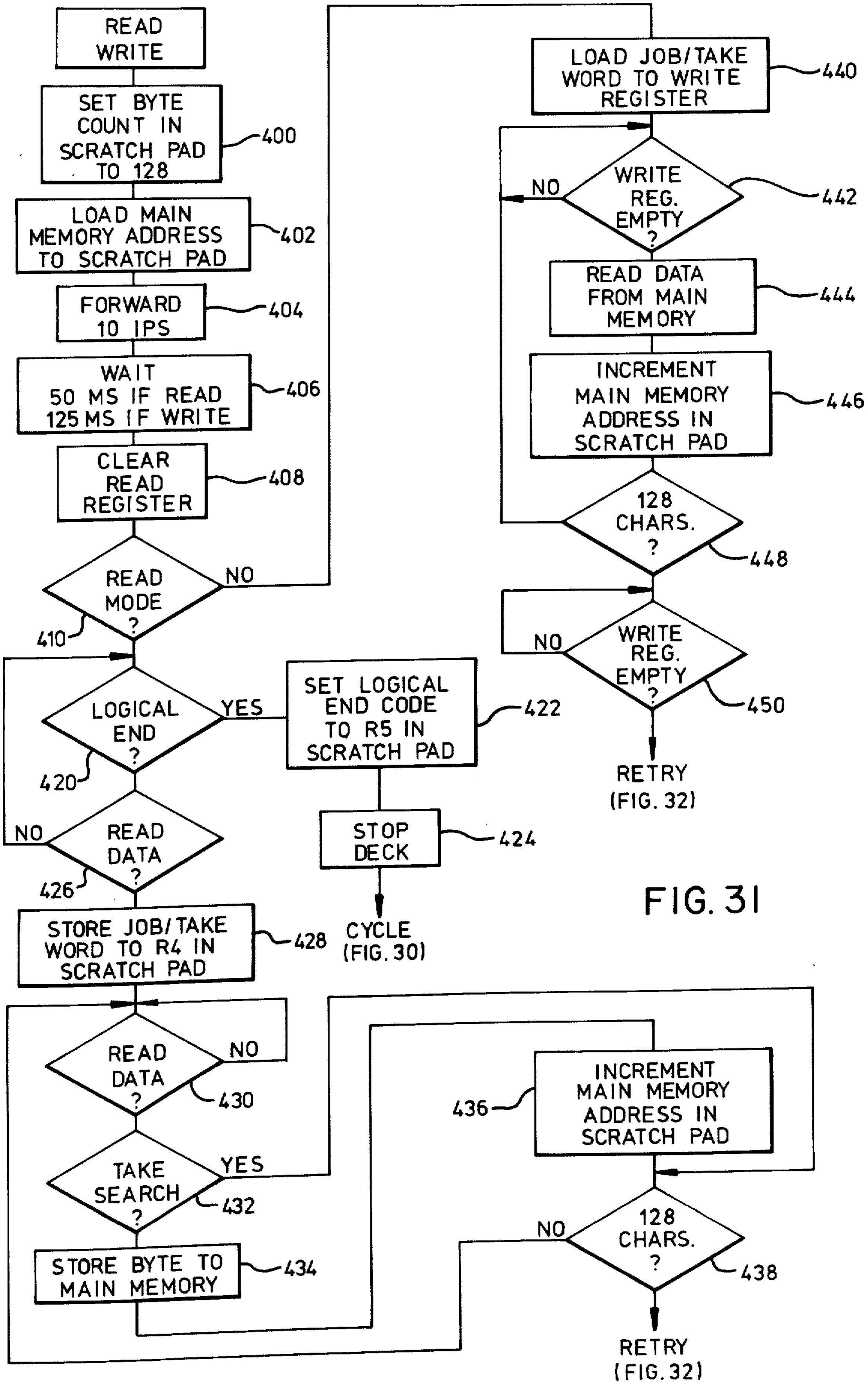
Figures 32, 33:
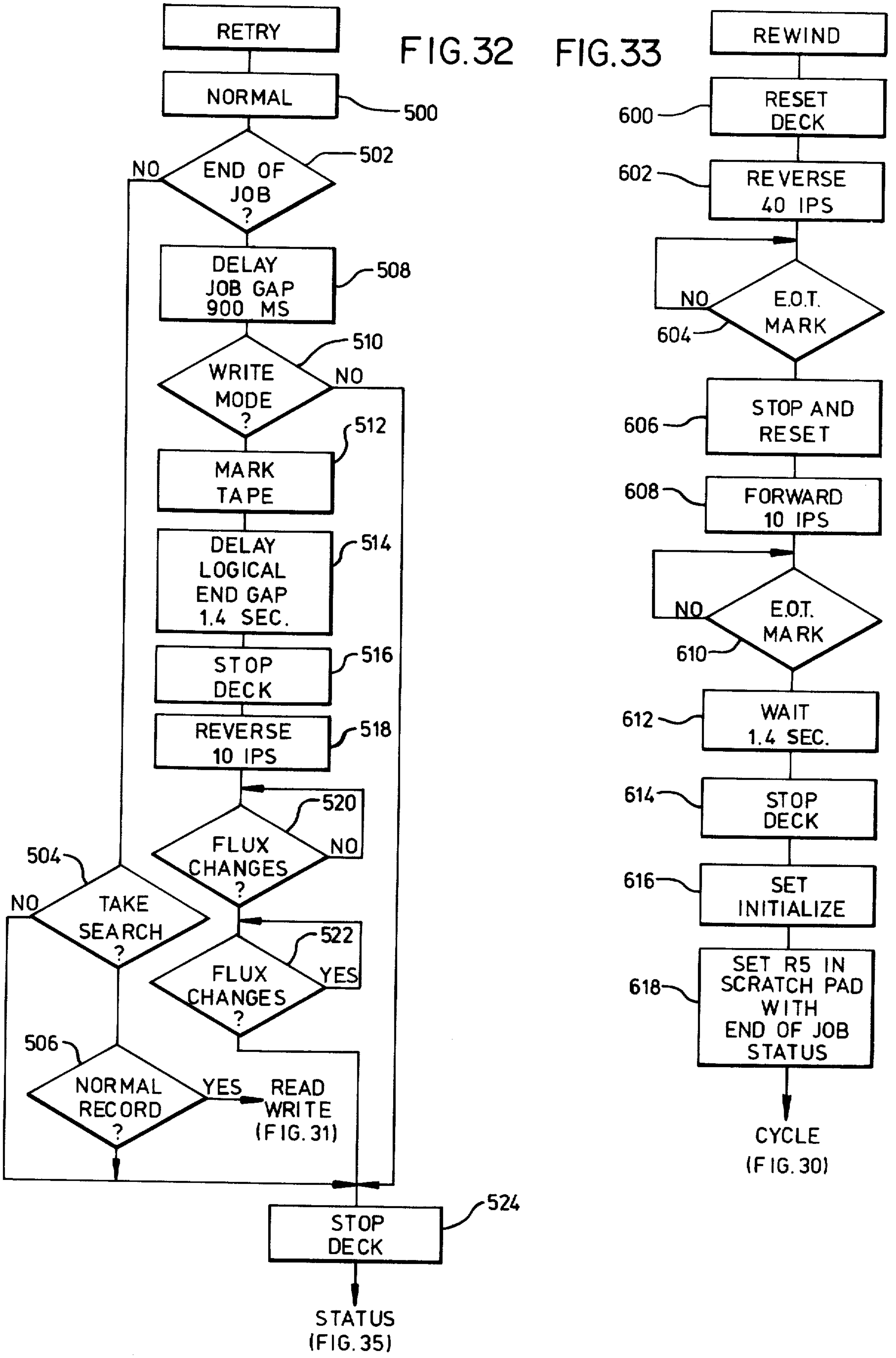

In the instance of take search, the cassette subsystem recognizes a block of information as an end of take block. It will be observed that each block or PRU (physical recording unit) may contain an end of take byte or word substantially at the beginning thereof. As can be seen from procedure block 428 in FIG. 31, the end of take word, if present, is stored to register R4 in the scratch pad memory. Then, at the end of that particular PRU of information, the decision block 522 in FIG. 32 is reached for ascertaining whether the word in R4 indicates the PRU is an end of take, or a normal record. The compare gates 81 in FIG. 2 are utilized to compare the word for a normal record in rom 74 with the contents of R4 in the scratch pad memory. A jump instruction causes data selector 92 to initiate a jump if a comparison does not take place, thus indicating a take word was present. The program counter jumps to a count directing rom 74 to initiate a routine for stopping the tape deck and posting status. If the central processor unit determines the next take is not the numbered take desired, then a take search will be commanded again. Otherwise, readout will be commanded from the cassette subsystem into the main memory 12 in FIG. 1.

For executing a code search, the information from the selected tape is read a block at a time, such block consisting of 128 bytes or words, from the tape into the interface 36 from which it is read into memory 12 and specifically into the scroll memory portion thereof. The starting address in memory 12 to which information is to be read is obtained from the central processor unit, and each time a byte is stored to the main memory, the main memory address which is locally kept track of in the scratch pad memory is incremented such that each ensuing byte can be properly addressed in main memory. The central processor unit continues to make comparisons with the information in the target buffer as hereinbefore described, and the command to discontinue reading the tape will be given when a comparison is found.

Programming

In order to more fully understand the operation of this invention, it is helpful to understand the theory and organization of the system software.

The intelligent CRT terminal herein described is not a problem solving device, but rather a system for manipulating and editing manuscript data. The operator of the terminal does not program the device for problem solving but rather commands various functions by keyboard instructions to the CPU. The CPU processes the keystrokes according to programmed logic, frequently making decisions based on the contents of system status registers or tables of pre-stored data.

Each keystroke by the operator results in a response or chain of responses which are part of the editing or manipulating function. After the response or chain of responses occurs, the system returns to examine the operator's further keystroke instructions which direct the next step of the process. For convenience the preferred system includes a keystroke buffer in the main memory so that the operator may enter keystrokes at a rate of speed greater than the CPU can process commands. From the keyboard the operator controls the various peripheral devices and is able to accomplish such functions as inserting and deleting characters and words, transferring, deleting, storing and searching for blocks of text and searching for certain strings of character codes.

With plural mag tape storage units incorporated into the intelligent CRT editing terminal, the flexibility and capacity of the entire system is greatly enhanced. The memory capacity of the system is expanded without adding to the hardware memory capacity. The existing hardware memory is used more efficiently as a stage for locating and merging blocks of data as desired. The system provides for tape copying and is capable of translating input signals from a variety of devices into a code which may be visually displayed as screen characters. Likewise, the system can translate screen character codes into signals which may write a variety of output devices, including magnetic tapes.

The operator, provided with complete control of tape operations, can rapidly position, search, read, and write the mag tape units. Additional flexibility is achieved by programming the CRT terminal to perform automatically sequences of tape operations in response to commands from the operator.

In the preferred embodiment, this invention greatly increases operator access to stored text material by allowing him to search mag tapes in three ways. An automatic search may be made to locate the address of a text block on the tape. If the operator does not know the address of the text block he desires, the system will automatically search the text for a sequence of operator desired characters that appear in the text, or a visual search may be performed by the operator as the contents of the mag tape are written onto the CRT screen.

The ultimate purpose of the terminal which incorporates the various features described, is to provide an efficient interface between the operator and an automated photo-typesetter. Operator commands, read by the terminal, direct the processing of text material and at some point in time command the terminal to produce either a perforated paper tape, a mag tape, or a direct transmission of electrical signals which is used as input for a photo-typesetter. As major brands of photo-typesetters require different input formats a variety of separate editing terminal software products are required to adapt editing terminals for use with different photo-typesetters. To provide the desired degree of flexibility it is preferred that the software control system be composed of a series of tables which are hierarchically structured. These tables may be conveniently re-programmed to provide compatible input data for various photo-typesetters and to adjust terminal processing to accommodate other special needs of the user. Software elements subject to great change are coded in special macros to further simplify re-programming.

A. Command Processing

Figure 4:
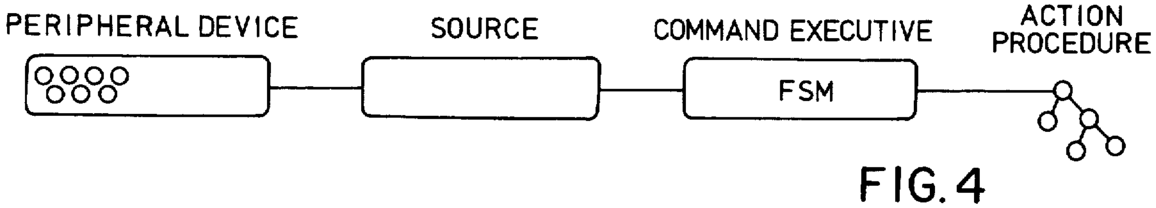

FIG. 4 is a flow diagram which shows the basic steps of the command processor. In the preferred system all commands are processed by a single command processor. A source obtains information from a peripheral device, e.g. keyboard, track ball, or a memory area, e.g. screen, multi-code and converts it into common command format. The command executive interprets the command format to locate and call the appropriate action procedure.

The finite state manager (FSM) serves as the command executive and is the primary system controller. The FSM gives a predictable response to any given command format "stimulus." In a single state system, this would mean that each stimulus $S_i$ produces a single predictable response $R_i$ from the FSM. For convenience in programming and economy of memory space, however, it is preferred that system software include several states. At any point in time the system exists in one of the identifiable states. The address of the current state is stored in a FSM register available for that purpose in the main memory. In the multi-state system the FSM determines not only which action procedure will be called, but also determines whether the present state will be maintained or whether the system will shift to a different state. Thus in a multi-state system, response $R_j$, i, is defined for the stimulus $S_i$ when the stimulus is received while the system exists in state $j$. In the multi-state system, the response is not only an action procedure, but also may include a change in the system state by placing a new state address into the FSM register reserved for the current state status. In the preferred system, the stimuli are four byte words called operand quads, which are organized into a table. This operand table contains quads which link to every action procedure and state change required by the system. Sources translate external events such as a keystroke or character read from an input device into a location within the operand table. The quad at this table location is made available to the FSM which triggers the desired responses.

Figure 5:
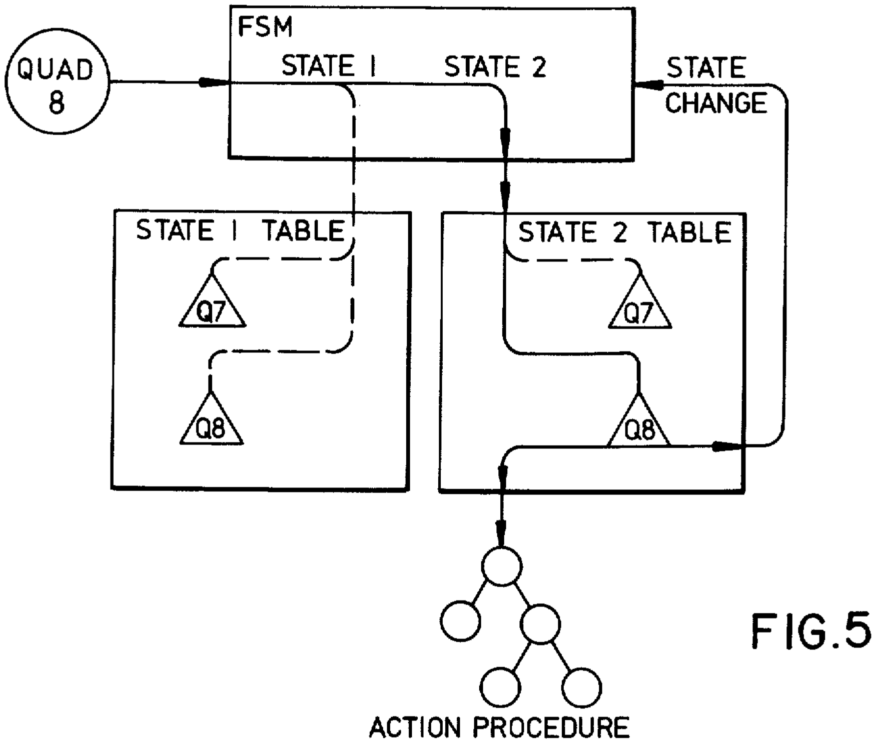

FIG. 5 illustrates the operation of the FSM in a multi-state system. Quad 8 is the stimulus read by the finite state manager. The FSM examines the FSM register in main memory and determines that the system is currently in state 2. Thus the stimulus quad is mapped to the quad 8 position in the state 2 table. The state table contains information which determines the action procedure and/or state change to be performed.

Figure 6:
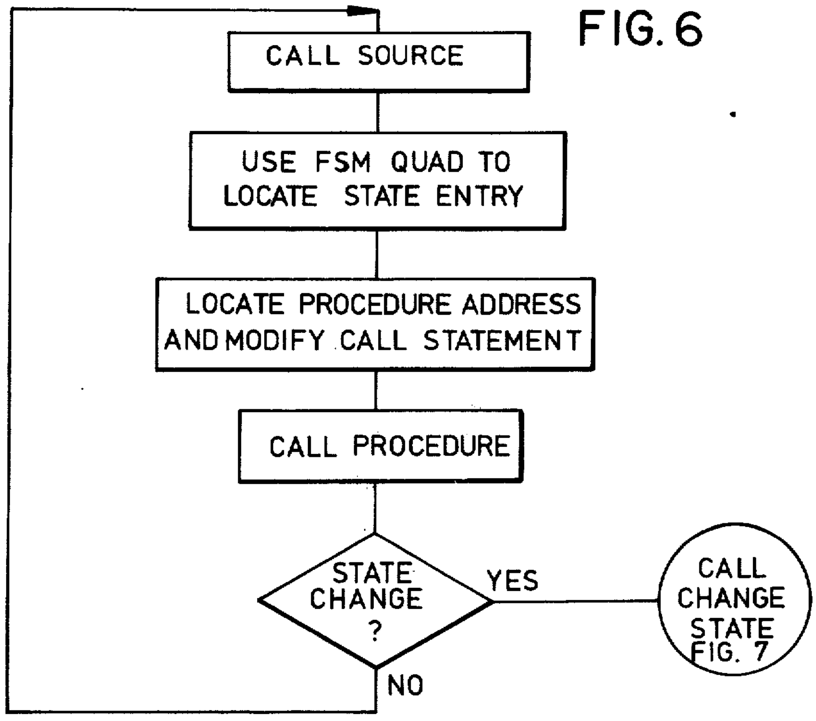

FIG. 6 illustrates the same process in a flow diagram. The FSM first calls the active source to transmit an operand quad if any is available. From the information in the quad, the FSM locates the address of a corresponding entry in the current state table. The state table entry, called a class action pair, is used to locate the address of an action procedure and of a state change procedure. The action procedure is called, and if a state change is required the change state routine is called.

When the system is at rest it is in the basic "keyboard" state and the keyboard source is active. In this system status the operator gives keystroke commands which control every feature of the system. A simple keystroke command given while the system is in the basic state will result in the triggering of a single action procedure and state change if appropriate. Other special keyboard states are provided for the formation of more complex commands. Some of these commands specify new sources which are to transmit stimuli for FSM processing and call routines which trigger a series of action procedures. Others allow the transfer of a keystroke sequences or character code strings into and out of memory locations. At the end of each sequence of command processing, the system returns to the basic state to check for further keystroke commands as given by the operator. Other states in which the system may exist during command processing include: input states, where data is read by a non-keyboard peripheral input device, processed and transferred to the scroll memory buffer; and output states, where data in the scroll memory buffer is processed and transferred to peripheral devices for output.

The key to a complete understanding of the hierarchical software control system is familiarity with the various tables and dynamic registers used in this system. These software devices located in the main memory of the system are basically used in three ways: 1. translation of input codes into operand table addresses and of operand table addresses into output code (I/O tables); 2. conversion of operand table addresses into operand quads which are the initial stimuli for command processing (operand table); 3. mapping by the FSM from the operand quad to the appropriate action procedures and state changes (class, state, procedure address and state address tables; dynamic registers).

1. PRIMARY TABLES a. Operand Table

The operand table contains a four byte entry called an operand quad, for each function of the system. The operand quad is the initial stimulus processed by the FSM. There are four different types of quad in the preferred system. Each of these types serves a different purpose, and each has a different data format. All four types appear in one operand table. Every quad contains a class index position byte which the FSM uses to map to an action procedure and state change. The four quad types of the preferred system include:

Character quad. Each character quad contains coded information showing the character shift status (unshift, shift or super shift) and a class index position byte. A character quad may be provided by any source under appropriate conditions.

Multicode Quad. The multicode quad contains an address of the beginning of a multistring and a class index position byte. The keyboard source provides a multicode quad whenever the operator strikes a "character string" key on the keyboard. When the FSM processes a multicode quad, a string of character codes is transferred from a special location in the main memory to the scroll memory buffer. The CRT hardware causes the characters to be displayed on the screen. Character strings may be operator programmed or preset.

Action Quad. The action quad contains an address of a subroutine to be executed and a class index position byte which the FSM uses to find a link with the specified subroutine. The keyboard source produces an action quad when the operator strikes one of the "action" keys.

Function Memory Quad. This quad contains an address of a function memory string and a class index position byte. The keyboard source provides a function memory quad when the operator strikes a "function memory" key. The FSM maps from the quad to an action procedure which causes the string of key numbers stored in a function memory location in main memory to be processed as if they had been entered by operator keystrokes.

b. Class Index Tables

Class index tables are a software refinement incorporated in the preferred embodiment of the present invention to reduce the number of entries needed in each state table. A reduction is accomplished because the FSM can use a class index table entry to map from an operand quad to addresses in several different state tables. The current state status of the system determines which class index table is used for mapping and which state table is the object of class mapping.

c. State Tables

A state table can be defined for each possible system state. The table contains a pointer to the class index table which is proper for mapping to that particular state. Following the pointer is a list of one or more two-byte entries called "class action pairs." Each class action pair contains a "procedure command byte" which points to a position in the procedure address table and "state command byte" which points to a position in a state address table.

d. Procedure Address Table

The procedure address table contains an address for every action procedure. Class action pairs from each state table contain "procedure command bytes" which point to locations in this table.

e. State Address Table

The state address table provides an address for every possible change of state. The table determines what state the system will be in at the end of each cycle of FSM processing. State changes may be either absolute or relative. If the "state command byte" pointer of a class action pair contains a positive value, the state change is absolute. The new system state is defined by the state address to which the state command byte points in the state address table. If the state command byte contains a negative value, the state change is relative. A relative state change causes the system to return to the immediately previous state. If the state command byte contains a value of zero, there is no state transition.

A flow diagram for the state change process appears in FIG. 7. In this figure when the state change routine is called, i.e. if the state command byte is not equal to zero, the state change routine may follow two paths. If the state command byte is positive an absolute state change occurs. The old state address is added to the state stack and the new state address shown in the state address table is entered in the appropriate FSM register as the "current state address." If the state command byte is negative the state change is relative and the last previous entry in the state stack is entered as the "current state address."

2. Control Tables

The following control tables provide for state transition control and a means of preserving the status of a state group:

a. State Stacks

The state stacks are single pointer, last in-first out circular stacks. In the preferred system these stacks have sufficient capacity for eight one byte state entries. An absolute state transition causes the state stored in the FSM "current state status" register to be pushed onto the top of the stack. A relative state transition causes the last prior state to be popped from the stack and placed in the FSM register.

Three separate state stacks are maintained by the system, one for each primary mode of the preferred system (keyboard, input and output). This provides a means of preserving the state status of each mode. Each of the system states is classified into one of the primary modes according to source. All of the states for which keyboard or multicode is the active source are included in the keyboard mode; those states for which screen is the active source are included in the output mode; and those states for which input is the active source are included in the input mode. According to the programming rules of the preferred system, state transition between states in different modes is not allowed during FSM processing. Transition between modes is by means of a special routine, which is called during input/output processing.

b. State Status Tables

In addition to the three state stacks certain dynamic information must be saved for each mode. The current state address, the current class index address, the state stack pointer, the base of the state stack and the address of the current (active) source are held in state status areas of the main memory.

3. Dynamic Registers (FSM)

The following registers contain dynamic information used during FSM processing:

a. Special Control Area

This register contains the state command byte used for control of the state machinery, and the procedure command byte (jump instruction), used for executing action quads.

b. Operand Quad Storage Area

This register contains the first three bytes from the operand quad, a pointer to the quad in the operand table and a class index position byte. The format of quads varies depending on the type of quad stored.

c. State Status Area

This register contains the current state address, the current class index address, the stack pointer, current stack base and pointer to the current stack of the active primary mode.

The use of the primary tables is shown in FIG. 8. The tables demonstrated in this example of FSM processing include: an operand table which contains eight, four-byte operand quad entries; two class index tables for mapping to the various states; three state tables each containing a pointer to the appropriate class index table and four two-byte class action pairs; a procedure address table containing five precedures addresses; and a state address table containing three state addresses. At the beginning of this example, the current state address is state 2. It can be seen from the class index address pointer in state table S2 that state 2 uses class index tabel C2 for class mapping. States 1 and 3 use class index table C1 for class mapping. FSM processing begins when the active source selects a quad from the operand table, in this case quad 7. For quad 7, the class index position byte, the fourth byte of each operand quad, is 3. The FSM responds to this class index position byte by examining the third position of class index table C2. The 4 found in this position is a pointer to the class action pair in the fourth position of state table S2. This class action pair points to positions in the procedure address and state address tables. The 2 in the first (procedure command) byte of the class action pair shows that the second position of the procedure address table contains the address of the action procedure to be performed. In this example, the second position of the procedure address table contains the procedure address of action procedure 1. The second (state command) byte of the class action pair contains a positive value and thus calls for an absolute state change. The new state address, S3, is found at position 3 of the state address table. After the action procedure is complete and the state change has been made, the FSM calls upon the active source to provide for processing a new quad.

Figure 9:
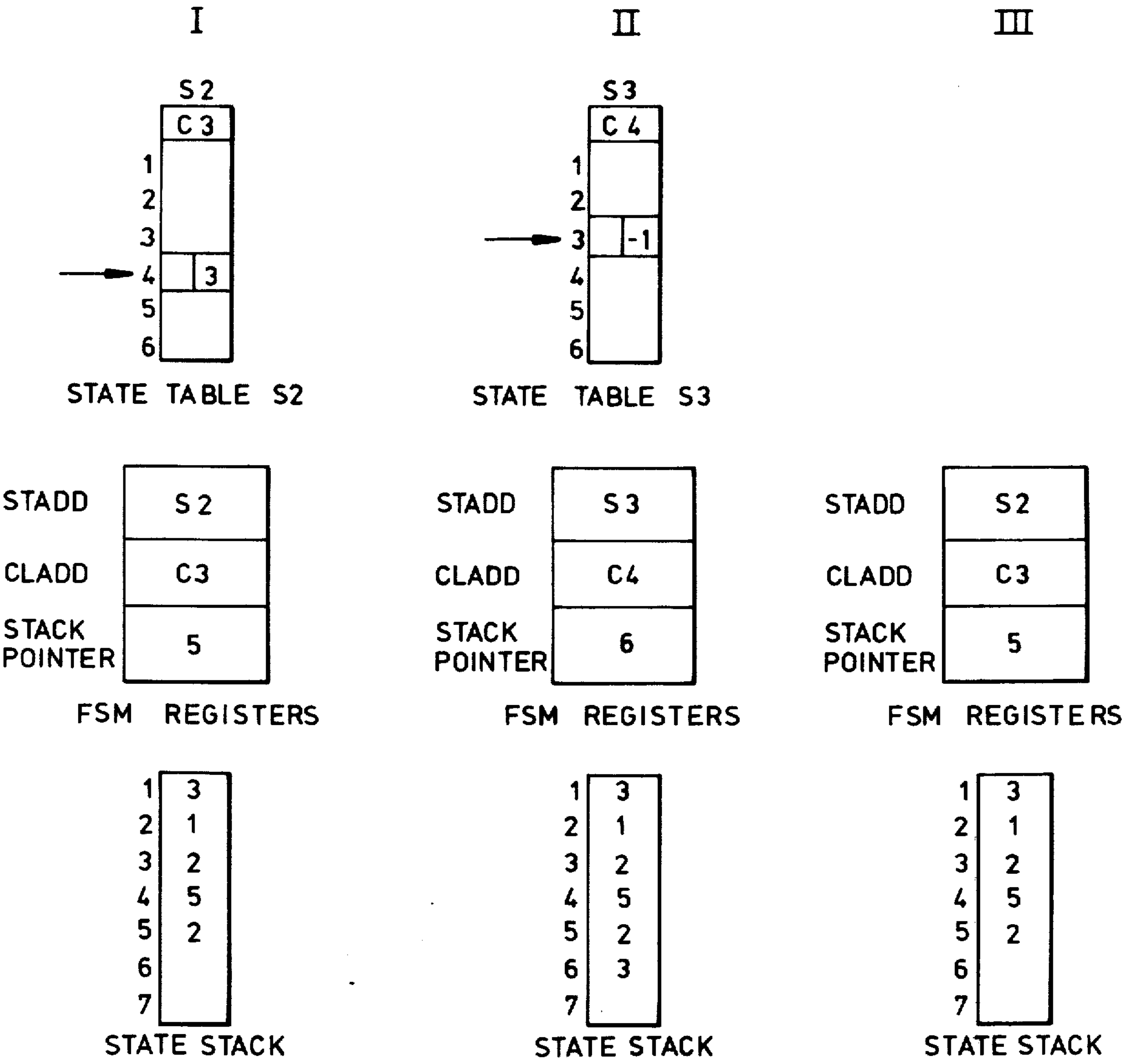

FIG. 9 illustrates two state transition cycles. The diagram shows the contents of the current state stack and relevant FSM registers both before and after each state change. In the first column a segment of the state table S2, the state stack of the mode which includes state 2, and FSM registers containing state address, class address, and the stack pointer are shown. A history of prior state activity is shown by the state addresses recorded in the stack. In this example states 5, 2, 1 and 3 were previously active in that order, 5 being the most recent prior state. The stack and state address register (STADD) show that state 2 is now the active state. That class 3 is the appropriate class indexing into state 2 is shown by the class index address pointer in state table S2. The class address, C3, is also stored in the class address register (CLADD). The stack pointer shows position 5 to contain the most recent entry in the state stack.

The first state transition cycle illustrates the same absolute state transition shown in FIG. 8. Column I shows the contents of the state stack and FSM registers before the transition. In this cycle, the class action pair located at position 4 of state table S2 has been selected. The positive value, 3, of the state command byte of this class action pair indicates that the state address in the third position of the state address table, shown in FIG. 8, indicates the next active state. Also, in accord with FIG. 8, the state address in the third position of the state address table is S3. The transition is made by advancing the stack pointer one position to position 6. The new state address, S3, is then entered into the stack and STADD. The system status after this absolute state transition is shown in column II.

The second state transition cycle illustrates a relative state transition. Column II shows the system status before this transition. At the beginning of this state cycle the FSM received a quad which mapped to the third position in the current state table, S3. Because −1, the value of the chosen state command byte, is negative, the stack pointer does not advance to stack position 7, but rather moves back one position to position 5. S2, the state recorded in state stack position 5, becomes the new active state. STADD and CLADD are updated accordingly. The system status after this relative state transition is shown in column III.

4. Sources

Sources translate input stimuli into a form suitable for FSM processing. Each source uses some combination of input/output table mapping to locate a quad in the operand table and to move the contents of that quad into the FSM register. The four sources incorporated in the preferred embodiment of the present invention are described below:

a. Keyboard Source

Each keystroke by the operator causes the keyboard source directly to locate an appropriate quad in the operand table and to store the quad in the FSM register. In the preferred system, a buffer is provided to receive keystroke stimuli so that the operator need not wait after each keystroke until processing of that stimuli is complete before entering subsequent keystrokes. The keyboard handler is a subroutine called by the keyboard source to retrieve key numbers from the keystroke buffer. The keyboard source translates these stimuli into an operand table address.

FIG. 10 illustrates the operation of the keyboard source in a flow diagram. The keyboard handler, shown in this figure as a part of the keyboard source, appears inside the broken lines. When keyboard is the active source, the FSM calls on keyboard source to provide a quad for processing. The keyboard source in turn calls the keyboard handler to check continuously the keystroke buffer for stored key numbers. If this buffer is empty the system continues in loop checking again and again until keystroke data is entered. If the buffer contains data, the keyboard handler takes the first key number entered in the buffer and advances the buffer pointer to the next position. The keyboard handler gives this key number to the keyboard source which uses it to locate a quad in the operand table. After the quad is stored in the FSM register and the FSM has mapped from the quad to appropriate action procedures and state changes, the keyboard source is inactive until called by the FSM to provide another operand quad.

b. Input Source

Operation of the input source is shown in FIG. 11. The input source is active only when the system is in the input mode. When the FSM calls upon the input source to provide a character quad, the source calls the input handler, FIG. 16, to obtain an octal code from either a mag tape unit or the paper tape reader. The input handler sends this code to the input source which maps through the input table to the address of an operand quad. The input source loads the quad into the FSM register for further processing, then exits until it is called again by the FSM.

c. Multicode Source

The multicode source is illustrated in FIG. 12. Multicodes are strings of screen character codes stored in a special area of the main memory designated the multicode table. The operator retrieves a multicode string by striking a key which corresponds to the desired string. The keyboard source uses the keystroke to locate a multicode quad. The FSM maps from the quad to an action procedure which changes the active source from keyboard to multicode. On the next cycle of FSM processing, the multicode source is called to provide a quad. Memory pointers are advanced to first position of the designated multicode string. The multicode source takes the screen code symbol from the position indicated by the memory pointer. This character is examined to determine whether it is the special character which signals the termination of the multicode string. If it is such a special character, keyboard is restored as the source. If the character at this position is not the special termination character, the multicode source converts it by means of input and output tables to an operand table position. The character quad located at that position is moved into the FSM register. FSM processing maps to an action procedure which causes the character to appear on the screen. When this action procedure is complete, the FSM calls multicode, which is still the active source, to provide another quad. The multicode source routine is thus repeated until the termination character is encountered.

d. Screen Source

Figure 13:
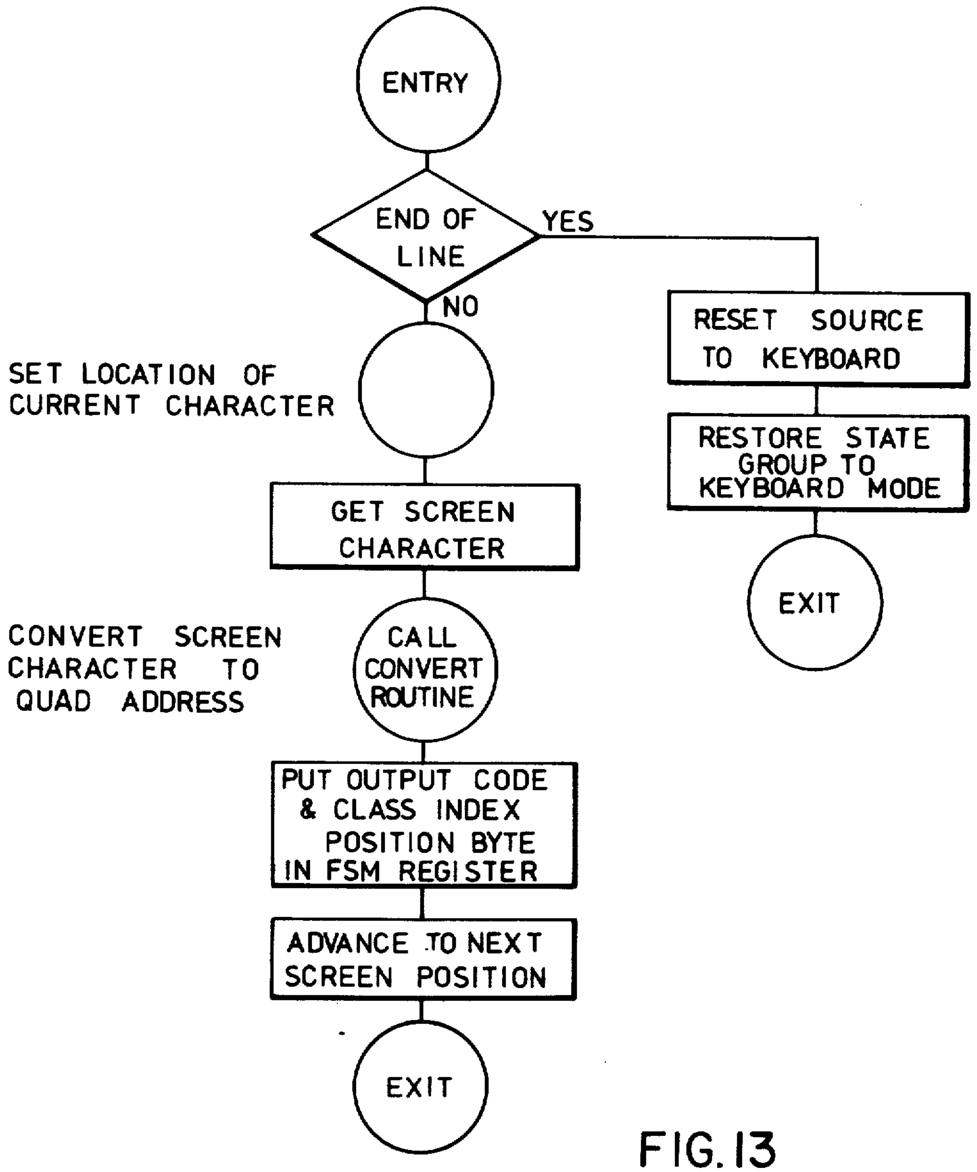

Operation of the screen source is diagrammatically illustrated in FIG. 13. The screen source provides character codes for output to the paper perforator and mag tape units. In the preferred system, screen is the only active source of the output mode. When the FSM calls the screen source to provide a character code, the screen source first checks to see whether it is at the end of a line on the screen. If so, keyboard is reset as the active source and the system returns to the keyboard mode. If however, it is not at the end of a line, the screen source obtains from the visual area of the scroll memory, a symbol for the next displayed character. This screen symbol is converted through input and output tables to a position in the operand table via the convert routine. Information from these tables is moved into the FSM register. The FSM uses this information to map to an action procedure which calls the output handler, FIG. 17, to write the code on the chosen peripheral output device. The screen source then advances the memory pointer to the position of the next screen code.

5. I/O Table Processing

The use of input and output tables is mentioned above in conjunction with certain source processing procedures. These short tables, located in the main memory, are used to translate between two character code structures which have different data formats. The use of two different character codes, commonplace in CRT editing systems, is a convenience which both maximizes editing flexibility and yet provides a space-saving output format compatible with most phototypesetters.

The primary difference in data formats is the coding of the character shift status. In the format used by the CRT logic (ASCII), the code symbol for each character contains information which both identifies the character and indicates the shift status of that character. The format used on paper and magnetic tapes (TTS) is composed of code symbols which contain either character or shift status information, but not both. In a string of TTS symbols each consecutive character code is treated as if it has the same shift status as the previous one. In order to indicate changes in shift status, it is necessary to insert shaft codes in the string. Because TTS codes contain less information, they take up less space on magnetic or paper tapes and are historically preferred by the typesetting industry. It is not, however, convenient to use TTS codes for editing functions. When TTS character codes are moved, deleted or added to a text string, it is frequently necessary to add, remove or change several TTS shift codes in order that all characters in the revised text string may have the desired shift status. Editing is much easier with the ACSII code because each character code possesses its own shift status information and may be moved into or out of any portion in the text string without affecting or being affected by other characters in the text string.

The input tables provide a convenient way to translate TTS codes read by paper and mag tape readers into ASCII format for ease in editing. After editing is complete, as a part of output processing to magnetic or paper tape, the character codes are translated from ASCII into TTS format via the output table.

B. Device Handlers

A preferred embodiment of the editing system provides interfaces for a variety of hardware input/output devices including a keyboard, track ball, paper tape reader, paper tape perforator, Phillips magnetic tape cassettes and CRT.

1. Device Registers

A portion of the main memory is reserved for software interfacing with the input/output hardware. Various locations in this memory area are assigned as device registers, and are addressed in the same manner as main memory. These hardware registers provide device control, status information and data buffering for communications between the CPU and the various peripheral devices.

2. Interrupt

In order to achieve maximum speed in processing, the present invention may include a hardware interrupt system which allows certain of the peripheral devices to function asynchronously with CPU processing. These devices function independently until they require the services of the CPU. At this point in time the routine being processed by the CPU is interrupted while the CPU services the interrupting peripheral. After servicing, the CPU continues with the interrupted routine.

Each peripheral can have a hardware pointer to one of the locations in low memory. At the time of an interrupt, the current value of the CPU program counter is pushed into an internal call stack and the program counter set to the selected interrupt vector location. After CPU servicing of the peripheral, the previously saved value is returned from the call stack, and the CPU program counter is set to this value.

The vector locations are typically used for short routines that both save the register environment and execute an "interrupt service routine" (ISR). An ISR provides for interrupt service processing and, thereafter, the restoration of the register environment. In a preferred embodiment of the present system, the paper tap punch, keyboard and track ball are interrupting peripheral devices.

3. Peripheral Devices a. Keyboard

Keyboards are well known and may exist in a variety of configurations. For convenience in the editing functions of the preferred system, keyboards are organized into three separate key banks. The "main key bank" of approximately 80 keys contain all the characters and symbols of a typical alphanumeric keyboard. The "auxiliary key bank," containing about 40 keys is used for a variety of purposes, including control of the memory processing routines. The "system control key bank", providing about 25 keys, is the origin of all system control commands from the operator.

Each of the keys on the keyboard is assigned a "key number." When the operator strikes a key, the corresponding key number is transferred to a "keyboard data buffer register" in the device register area of the main memory. In response to this condition, the CPU interrupts processing and calls the keyboard ISR. This ISR transfers the key number from the keyboard data buffer register to a circular keystroke buffer in the main memory. The buffer is emptied by the keyboard source in the normal course of command processing. The keyboard ISR is sensitive to the "attention" key of the system control keyboard. This key causes a special panic flag to be set in a main memory register. The keyboard source reacts to this flag and causes the circular buffer to collapse.

The operation of the keyboard ISR is shown in FIG. 14. When an operator keystroke calls the keyboard ISR, if the attention key number is stored in keyboard data buffer register, a panic flag is set. If, however, any other key number is stored, the keystroke buffer pointer is advanced one position and that key number is stored in the keystroke buffer. Information stored in the keystroke buffer is processed by the keyboard source as previously described.

The effect of the panic flag on keyboard source processing is shown in FIG. 15, an expanded view of the keyboard source. When the keyboard source is called by the FSM, it first examines the appropriate main memory register to determine whether a panic flag has been set. If the keyboard source discovers that the panic flag has been set, it will collapse the keystroke buffer, exit and await new entries in the keystroke buffer. If the panic flag has not been set, the keyboard source examines the buffer for a stored key number. If a key number is not found in the buffer, the routine returns to the beginning to look again for a panic flag, and in this fashion continues in a loop until either a key number or a panic flag is detected. If a key number is found in the buffer, it is processed in the fashion previously described.

b. Track Ball

The track ball interface translates and writes the direction of movement of the cue ball apparatus into a coded four bit value in the device data register in main memory. Bits 0 through 3 are set corresponding to left, right, up and down, respectively. Responding to the condition of this register, the CPU interrupts processing and calls the track ball ISR. ISR invokes the appropriate cursor movement routine consistent with the coded bit pattern.

The cursor is a symbol which appears as a shaded overlay on the screen of the CRT at all times. This symbol may be moved by the track ball control to any character position on the CRT screen. It is used an an indicator to show the point at which a given operation is to take place. For example, if a character is to be deleted from the screen the cursor is moved to a position over the character to be deleted. When the appropriate action key is struck to call the DELETE subroutine, the character under the cursor is removed, all the characters to the right of the cursor are shifted left one position and a null character is added in the last position in that line.

c. Paper Tape Reader

In the preferred editing system, the paper tape reader is not enabled as an interrupting device, i.e. it must wait until the FSM calls for data in the normal course of input source processing. When the input source, FIG. 11, calls the input handler, FIG. 16, to provide a character for processing and the operator had designated the paper tape reader for input, the paper tape input handler obtains a character from the paper tape reader and transmits it to the input source for further processing. The paper tape input handler controls both movement of the paper tape and detection of character codes.

d. Paper Tape Perforator

Figure 17:
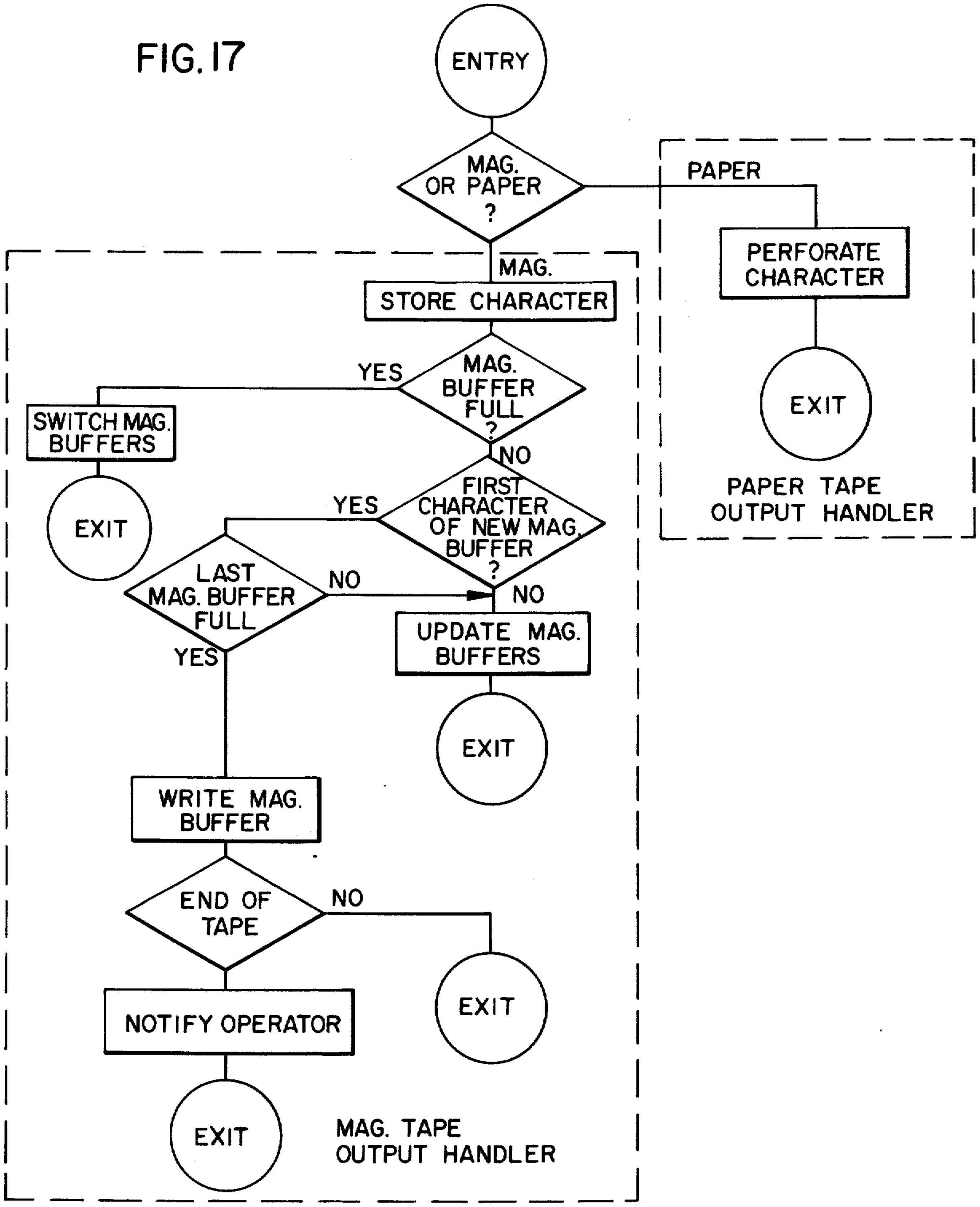

In the preferred editing system the paper tape perforator is enabled as an interrupting device and functions asynchronously with screen source processing. Interfacing between the paper tape perforator ISR and the output handler, FIG. 17, is by means of a circular buffer filled by the paper tape output handler and emptied asynchronously by the ISR. When the buffer is empty ISR service ceases until it is enabled again by the paper tape output handler.

e. Cathode Ray Tube

The preferred CRT display subsystem provides a visible display organized as a matrix of character positions in lines and columns. Optional features incorporated in the preferred embodiment include: direct addressing of the display positions, and one or more screen lines, called format lines, which are reserved for system status information.

f. Cassette Subsystem

This subsystem as hereinbefore described provides the ability to read and write strings of character physical records and to position magnetic tapes according to job and take designations chosen by the operator.

Registers associated with the cassette subsystem contain locations for a variety of coded information including the following: a bit to indicate interrupt is enabled, status codes, command codes, the address of the magnetic tape unit selected, and the address of the current position in the mag buffer of the main memory. The main system directs cassette subsystem activities by transmitting one of the following command codes to a command code register: rewind, take search, forward job search, reverse job search, read a block or physical recording unit (PRU), write a normal PRU, write an end of take PRU or write an end of job PRU. The CYCLE routine, FIG. 30, of the cassette subsystem reacts to these commands by calling a cassette subsystem subroutine which performs the commanded operation.

Figure 35:
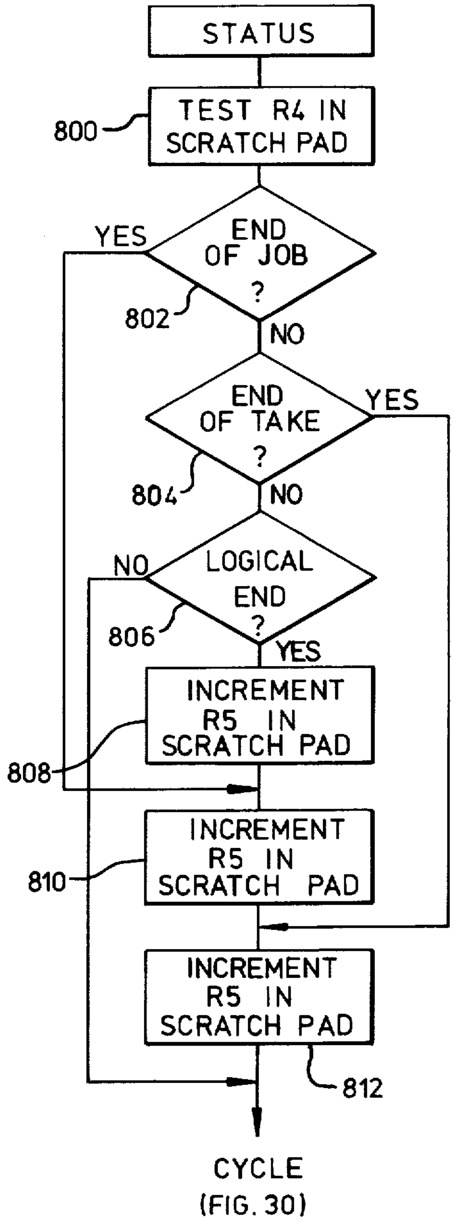

At the end of cassette subsystem processing, the STATUS cassette subsystem routine, FIG. 35, posts a subsystem status code which is transmitted to the main system via a status code register. This status code indicates the type of PRU most recently processed. Three types of PRU exist in the preferred system including: normal PRU, end of take PRU, end of job PRU.

File Organization. The organization of tape records into PRU's is one aspect of magnetic tape file organization. The other aspect is the logical format of the stored characters.

According to the "logical format" of the preferred embodiment, codes recorded on a magnetic tape are organized into units called jobs and takes. Each character string consists of one or more jobs. The end of a data string to be recorded on a magnetic tape is indicated by an end of file (EOF) code. Each job consists of one or more takes and is terminated by an end of job (EOJ) code. A take is a variable length character string that is terminated by an end of take (EOT) code. No size limits are imposed on the length of the jobs or takes other than the physical capacity of the magnetic tape. FIG. 18, showing a sequence of EOJ, EOT and EOF codes, is one example of logical tape format.

EOT and EOJ codes are set in the scroll memory character string in the same way that characters are set. In the preferred system, EOT and EOJ keys are provided in the system control keyboard so that the operator may set these termination codes as characters entered via the keyboard.

According to "physical format" rules, magnetic tape codes are organized in blocks called physical recording units (PRU's), FIG. 20. Each PRU in the preferred system contains an EOT or EOJ byte and a fixed number of data bytes (128 bytes in the preferred system). The EOT or EOJ bytes are set if the PRU serves as one or both of those terminators. In addition, EOJ PRU's are followed by a gap of blank tape. Longer tape gaps signal an EOF or "logical end."

Unlike the jobs and takes of logical format, the PRU's of physical format are all of a single fixed length.

In the preferred process of recording PRU's, character codes are added to the string until 128 bytes are filled or until an EOT or EOJ code is encountered. If one of the terminator codes is found, the record byte string is ended and a new PRU begun even if the original PRU has less than 128 character bytes filled with useful codes.

Whenever a magnetic tape unit is called upon to rewind, EOJ and EOF tape gaps are set if appropriate. FIG. 19 shows this rewind logic. Before a physical tape rewind occurs, this software routine determines whether the active magnetic tape unit was last enabled to receive output data. If it was, the software rewind routine, FIG. 19, commands the cassette subsystem to insert EOJ and EOF gaps after the character string. A physical rewind is then completed according to the REWIND subroutine, FIG. 33, of the cassette subsystem and the registers which contain tape status information are updated to reflect the current tape position. If the unit was not most recently enabled to receive output data, a rewind and update of tape status registers occurs without setting the EOJ and EOF gaps.

Mag Tape Handler. Those parts of the input and output handler routines which control magnetic tape operations from the central processor are called mag tape handlers. The mag tape input and output handlers provide the following services: mag buffer management, input source and screen source interfacing, and file positioning. Each of the cassette drive units is provided with dual character buffers (two 128 position buffers for each unit in the preferred system). The filling, emptying, switching, flushing and discarding of these mag buffers, consistent with source processing and file position requirements of the editing system, are controlled and managed by the mag tape handlers.

Software registers in main memory retain information concerning tape position and mag buffer status for each cassette unit. The register names and purposes are described below:

$MAG_n$ — Tape of last PRU read or written on unit *n;*

$FRONT_n$ — Character left in current active mag buffer for unit *n;*

$PNTR_n$ — Pointer to next active character in current active mag buffer for unit *n;*

$JOBTP_n$ — Job number of last end of job PRU read or written on unit *n;*

$TKETP_n$ — Take number of last take PRU read or written on unit *n.*

*n* = magnetic tape unit number.

FRONT and PNTR are used primarily for source interface processing. The character-by-character mag buffer processing and decisions to switch mag buffers and activate additional I/O character transfers are controlled by the status of these registers. JOBTP and TKETP are used in the tape position logic for job/take search processing. MAG provides information on the type of PRU most recently processed. The information in MAG is used for updating job and take registers and for detecting the logical end of tape (EOF). This information, as to status of active I/O units, is displayed to the operator on the format line of the CRT screen.

FIG. 16 is a flow diagram illustrating the operation of the mag tape input handler. When the FSM requests data from the input source, FIG. 11, that source calls the input handler, FIG. 16, to obtain a character. The input handler examines the input flag, registers set by prior operator keystrokes, to determine which unit has been flagged for input. If one of the mag units is flagged, mag tape input processing is invoked as shown in FIG. 16. The mag tape input handler first checks to see whether the active mag buffer of the selected unit is empty. If it is not, the next character is retrieved from this buffer and sent to "input" block of input source, FIG. 11. If the active mag buffer is found to be empty, the mag tape input handler checks to see if the end of the tape has been reached. If it has, processing is terminated and the system returns to be keyboard mode. If it is not at the end of tape, the mag tape input handler commands the cassette subsystem to fill the just emptied buffer with characters of the next PRU on the mag tape. While that is being done, the other buffer, which was previously filled in the same way, is then made active and its first character selected for input source processing. CPU control is then returned to input source, FIG. 11.

FIG. 17 illustrates the mag tape output handler and shows the operation of the dual buffer system. When the FSM receives a character from the screen source, it calls the output handler to write the character on an output device. The output handler, FIG. 17, examines the registers of the output flag word to determine which output unit was flagged by the operator as active. If one of the mag units is flagged, mag tape output processing is invoked as shown in FIG. 17. The mag tape output handler stores characters in mag buffers and then transfers them to the tape if there is space available. First the mag tape output handler stores the character in the active buffer of the designated mag unit. Then, if this mag buffer is full, the handler switches to the second mag buffer assigned to the same unit. If the active mag buffer is not full, the mag tape output handler checks to see if it has just switched to a new mag buffer, i.e., if the pointer is at the first position of the active mag buffer. If the pointer is at the first position, the mag tape output handler examines the other buffer of the same unit. If the other mag buffer is not full, or if the active buffer pointer is not in the first character position, the mag tape output handler updates the mag buffer pointers and then exits. If, however, it is in the first position of a mag buffer and the other mag buffer is full, the mag tape output handler commands the cassette subsystem to write the contents of the other mag buffer onto the tape.

After the contents of a mag buffer are written on the tape, a check is made to determine whether the end of tape indicator passed the tape heads during the write operation. If it did, the operator is so notified. If it did not, the routine terminates until called again by the FSM.

4. Examples

The following examples describe typical operations of the various preferred device handlers.

a. Keyboard to Screen

This example illustrates transmission of a character symbol from the keyboard to the screen when the following conditions exist:

1. Keyboard state is active (keyboard mode);
2. Keyboard is source;
3. Cursor is positioned at upper left corner of screen.

When the operator strikes a character key, command processing is interrupted. The keyboard ISR, FIG. 14, transfers the key number to the keystroke buffer. Later, when the FSM, FIG. 6, calls the active source to provide a quad, keyboard source, FIG. 10, removes the key number from the keystroke buffer, maps to an operand quad, and loads the quad into the FSM register. The FSM, FIG. 6, examines the quad, reacts to the class index position byte, locates and calls the procedure SCREEN. The SCREEN procedure examines the shift word, a register which contains operator instructions as to shift status, retrieves the appropriate screen code from the stored operand quad, and gives the screen code to the CRT subsystem for display on the screen.

b. Paper Tape to Screen

This example describes transmission of character information from the paper tape reader to the screen when the following conditions exist:

1. Input state is active (input mode);
2. Input is source;
3. Reader is positioned for next character;
4. Cursor is positioned for the next vacant screen position.

This operation is commenced when the FSM, FIG. 6, calls upon the current source, input source, to provide an operand quad. Input source, FIG. 11, calls the input handler, FIG. 16, to provide a character code. The input handler examines the input flag word and, determining the paper tape reader to be the selected input device, calls upon the paper tape input handler, also FIG. 16, to read a character code from the paper tape. The input handler transfers this code to the input source which maps through the input table to locate an operand quad. The input source then stores the quad in the FSM register. The FSM examines the quad, reacts to the class index position byte and selects the procedure INCHR. INCHR calls the procedure SCREEN. SCREEN examines the shift word, selects the appropriate screen character code and sends it to the CRT subsystem for display.

c. Magnetic Tape to Screen

This example describes transfer of a character code from a magnetic tape to the screen when the following conditions exist:

1. Input state is active (input mode);
2. Input is source;
3. Cursor is positioned correctly;
4. Mag buffer is partially full.

When the FSM, FIG. 6, calls the current active source to provide an operand quad, input source, FIG. 11, calls the input handler, FIG. 16, for a character code. Input handler examines the input flag word and determines that a magnetic tape unit has been specified as the origin of input. The input handler thus calls upon the magnetic tape input handler, also FIG. 16, to retrieve an input code from the appropriate mag buffer and to adjust the buffer pointers. Input source maps the magnetic tape character code, via the input table, to a position in the operand table. Input source then transfers the located quad to the FSM register. The FSM examines the quad, reacts to the class index position byte and selects the procedure INCHR. INCHR calls the procedure SCREEN. SCREEN retrieves the screen character from the FSM register. The screen character, consistent with the shift word, is then sent to the CRT subsystem for display on the screen.

d. Screen to Output Device

This example illustrates transfer of a character displayed on the screen to a peripheral output device when the following conditions exist:

1. Output state is active (output mode);
2. Screen is source;
3. The cursor is positioned over the correct screen code.

When the FSM, FIG. 6, calls upon the active source to produce an operand quad, screen source retrieves the screen character under the cursor. Screen source maps via the input and output tables, from the character code to a position in the operand table, transfers the located quad to a FSM register and advances the cursor one position. The FSM examines the quad, reacts to the class index position byte, and selects the action procedure PUT. PUT retrieves the output code from the FSM register and stores it in the output buffer. The output handler, FIG. 17, determines from the output flag word which device is enabled for output, then calls either the paper tape or magnetic tape output handlers, FIG. 17. The chosen handler retrieves the output code and writes the appropriate peripheral device.

C. CRT Screen Manager

The CRT screen manager includes the routines which cntrol standard editing functions of CRT editing terminals. The CRT manager of the present invention incorporates such features as block management, multicode processing, and a procedure for searching the screen memory to locate operator-selected strings of characters.

1. Scroll Memory

As previously described, the preferred system contains a hardware memory area for the storage of character codes. Because of limited CRT screen capacity, only a portion of this memory area may be displayed at a given time. For ease in locating and manipulating data, the memory is organized as a scroll. The entire memory area contains a "belt" of data which can be scrolled up or down at will. The CRT display is a "window" through which to view a portion of the belt. The display allows the operator to view what is stored in a chosen area of the memory and to observe changes as they are made.

The scroll feature provides a means of exchanging text material between the undisplayed storage area of the scroll memory and the visible storage area. The undisplayed storage area is divided into upper and lower parts. In a "scroll down" operation a line is moved from the bottom of the screen and placed in the bottom part of the undisplayed memory. The remaining lines on the screen are each moved down one line. A new line is then taken from the top part of the undisplayed memory and displayed as the first line on the screen. A "scroll up" operation reverses this procedure.

A word wrap feature may be incorporated to insure that words will not wrap from one line to the next. If a word will not fit at the end of a screen line, the entire word is placed at the beginning of the next line. A word fragment at the end of the bottom screen line is returned to lower memory. The word wrap feature also provides paragraph ending capability. A special screen symbol may be assigned to serve as a line terminator. Text transmission from lower memory stops when this symbol is encountered and any remaining character positions on that line are filled with nulls.

A special refit operation is provided in the preferred system to clean up the screen after editing operations, such as input and delete, have altered the configuration of characters on the screen. Text material is flushed from the screen into lower memory and then scrolled back onto the screen consistent with word wrap and line terminator rules.

2. Multicode Processor

The preferred editing system reduces the number of keystrokes necessary for text preparation and editing by means of multicode keys. When the operator strikes one of these keys, a pre-recorded string of one or more characters is inserted into the text string on the screen. Multicode keys may be preset with character strings or for greater flexibility may be linked to character string memory areas which are loaded by the operator.

In the preferred system two keys are provided for changing the contents of character string memory areas: "load memory" and "end load memory." To load initially or later change the contents of a character string memory area, the load memory key and one of the numbered multicode keys are struck. This causes the screen display to change. The contents of one screen line are temporarily displaced by a line containing the contents of the chosen character string memory area. The operator may now add, change or delete characters on this line. When editing is finished, an end load memory key is depressed, terminating the modification session. The modified string is stored in the character string memory area at the proper location within the memory table and the screen is returned to its previous status.

In the preferred system, memory tables are provided for use by the multicode processor to store the character strings. Characters are most conveniently stored in screen format (ASCII). Strings in the memory tables are separated internally by octal codes.

When a multicode key is struck by the operator, the keyboard source maps this stimuli to a multicode quad in the operand table. The first two bytes of the quad contain a pointer to a character string memory area in the appropriate memory table. The quad is processed by the FSM which calls action procedure MACC to switch the source from keyboard to multicode source. The MACC also provides the multicode source with the string pointer. As previously discussed, the multicode source maps character codes into the operand table one at a time, in response to calls of the FSM. The quads are processed and the characters are displayed on the screen. When the string is exhausted the multicode source provides a quad to the FSM which results in restoration of keyboard source.

3. Block Management

A block management or "move" function is a feature commonly incorporated in editing systems which possess a CRT scroll memory.

The CRT screen manager of the present invention provides such a means of manipulating blocks of text material within the boundaries of the scroll memory. Blocks may be transferred from one point of the text string to another, stored, restored or deleted. In the preferred system, a block is first bounded by special screen characters which appear as octal codes in the text string and as block boundary characters on the screen. The operator sets a block boundary character by moving the cursor to the desired location in the text as it appears on the screen and striking the "block define" key on the system control keyboard. After the beginning and the end of the block are defined, the operator commands the type of action to be taken. In the preferred system the type of action is determined by the location of the cursor at the time the operator strikes the "block transfer" key on the system control keyboard. When the block transfer key is struck, a defined block is "saved" if the cursor is located on one of the block boundary positions, a previously saved block restored to the cursor position if no current block has been defined, and a defined block transferred to the cursor location if the cursor is not located on a block boundary position. The system will also delete a defined block upon appropriate commands from the keyboard.

A typical operation begins by moving the block management text area into bottom memory. This includes the defined block and/or the transfer point. FIG. 21 shows a text string in the bottom memory as it would exist just prior to a typical block transfer operation. The text is the lower memory is divided into four strings by octal codes inserted when the operator struck the block define and block transfer keys. In this example, string 2, the defined block, is shown bounded by a bracket. Strings 3 and 4 are divided by the transfer point. String 1 is a string fragment from the screen and is not a part of the transfer operation.

After the boundaries and transfer point have been set and the block management text area moved to bottom memory, the scroll memory moves text strings from the bottom memory to the screen. In this example, strings 1, 3, 2 and 4 are moved to the screen in that sequence.

4. Code Search

An important feature of the present invention is the code search routine which is a part of the CRT manager. This routine provides the means of searching the screen scroll memory, and input text for a key word or phrase. In the preferred system the operator defines the search argument by striking the "define search" key on the system control keyboard. This causes a line on the screen to be blanked. The operator then loads the search argument in the same fashion multicode keys are loaded. The search define key is struck a second time to fix the search argument and return the screen display to normal configuration. After defining a string of characters as the search argument, the operator may command the type and extent of the search operation by keystroke commands. When found, search action is terminated and the cursor positioned on the first character of the located character string.

According to the logic of the preferred code search procedure, a text block is searched to find any contiguous or non-contiguous string of character codes which matches the search argument. Only after such a string is located is it tested for contiguity. A contiguous string in the text which is found to match the search argument satisfies the search.

Figures 22, 24:
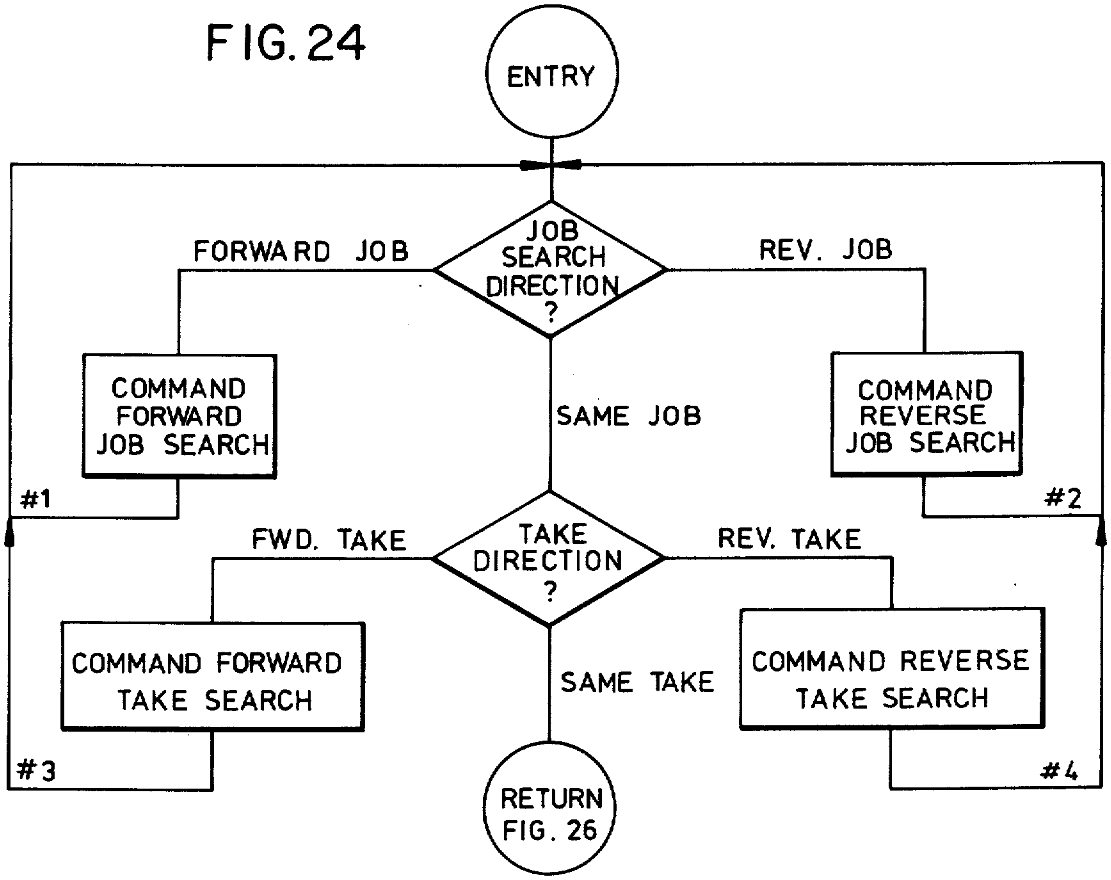

FIG. 22 illustrates successful and unsuccessful code searches. The left hand column of FIG. 22 shows a search argument. String 1 is a typical string of characters to be searched. Position numbers which appear at the left of the text strings in this figure are added for ease of explanation. The search begins by selecting the first character of the search argument, in this case the letter A. The text is searched and the letter A is located at position 2. The letter B from the search argument is then selected, searched for and found at position 5. The search continues until the D is found at position 11. At this point the search is reversed and an attempt is made to match the search argument against the characters in positions 11, 10, 9 and 8. In the example of string 1 the search has failed. String 2 of FIG. 22 shows an example of a successful search. During the forward search the letter A is found at position 2, B at 4, C at 6, and D at 11. The letters A, B and C at positions 8, 9 and 10 were not seen during the forward search. When reverse search was made for contiguity, however, the characters located in positions 11, 10, 9 and 8 were found to match the search argument. Thus, the search of string 2 was successful.

Figure 23:
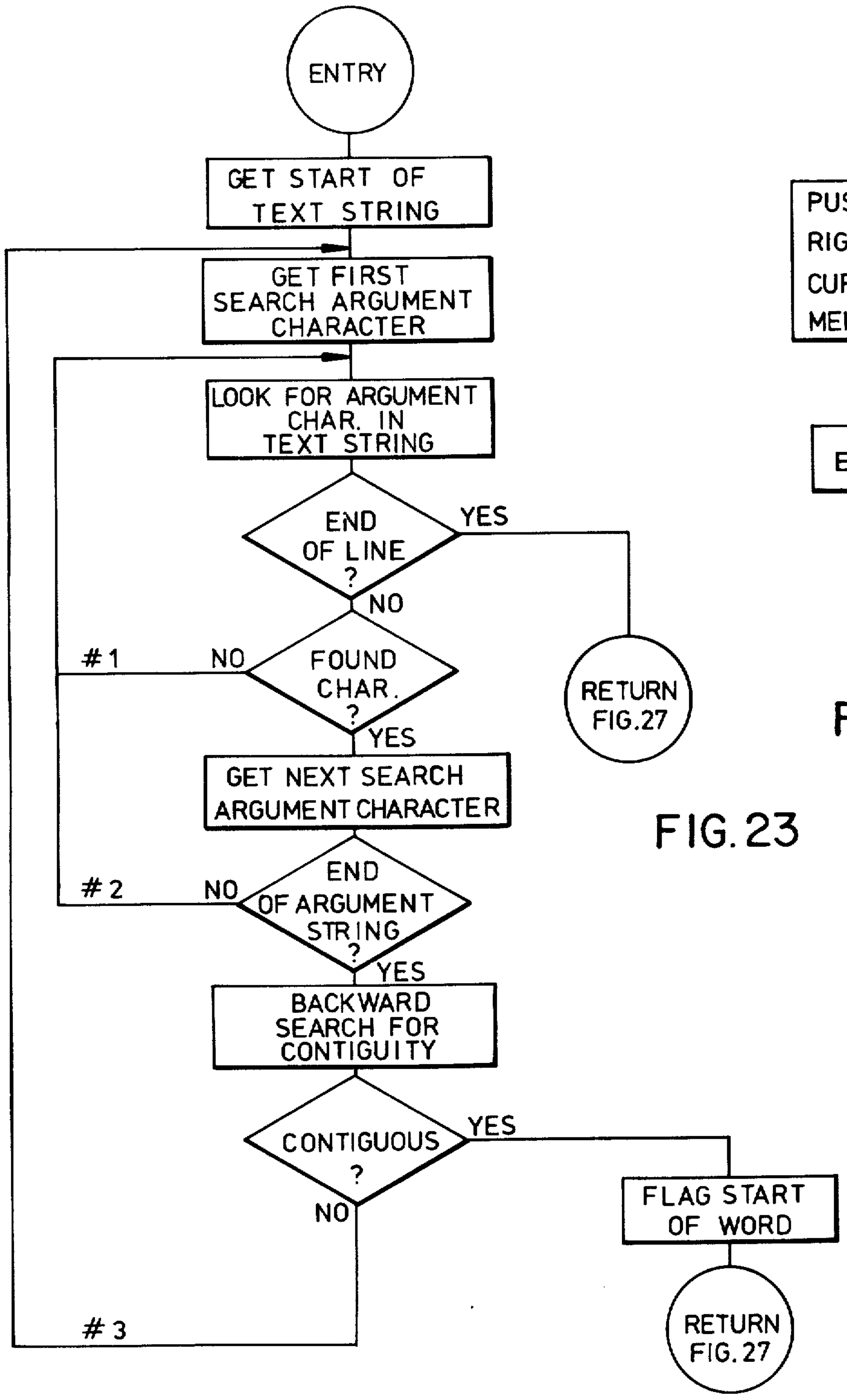

The software logic of the code search operation appears in FIG. 23. At the time this routine is called, the operator has already set the search argument and defined the text string which is the object of the search. The search argument is stored in an area of main memory called the search target buffer. A text string which is the object of the search is located in the visible area of the scroll memory. In the preferred system the actual searching is performed on the "screen" and the search routine operates independently of the manner in which text material is placed on the screen. Thus, if the search argument is not found on the screen, the search can be extended either by scrolling material onto the screen from the bottom memory or by inputting material onto the screen from an input device, and, in particular, from a mag tape device.

When the routine of FIG. 23 is called, it goes to the start of the text string on the CRT screen which is the object of the search. It then retrieves the first search argument character from the search target buffer and proceeds through the text string on the screen comparing each character of the text string with the first character of the search argument. This comparison operation is shown as loop 1 in FIG. 23. If the search continues to the end of the bottom line of the screen without finding a match with the argument character, the routine returns control to a sequencer called the screen executive, FIG. 27. The code search routine remains inactive unless the screen executive scrolls up the screen, calls for new data on the bottom line and recalls the code search routine.

If the first character of the search argument is matched in the displayed text string, the code search routine obtains the next character in the search argument from the search target buffer. If the character obtained is not the terminator code of the search argument, the code search routine returns via loop 2 and continues to compare the new search argument character with characters in the text string. This process continues until finally either the search argument has been entirely matched or the text string has come to an end without a complete match. If the routine detects that it is at the end of the argument string, i.e., all of the argument characters have been matched, a reverse search of the text string is made beginning with the last character matched. If during this reverse search each character of the text string matches the corresponding character of the search argument, contiguity has been established, the cursor is displayed at the start of the phrase on the screen which matches the search argument and the code search routine returns control to the screen executive. If, however, a backward search finds no contiguity, the code search routine returns, via loop 3, to begin the searching process again. The renewed search begins by comparing the first search argument character with the text string character last examined in the previous backward search for contiguity. The forward searches for matching text characters and reverse searches for contiguity will continue until finally either a match is found or the text string is exhausted.

Because of the convenience of the code search routine, as well as the other search routines, the cassette subsystem incorporated into the main system provides an editing terminal with an almost limitless data capacity. While an operator can visually scan the contents of the scroll memory to find a desired search argument, it is a great inconvenience for the operator to search cassette files in this manner. The automated code search routine greatly enhances the efficiency of the CRT editing terminal with magnetic tape units.

In a code search of data from a magnetic tape, input source, FIG. 11, is the active source. Each time the screen executive seeks new data to fill the bottom screen line, it calls on FSM, FIG. 6, which in turn calls upon input source to provide a character. Input source calls mag tape input handler, FIG. 16, which obtains a character from the appropriate mag buffer. FSM continues to call for character quads until the bottom screen line is filled. When the line is filled, the screen executive calls the code search routine, FIG. 23. If, during processing, the mag buffer is emptied, the mag tape input handler sends a "read a PRU" command to the cassette subsystem. The CYCLE routine, FIG. 30, responds to this command by calling the READ WRITE subroutine, FIG. 31. This subroutine causes a PRU to be read into the mag buffer and then calls the STATUS subroutine, FIG. 35, which informs the main system of the type of PRU read.

D. Input/Output Controller

Figure 27:
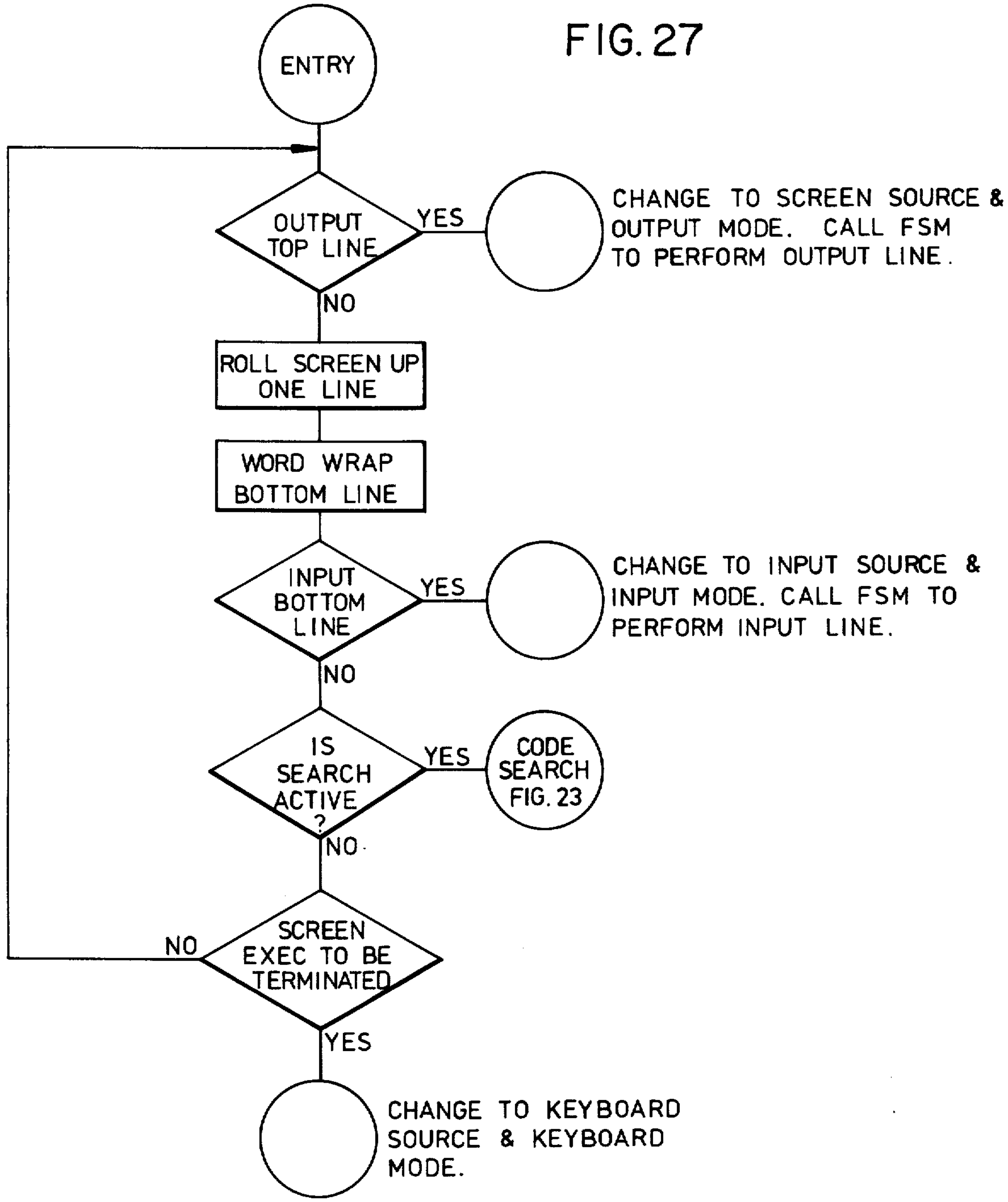

For speed and convenience the preferred editing system is programmed to perform selected sequences of input/output functions on a continuous basis without operator intervention. All throughputting operations are suitably terminated on encountering an end of job from the active cassette designated for input. The input/output controller includes all of the software that directs such throughputting activities. A command language, dislcosed below, is utilized by which the operator programs the controller and designates which input and output units are to be used. A routine called the screen executive, FIG. 27, is provided which, when called by the operator, will perform a series of input/output operations, continuing until an entire throughputting operation is complete or interrupted by a keystroke command from the operator. In addition, file protection features may be incorporated in the input/output controller to protect against the unwanted or unintended destruction of valued magnetic tape files.

Communication between the input/output controller and the various sources is by means of CPU registers, flag setting and software registers which contain codes for the unit number and read or write operations commanded.

As previously mentioned, the preferred editing system can at any time exist in one of three basic modes: keyboard, input, or output. While the operator is programming the input/output controller, the system remains in the keyboard mode. Once, however, the operator relinquishes control to the input/output controller and the screen executive begins processing, the system is switched into the output mode. Thereafter the system exists alternatively in the output and input modes as directed by the screen executive. During input/output processing all of the system keys on the keyboard are disabled except for the attention key of the system control keyboard which may be struck to set a panic flag. The screen executive continuously checks for the panic flag and immediately changes the source to keyboard and the mode to the keyboard mode whenever the panic flag is encountered. So long as the panic flag is not encountered, the screen executive will continue to direct the input and output of data until processing is complete.

1. Input/Output Command Language

In the preferred system I/O sequences are defined by means of command statements entered with special command keys which are located in the system control keyboard. When these keys are struck, the FSM sets command flags in a special memory area. These flags designate which peripheral devices, if any, are enabled for input and output. They also designate whether certain modifying routines are to be performed including: the code search routine, job/take search, clear text routine, and input or output to cursor. One key, called the enable key, is reserved to signal the end of a string of command keystrokes.

In the preferred system, the keyboard size is reduced by programming the command keys for more than one use. The flag which is set by a command keystroke depends on which prior command keys have been struck. Thus the operator must follow an established syntax when forming the command statement. One logical syntax is to group device and modifier commands together with the operation, input or output, which they define. An example of such a command syntax is shown below:

[<"Input", Device> <Modifiers>]
[<"Output", Device> <Modifiers>]
[Enable]

The device flag is set by striking one of the "mag" keys or a "paper" key. The modifiers are optional and can be some combination of the clear text routine, code search routine, job/take search routine, and cursor routines. The enable key closes the statement. In the preferred system all input and output procedures use the screen as either the object of input or the source of output. For this reason it is convenient to design input/output command language such that is either the input or output phrase is missing from the command statement, that the scroll memory buffer is automatically chosen as the appropriate input or output device by default. Thus in the example syntax shown above, the statement: [<"Input", Device> <Modifiers>] [Enable] indicates that input data from the assigned input device are to be stored in the scroll memory.

a. Input Search

If the "search" modifier command is included in an input command statement, text material on the selected input device will be searched during the course of input operations for a defined character string until the search argument is found or the entire text string has been input. This process is described above in conjunction with the CRT screen manager and is illustrated in FIG. 23. A search may "destructive" if material is discarded from the top of the screen until the argument is found or non-destructive if it is merely part of a throughputting operation.

b. Mag Tape Positioning

If the job/take search modifier command is included in the command statement input phrase, the tape will be positioned at the job and take location selected by the operator. When this command is used, the operator must provide additional keystroke information to identify the chosen job/take location.

A command may be provided which will allow the operator to specify a job/take location to be the stopping point of a reading operation. It is also convenient to provide a rewind command to cause the tape to be positioned at the beginning of the file.

FIG. 24 illustrates in flow diagram form the job/take search operation. When the job/take search is included as a part of the input command phrase, the job/take search routine first checks the job number register of the specified mag unit. Depending on the information stored in this register the job/take search routine determines whether the tape is located before, after or at the job specified in the command statement. If the tape is at a position ahead of the job specified, a forward job search is initiated, and continues until the specified job is located on the tape. When the tape reaches the specified job, the routine returns via loop 1 to the entry point. In a similar fashion, if the desired job is located ahead of the current tape position, the job/take search routine commands a reverse job search until it arrives at the location of the requested job. When the tape reaches the specified job, the routine returns via loop 2 to the entry point. Once the tape is positioned within the specified job or if the tape was initially located within the specified job, the job/take search routine examines the number listed in the take number register to determine whether the tape is located before, after or within the specified take. If the requested take is located after present tape position, a forward take search is commenced and continues until the appropriate take is found. When the tape is located at the specified take, the routine returns via loop 3 to the entry point. Likewise, if the specified take is located ahead of the current tape position, a reverse search is initiated and continues until the specified take is located. A reverse take search may be implemented by means of a reverse job search and a forward take search. When the tape is located at the specified take, the routine returns via loop 4 to the entry point. When, eventually, the job/take routine examines the current tape location and finds that it is at the requested job and take positions, the routine has satisfied all the requirments of the job/take search and termi- ...ates. Control is returned to the I/O initialization rou..., FIG. 26, which originally called the job/take search routine. If during any forward or reverse job or take search an error is detected such as a non-existent job or take number, the search routine is abandoned, error bits are set, and the operator notified.

c. Clear Text

This modifier command is used when the scrolll buffer is the source or destination of the file material. In the preferred system the "clear text" modifier command is used on input to command a destructive search or used on output to indicate the screen is to be cleared after output.

d. Cursor

Figure 25:
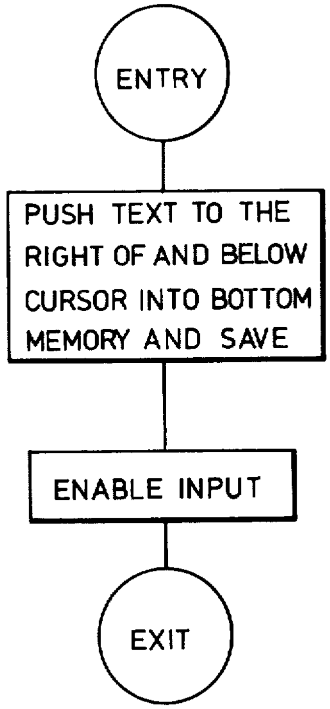

The "cursor" command, used as an input modifier, allows the operator quickly and conveniently to insert data from a peripheral device to any location in the visible text string. Input at cursor processing is illustrated diagrammatically in FIG. 25. To position input filed data, the operator simply locates the cursor at the point where data is to be merged and strikes a "cursor" system control key during the input command define sequence. When input to cursor is commenced, any text material to the right of and below the cursor is rolled into the bottom memory and locked until input is terminated. As input from a peripheral device begins, characters fill the screen starting at the position immediately to the right of the cursor. After input from the peripheral device is complete the scroll mechanism, if instructed by the operator, will refit the information locked in the bottom memory at the end of the newly inserted text string.

The input at cursor command is especially convenient when combined with either the job/take search or code search commands. These modifier combinations allow the operator to position the input magnetic tape and commence the input of character codes to a chosen screen location by a single command statement.

When "cursor" is used as a modifier in an output command phrase, the cursor position indicates the stopping point for the output of data from the screen to a peripheral device.

e. Enable

This command terminates the command statement. A stroke of the enable key initiates processing which verifies the syntax of the command statement, verifies that no file protection rules have been violated, and insures that commanded devices are activated. If all checks prove positive, the screen executive is activated and the sequence of I/O steps is set into motion.

2. Input/Output Control Words

Control and data registers contain the command information and I/O status data. These software registers map the course of I/O processing. The registers are organized into three I/O control words: the "event flag," the "input flag," and the "output flag."

a. Event Flag Word

This group of registers contains data to which the command processor refers in determining what course a given action procedure will take during I/O processing. In the preferred invention the event flag word includes the following registers:

1. Attention bit
2. Error Flag
3. End of line flag
4. End of data flag
5. Output bit
6. Top memory bit
7. Bottom memory bit
8. Input bit
9. Destructive search bit
10. Code search bit Attention Bit. This bit is set by an action procedure or source to indicate that the services of the screen executive are required. When the FSM determines that the attention bit is set, the command processor transfers control to the screen executive. The screen executive directs the sequence of I/O throughput operations. When the screen executive calls the FSM to perform some task, the attention bit is removed. At completion of the task, this bit is reset causing the screen executive to renew its sequencing activities.

Error flag. This flag is set by a source whenever an error is detected during physical input/output.

End of line and end of data flags. These two flags are set during input by an input procedure and on output by screen source. Various I/O routines refer to these flags to determine whether they have reached a stopping point in processing.

The remaining flags of the event flag word are set during command processing in response to operator keystrokes and are subject to modification during "enable" processing.

Output and input bits. These bits are set to indicate that output and/or input procedures have been defined as a part of the command statement. They indicate that the command processor should refer to the input and output flag words for information.

Top memory bit and bottom memory bit. It is frequently useful to retain some data in the scroll memory while the screen is being used for throughputting. Data to be saved is scrolled into either the top or bottom areas in the scroll memory. Next, the appropriate memory bit, top or bottom, is set. The memory bit indicates to I/O routines that data is locked in the designated memory area and that such data is not to be disturbed during processing.

Destructive search bit. This flag indicates that non-matching text characters may be discarded from the top screen line during a code search.

Code search bit. The screen executive consults this bit to determine whether a code search is to be conducted.

b. Input/Output Flag Words

In the preferred system I/O flag words are used for command syntax checking. The individual flags are set by the command processor. When the screen executive calls upon the command processor to perform an input or output operation, the command processor looks to these flags to determine which peripheral device is to supply or receive data and what features of the I/O operation are to be performed. The preferred input flag word contains the following bits:

1. Define bit
2. Device assigned bit
3. Input at cursor bit
4. Code search bit
5. Job/take search bit
6. Destructive search bit
7. Unit number bits The preferred output flag word contains the following bits:

1. Define bit
2. Device assigned bit
3. Output to cursor bit
4. Job/take search bit
5. Destructive output bit
6. End of job bit
7. End of take bit
8. Unit number bits Define bits. This bit is set to indicate whether the input or output phrase of a command statement is currently being defined. The bit is set in either the input flag word or the output flag word but not both.

Device assigned bit. This bit is set when any unit has been set as a part of a command statement.

Input or output cursor bits. These bits are set if input at cursor or output to cursor has been commanded by the operator. The input at cursor routine, described above, appears in FIG. 25.

Code search bit. This bit is set if the code search routine is commanded. This routine, discussed above, is illustrated in FIG. 23.

Job/take search bits. These bits are set if the operator strikes the job/take search key at appropriate times during the command define sequence. The job/take search routine, described above and illustrated in FIG. 24, is used to position a magnetic tape unit defined for input at a specified job/take location. A job/take search of a magnetic tape unit defined for output positions the tape at the end of the last record on the tape.

Destructive search bit. This bit is set in the input flag word if a destructive input search has been commanded.

Destructive output bit. This bit is set if text material is to be discarded from the scroll memory after output.

End of job and end of take bits. These bits are set if output material on a mag tape is to be terminated with either an end of job or end of take code.

Unit number bits. These bits contain code numbers which identify the input and output units defined in the command statement.

3. Input/Output Operation Stages a. Command Formation

As previously described command statements are formed from a series of command terms entered by the keyboard operator. Each command term or keystroke is processed by the command processor as an independent action procedure. Control and coordination are provided by means at state changes and the formation and testing of I/O control words.

During the time of command formation the preferred system exists in one of two special command states. When a state transition to a command state occurs, all the keyboard keys are disabled except those used for command formation. More specifically, the input command state disables all keys except those used for input command formation. Likewise, the output command state disables all keys except those used for output command formation.

Transition into one of the command states is by means of either an "input" or "output" system control key. Transition out of a command state is by means of an "enable" key, which signifies command completion, or by the "input" and "output" keys to signify the abandonment of command formation. Thus, if the system is currently in the input command state a keystroke of the output key would signal the abandonment of input command formation and cause a transition to the output command state.

Command syntax is preferably checked by means of the input and output flag words. Each command term is recorded as one or more bits set in the word. As command formation proceeds these bits are tested for correct syntax. The action to be performed by each command term during throughput processing is recorded in the event flag. These control words are later used for control during input and output sequences.

b. Command Completion and I/O Initialization

At the time command formation is complete, as signaled by a stroke of the enable key, action is taken to prepare the system for throughput. Tape position commands are performed, screen conditioning action either determines current scroll memory availability or flushes the scroll buffers depending upon the operator commands. If input at cursor is commanded, text material below the cursor is rolled into bottom memory. If initialization is completed successfully, system control is transferred from the command processor to the screen executive and I/O processing is set into motion.

Figure 26:
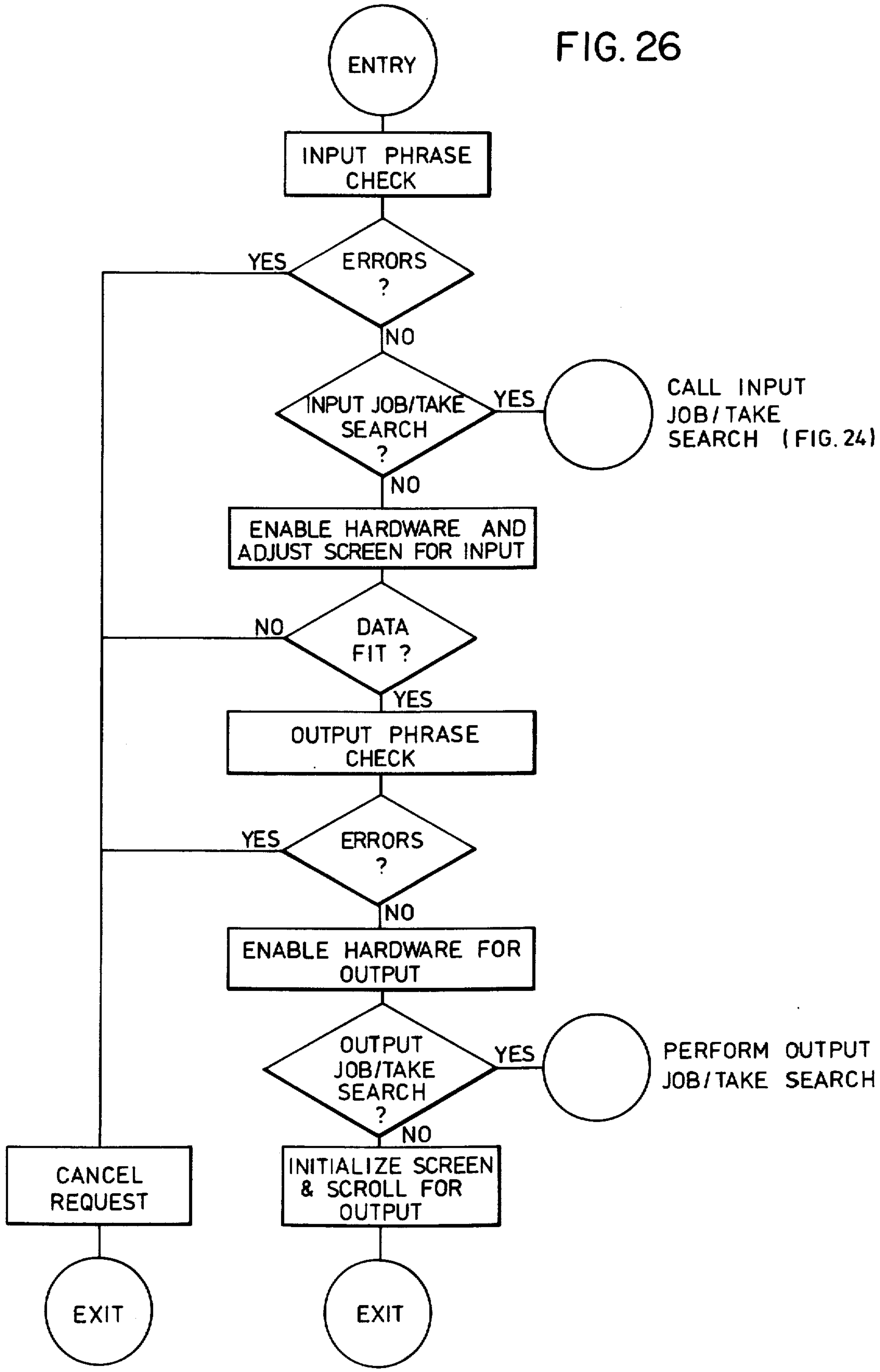

The process of I/O initialization is shown as a flow diagram in FIG. 26. When the enable key is struck the I/O initialization routine first checks the input phrase of the command statement. If a syntax error is discovered, the routine is terminated and the operator notified. Otherwise, if set as a part of the command statement, a job/take search, FIG. 24, is conducted to position the magnetic tape assigned for input. The routine then proceeds to enable the hardware assigned for input and to adjust the conditions of the screen in accordance with the input command phrase. Adjustments of screen may include moving data from the screen into a scroll buffer or flushing the screen and scroll buffers entirely. The scroll memory is then examined to determine whether sufficient memory is available to handle the command input operation. If it is not, the enable request is cancelled and the operator is notified. If there is sufficient data capacity, the routine proceeds to examine the syntax of the output phrase of the command statement. If errors are found, the routine terminates and the operator is notified. If no errors are found, the I/O initialization routine activates the hardware devices specified for output and, if requested, performs an output job/take search. The output job/take search positions the magnetic tape assigned for output at the end of the last tape record. Finally, the screen and scroll memory are initialized according to the data in the output flag word. If at any time during enable processing errors are detected the enable request is cancelled; operations are terminated; the operator is notified; and control is returned to the keyboard. If no errors are detected and initialization is complete, control of the system is passed to screen executive and I/O processing is executed.

c. Execution

The screen executive is a routine which controls the execution of all throughputting operations consistent with the configuration of the even flag word. The executive has full access to system resources including the command processor.

In the preferred system, the screen executive is a sequencer that repeatedly performs one or more of the following actions: output top line, scroll up screen, word wrap bottom line, input material to bottom line, search bottom line.

When the attention bit is set in the event flag word at the end of I/O initialization, the screen executive takes control. For an I/O operation the screen executive changes the source and mode consistent with the bit pattern set in the event flag word. The FSM is given a fixed task to perform and at completion sets the attention bit in the event flag word to wake up the screen executive. The executive functions in this way until some event terminates the throughputting operation.

FIG. 27 illustrates the operation of the screen executive as a flow diagram. When the command statement is complete and the initialization has occurred, the screen executive takes control of the system. First the event flag word is examined to determine whether output to a peripheral device is commanded. If it is, the screen executive changes the mode to "output," establishes screen source, and calls on the FSM to output the top screen line. After the line is output, control is returned again to the screen executive. The executive next causes the contents of the screen to move up one line and examines the first screen line above the bottom line. If a word fragment exists at the end of this line, it is moved by the word wrap feature to the beginning of the bottom line which was blanked by the scroll up. Next the executive checks the event flag word to determine whether there is to be input from a peripheral device to the bottom line of the screen. If there is, the executive changes the source to input source, changes the mode to input and calls upon the FSM to perform input to the bottom line of the screen. After input is complete, control again returns to the screen executive. The screen executive next checks to see whether the code search bit is set in the event flag word. If this flag is set, the screen executive calls the source processor to perform a code search of the bottom line. The code search routine. discussed above, is illustrated in FIG. 23. At the end of the code search routine, the screen executive reassumes control and examines the event flag word and panic flag register to determine whether further screen executive servicing is required. If the attention flag has been removed or if a panic flag has been set, screen executive processing is terminated and the system enters the keyboard state and mode. So long as no interrupt occurs, the screen executive will continuously cycle through the sequence shown in FIG. 27, taking control whenever the attention flag is set in the event flag word.

e. Examples of State Control System

Figure 28:
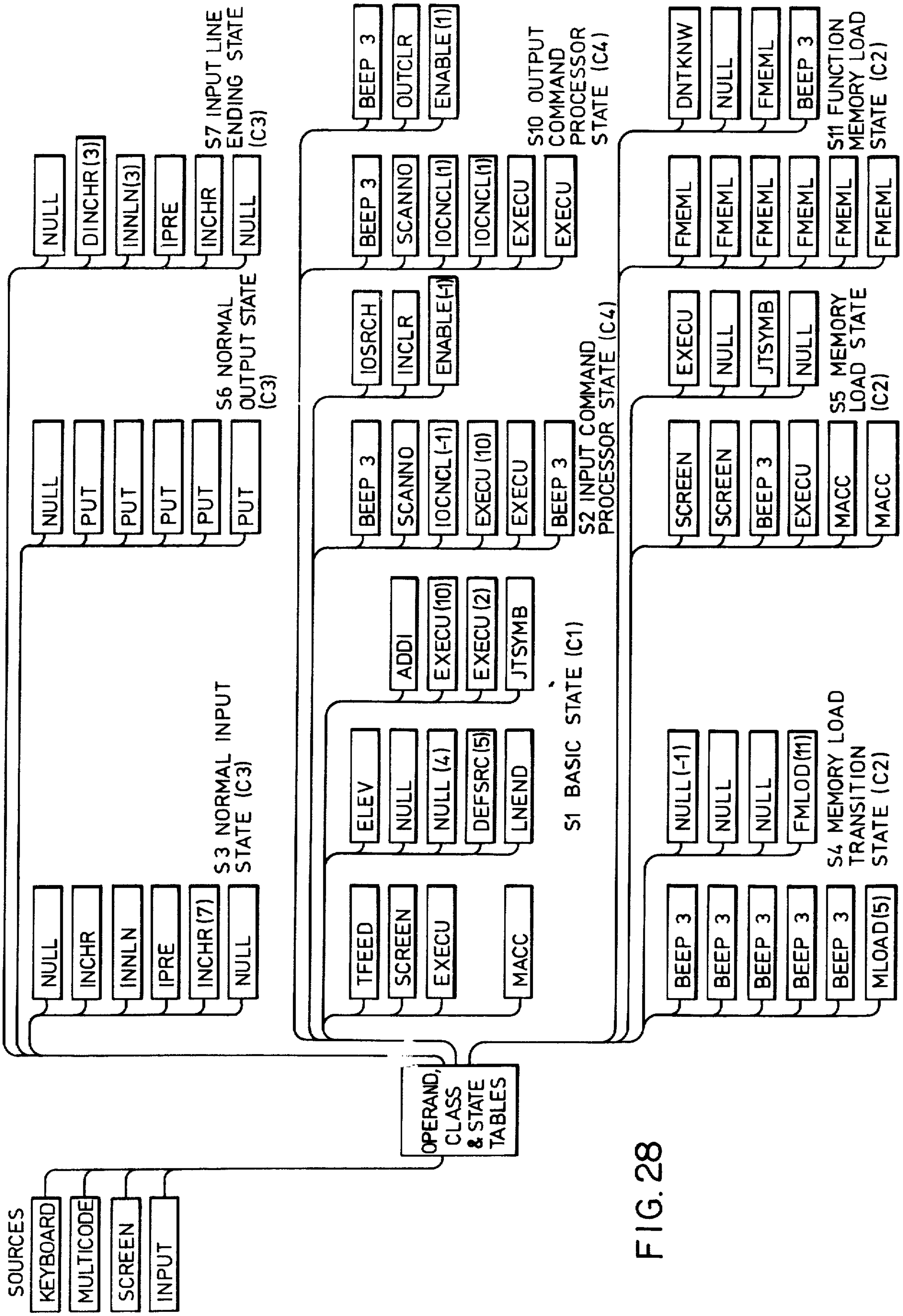
Figure 29A:
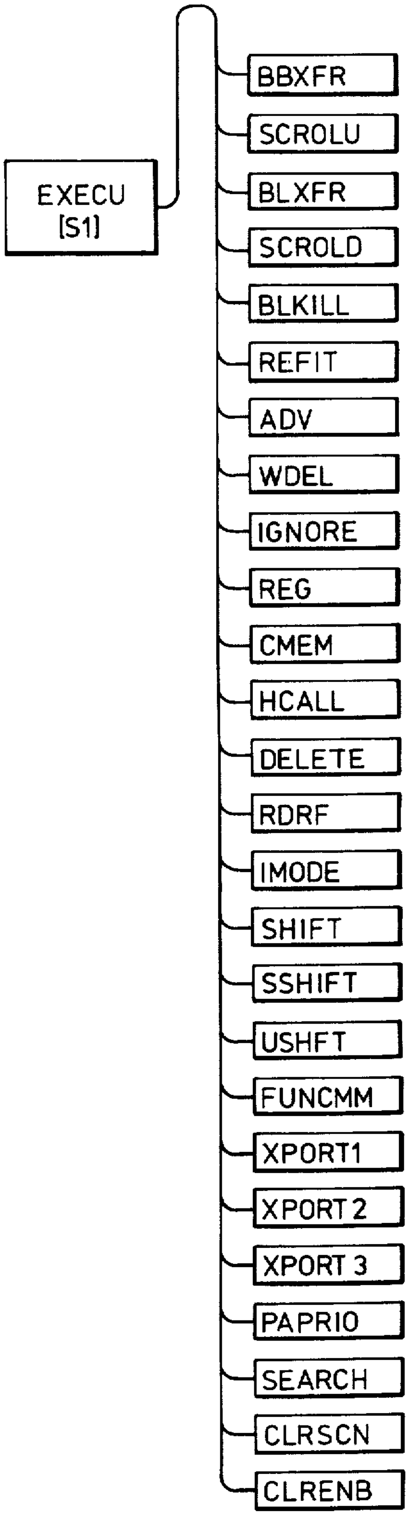
Figure 29B:
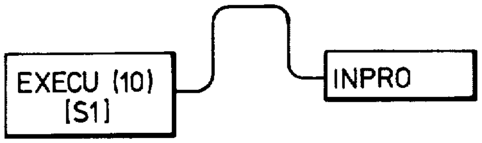
Figure 29C:
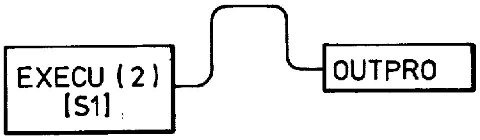
Figure 29D:
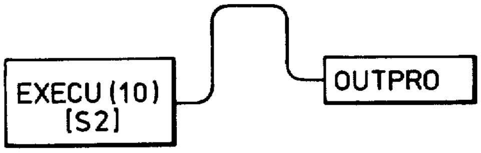
Figure 29E:
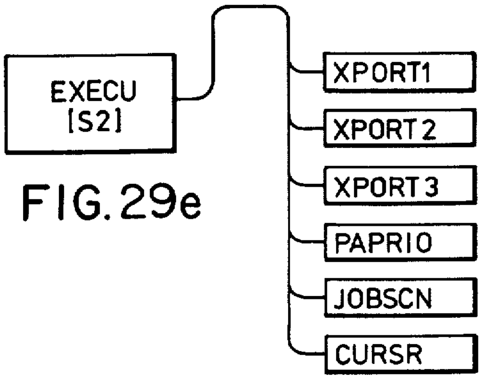
Figure 29F:
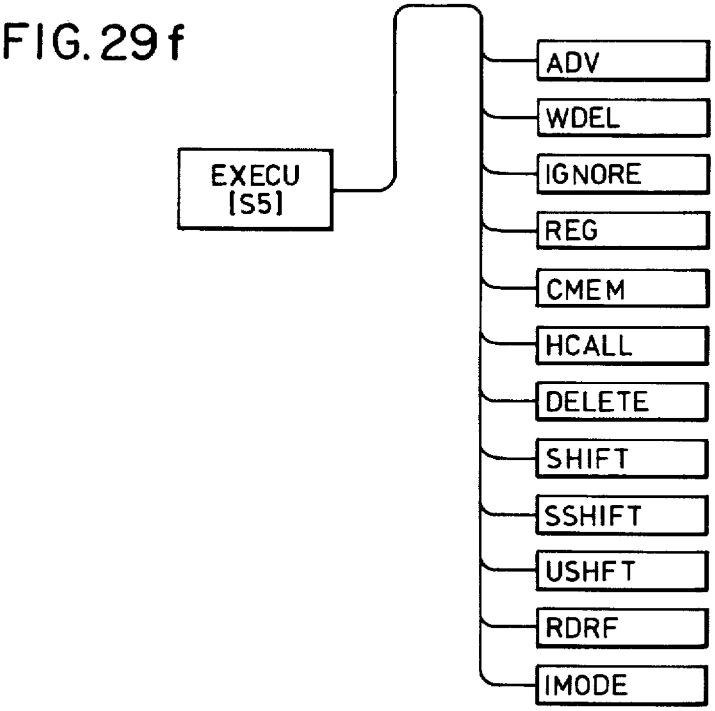
Figure 29G:
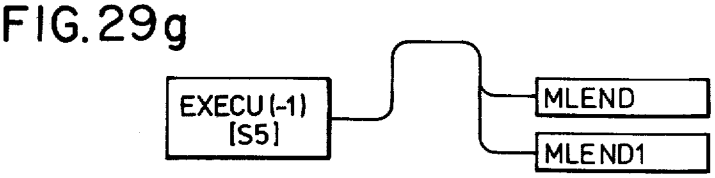
Figure 29H:
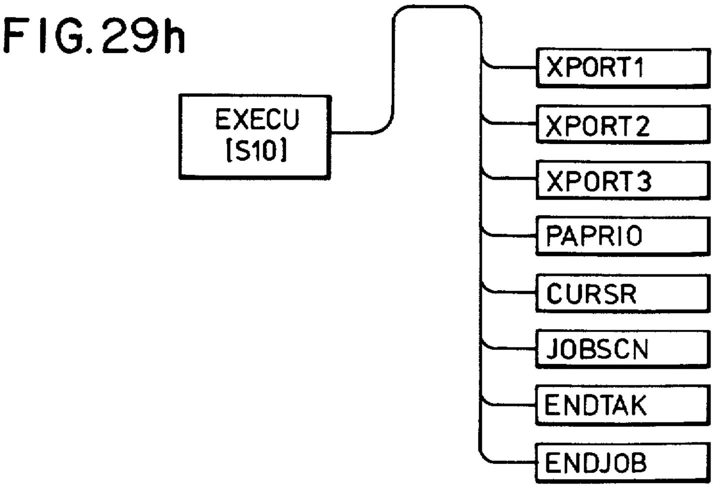

FIG. 28 is a diagram of a complete state control system showing all the state action procedures necessary for the operation of the editing terminal which is the preferred embodiment of the present invention. A row of boxes on the left hand side of FIG. 28 represents the various sources. Detailed diagrams of these sources appear in FIGS. 10–13. The active source consults the operand table to generate an operand quad which the FSM uses to map through the class and state tables to an appropriate state action procedure. In FIG. 28 the rectangular boxes to the right of the operand, state and class tables are entries in the procedure address table. Each box contains the address of a state action procedure. In FIG. 28 state change commands associated with certain state action procedures are shown as numerals in parentheses following the procedure address. If no state change is required, a parenthetical numeral is not shown.

The procedure addresses shown in FIG. 28 are organized in groups of classes, states and modes. In this example, there are nine states. Stimuli are mapped to action procedures within each state according to the class tables. Four classes exist in this system and each state is assigned to one of the class tables for mapping. Immediately following the name of each state grouping in FIG. 28, is a number in parenthesis which symbolizes the class table which maps that particular state. In this example: class 1 maps state 1; class 2 maps states 4, 5 and 11; class 3 maps states 3, 6 and 7; and class 4 maps states 2 and 10. The configuration of procedure addresses is identical for each state mapped by a given class. This is because the class table for a given set of states maps to a certain number of positions and each state within that class must have the same number of procedure addresses as each other state of the same class. For example, the class table for class No. 2 maps to 10 different positions or procedure addresses. For this reason the same procedure addresses may appear several different times within the same state grouping. In state 4 the procedure command BEEP3 appears in the first five boxes of this state grouping. This particular configuration is the result of the class 2 table which maps different operand quads through a variety of class address numbers to the first five positions in state 4. Each of these five positions contains procedure commands to the same state action procedure.

As previously described, preferred programming rules require that this system exist at any given time in only one of three different modes including: the keyboard mode, the input mode and the output mode. Each of the modes consists of one or more of the various states of the system. Each mode has a separate state stack. No state can exist in more than one mode. In the system shown in FIG. 28, the states are divided among the three modes as follows:

| MODE | STATES |
|---|---|
| KERYBOARD | S1, S2, S4, S5, S10, S11 |
| INPUT | S3, S7 |
| OUTPUT | S6 |

According to the rules of this system, state transition can occur only between states within the current mode. When this system is at rest, it is in one of the states of the keyboard mode, usually the basic state (S1). A transition to one of the other modes, the input mode or the output mode, occurs only during the execution of I/O commands. Transition from the basic state (S1) to either of the command states, input command state (S2) or output command state (S10), is accomplished by means of either the "input" or "output" system control key. The command states are active during the formation of the I/O command statement. At the conclusion of successful command statement formation, the "enable" system control key is struck. This triggers system initialization and causes the screen executive to take control. It is the screen executive which directs changes into either the input or output mode.

1. State Action Procedures

States within the input mode include normal input state (S3) and input line ending state (S7). These two states are used by the system whenever data is to be input to the CRT screen from a nonkeyboard peripheral device. The action procedure grouping for these two states appears in FIG. 28 and contains all the action procedures necessary for this type of input. In the present example, the output mode includes only normal output state (S6). All of the action procedures of state (S6) are identical except for one. The primary (S5) procedure is PUT which directs the transfer of data from the CRT screen to a peripheral output device.

The remainder of the states in FIG. 28 are grouped within the keyboard mode. In the basic state (S1) operator keystroke commands are linked to action procedures which control the basic system functions. The three memory states (S4, S5 and S11) are active whenever multicode or function memory processing is in progress.

FIGS. 29a–29h illustrate the way in which certain action keys are linked directly to keystroke action procedures.

Whenever an action key is struck by the operator, keyboard source loads an action quad into the FSM register. The FSM observes the class index position byte of the action quad and maps via a class index table to a position in the appropriate table which contains a procedure command for the state action procedure EXECU. EXECU links to one of the keystroke action procedure groups, FIGS. 29a–29h. In the present example, EXECU appears in states (S1, S2, S5 and S10). One EXECU routine links to each of the different keystroke action procedure groups. The various keystroke action procedures listed in FIGS. 29a–29h are chosen depending upon the information that was set in the original action quads. Several different EXECU routines may exist within the same state. In the present example EXECU routines of state (S1) link to keystroke action procedure groups of FIGS. 29a, 29b and 29c; routines of state (S2) link to the groups of FIGS. 29d and 29e; the routines of state (S5) link to the groups of FIGS. 29f and 29g; and the routine of state (S10) links to the group of FIG. 29h.

The following is an alphabetical list and brief description of the state action procedures shown in FIG. 28:

ADDI. This routine causes the insertion of a diamond character on the screen at the position of the cursor. The diamond symbol signifies the end of a line in the text. After the diamond is placed, the cursor is positioned at the end of the line. The "advance cursor" logic then moves the cursor to the beginning of the next line. "Advance cursor" is further described below in keystroke action procedure ADV.

BEEP 3. Three beeps are emitted from a horn to indicate a variety of conditions, such as illegal entry, memory full, etc.

DEFSRC. This routine causes a line on the CRT screen to be blanked and the cursor position to be saved. In this configuration the screen can receive characters from the keyboard which are to be stored in the code search target buffer. The same class action pair which designates this procedure in the procedure address table also causes transition into the memory load state (S5).

DINCHR. The diamond symbol is placed under the cursor which is then removed one position to the right. If the line end occurs, the attention and end of line bits are set in the event flag word.

DNTKNW. This routine is called when an operand quad is mapped into a state table which is unable to process it. The routine causes a "don't known" flag to be set in a register in the main memory. When the FSM reads the don't know flag, it directs a change to a different state and attempts to process the quad again.

ENABLE. The basic function of this routine is to perform validity checks on and initialization for I/O operations. This routine was discussed above and appears as a flow diagram in FIG. 26.

EXECU. When the command processor triggers this routine, there is a branch to a keyboard action procedure. A variety of subroutines may be called depending upon the action quad which was the original stimulus from the keyboard source. FIGS. 29a–29h are diagrams which illustrate the various keyboard action procedures to which the EXECU routines may link. These are grouped according to the different EXECU routines shown in FIG. 28.

FMEML. Each of the keys on the keyboard has an assigned numerical code which is produced when a keystroke occurs. When FMEML is called, a keystroke numerical code is stored in the first non-occupied position of the function memory load area. If an attempt is made to load beyond the function memory buffer area, a horn beep is emitted.

Unlike the multicode memory, which only contains character codes, the function memory may contain the key number codes of any of the system keys. When the operator strikes the key which recalls the contents of the function memory, the stored string of key numbers is fed into the keystroke buffer just as if they were entered by individual operator keystrokes.

FMLOD. This routine clears the function memory load area by initializing all the positions, except terminators, to a set neutral value.

INCHR. This routine determines the appropriate screen code for an input character based on the system shift status and places the character on the screen at the position of the cursor. The cursor is then advanced one position to the right. If the cursor is located at the end of a line on screen the attention and end of line bits are set in the event flag word.

INCLR. This routine initializes the input clear text function. It signals the operator on the format line of the screen that a code delete is to be performed, adds the destructive search bit to the event flag word and the clear text bit to the input flag word.

INNLN. This routine places an input character on the screen via the INCHR routine. The diamond symbol is then placed at the position of the cursor which is subsequently advanced via the ADV routine. Finally, the attentuation and end of line bits are set in the event flag word to reactivate the screen executive.

IOCNCL. This routine cancels partially completed throughput initialization sequences. A beep is emitted to signal the operator and the event and I/O flag words zeroed. Also, the format line of the screen is cleared.

IOSRCH. This routine initializes the I/O code search function. It adds the search bit to the appropriate I/O flag word and to the event flag word and screens the word "search" on the format line.

IPRE. This routine makes use of the inut table to translate TTS character codes from the active input device into ASCII codes.

JTSYMB. Depending on which key the operator strikes, this routine inserts either the end of take or end of job symbol in the string of characters on the screen.

LNEND. This routine is the same of ELEV.

MACC. When the operator strikes a key to transfer the contents of a certain multicode memory location to the screen, a multicode quad is generated and eventually is placed into the FSM registers by keyboard source. The FSM maps to the MACC routine which establishes multicode as the new source for the FSM. The MACC routine also examines the stored multi-code quad to obtain the code which represents a location within the multicode storage area of the beginning of the multicode string which the operator seeks to call to the screen. The multicode source pointer is then set to this location.

MLOAD. This routine places the screen into the memory load configuration, i.e., a line is cleared, the multicode string chosen for modification is moved from its location in the multicode memory to the blanked screen line, and the current cursor position is saved. The multicode source is established as the new source and temporary pointers are set to show the location of the multicode string in the multicode storage area, so that the string can be returned to the same location after modification is complete.

NULL. This is a do nothing routine. It is used as a space saver in state tables so that every state in a given class will have sufficient class action pairs addressed for class mapping. It may also be used to provide a class action pair which causes a change of state, but no other action.

OUTCLR. This routine initializes the output clear-text function. On the format line of the screen it signals the operator that the screen will be cleared during the output of data. It turns off the top memory bit of the event flag word and adds the destructive output bit to the output flag word.

PUT. This routine retrieves an output TTS character code and passes it to the output handler which writes the appropriate output device. The output handler, discussed above, is diagrammed in FIG. 17. If an error was detected during this process, the error flag is set in the event flag word. If the character received was an EOJ or EOT code and output is to a magnetic tape unit, all the remaining empty positions in the active mag buffer are ignored.

SCANNO. This routine processes the numeric entries that specify the job/take search requirements. The first two entries keyboard are converted to single decimal value by adding the second entry to ten time the first entry. This one byte value, representing the job which is the object of the search, is stored in a register and displayed on the screen. The next two entries are similarly converted and displayed as the number of the take which is the object of the search. If two additional entries are made the message "stop" is displayed on the screen and the job/take search stop values are converted and displayed on the format line. A three beep indication is returned if a non numeric entry is made or if the entry sequence is already complete.

SCREEN. This routine picks up an ASCII character code then screens the symbol as either an insert or an overstrike. If an overstrike, the symbol is placed at the position of the cursor and any previous symbol which exists at that position is destroyed. The cursor then advances to the right one position in the manner of the keystroke action procedure ADV. If an insert, the character is inserted at the cursor. The previously existing characters at and to the right of the cursor are shifted to the right one position.

TFEED. This routine causes twelve tape feed characters to be placed on the screen. When output is to paper tape, these characters in the text string cause a non-perforated space of twelve positions where the operator can conveniently mark or cut the paper tape.

2. Keystroke Action Procedures

Unlike the state action procedures described above, keystroke action procedure addresses are not specified in the state tables but rather in the contents of action quads. When a keystroke produces an action quad, the class and state tables map to a class action pair which specifies an EXECU routine. EXECU links to one or more keystroke action procedures. The specific keystroke action procedure performed depends upon data which appears in the action quad. The following is a list and description of the keystroke action procedures diagrammed in FIGS. **29*a* to 29*h***.

ADV. This routine advances the cursor to the next column position in a line or to the next line if required. If the cursor is at the end of the last screen line, the screen is full, and data exists in bottom memory, a scroll up of one line occurs. If the screen is full and bottom memory is empty but sufficient top memory exists, a scroll-up will occur. If a scroll-up is not allowed, the cursor is placed in the bottom right corner and the horn is beeped once.

BBXFR. This routine attempts to insert the block transfer character. If an attempt is made to add a third marker, or insufficient scroll memory exists, the procedure is terminated with three beeps. Otherwise, the block transfer symbol is inserted at the cursor position.

BLKILL. A block is killed if the enable flag is set by the keystroke action procedure CLRENB and two block transfer characters defining the data block to be killed are set in the text.

BLXFR. This routine is capable of performing three functions: block transfer, block save and block unsave. In the standard block transfer procedure a check is made for the existence of two block transfer characters in the text. If these are not found or if sufficient memory does not exist, the procedure terminates with three beeps. Otherwise, a third transfer character is added to the text to indicate the insertion point of the text block to be transferred. After the transfer has been completed, any residual gaps in the memory are eliminated and a screen reset is performed according to the REFIT keystroke action procedure.

Block save is initiated if the cursor indicates that the third transfer character be inserted at the same position as one of the two already existing markers. In this case, a third marker is not actually added to the text. A block transfer, as described above, is performed except that when complete, the saved block is locked at the bottom of the scroll memory and is unaffected by normal scrolling.

Block unsave is activated if a single transfer character, representing a "transfer-to-here" marker, is inserted and a saved block exists from a previous block save operation. A block transfer is performed causing the saved block to be inserted at the position of the transfer character and the bottom memory is returned to normal configuration.

CLRENB. This procedure sets the "clear flag" in the appropriate software register. This flag is used in conjunction with other procedures such as CLRSCN, BLKILL and XPORT 1, 2, 3.

CLRSCN. If this routine is called and the clear flag is set, the screen is blanked and the scroll memory pointers are initialized. If the clear flag is not set, one beep is emitted.

CMEM. The multicode storage area is divided into a plurality of smaller memories each of which contains an addressable multicode string. When the operator seeks to store a string of characters which is beyond the capacity of a single memory, the string can be loaded into several successive memories. The operator retrieves the character string by signaling the first memory location. The CMEM routine provides linkage to subsequent memories by incrementing a software "call-memory-counter," using the incremented value to calculate the location of the next memory in the multicode storage area, setting the multicode source pointer to the calculated location, and establishing the multicode source as the new source for the FSM.

CURSR. This routine makes a check of both I/O flag words. If either has the cursor bit set, the procedure terminates with the three beep indication. If not, the cursor bit is set in the appropriate flag word, the bottom memory bit is removed from the event flag word and a "cursor" message is displayed on the format line of the screen along with either a left or right arrow indicating input or output, respectively.

DELETE. This routine deletes the character at the cursor position. All characters to the right of the cursor are shifted left one position and a null or blank is added in the last column of the line.

ENDJOB. The output flag word is checked by this routine for the presence of end of job and end of take bits. If either are present, the procedure terminates with a three beep indication. If not, the end of job bit is added to the output flag word and an EOJ message is sent to the format line of the screen.

ENDTAK. This routine is identical to the ENDJOB routine except when no bits are discovered in the output flag word the end of take bit is added to that word and an EOT message is sent to the format line of the screen.

FUNCMM. This routine causes the contents of the function memory buffer to be transferred into the keystroke buffer and updates the keystroke buffer's output pointer.

HCALL. This routine resets the call-memory-counter so that the first call-memory function will access the first memory.

IGNORE. This is a do nothing routine.

IMODE. As previously discussed, characters are added to a text string on the screen either by insertion or by overstriking an existing character. This routine is used to change between the two screen writing methods. If the system is currently in the insert status, the IMODE routine forces the system into write-over status and vice versa. When a change is made, a status flag is updated accordingly.

INPRO. This routine is called during command statement formation when the "input" system control key is struck. The register which contains the take number of the job/take search stopping point is set to zero. The define bit is added to the input flag word. The input, bottom memory, and top memory bits of the event flag word are set and the "input" message of the format line is intensified.

JOBSCN. The input or output flag word, depending upon the context, is tested for the existence of the job/take search bits. If already present, the procedure is terminated with three beeps. If not present, the job/take search bit is added. "Scan job take" is added to the format line along with a symbol to denote either input or output search, respectively.

MLEND. This routine is used at the termination of a memory load procedure. The memory load operation was initiated with the routine MLOAD which caused a line on the screen to be blanked along with other operations. Once the operator has keyed any desired characters onto the blanked line of the screen, she causes these characters to be located in the appropriate memory within the multicode storage area by depressing the "end memory load" key. This keystroke by the operator calls the MLEND routine which in turn causes the "dont't know" flag to be set, as in the DNTKNW routine, and the character string in the memory load screen line to be transferred into the appropriate memory. The cursor is then repositioned and the original contents of the blanked line are restored.

MLEND 1. This routine is the same as MLEND except that the "don't know" flag is not set.

OUTPRO. This routine, called during command statement formation when the "output" system control key is struck, causes the output and top memory bits to be set and the destructive search bit to be removed from the event flag word. If no input is enabled, the bottom memory bit of the event flag word is set. The define bit is removed from the input flag word and the define and enable bits are added to the output flag word.

PAPRIO. This routine is called when the operator strikes either the "paper input" or "paper output" system control keys. The I/O flag words are inspected to determine whether throughout is being defined. If so, a test is made for the existence of the proper hardware, i.e., paper reader or perforator. If nonexistent, the procedure is terminated.

If existent, a number representing the appropriate paper tape device is set in the unit number bits of the relevant I/O flag word and the message "paper" is added to the format line of the screen with an indication for either input or output. If the context is output, additional modifications are made to the flag word according to the procedure OUTPRO.

If throughput is not indicated, steps are taken to effect a "direct" read from paper if reader hardware exists. The define bit is set in the input flag word along with unit number bits which indicate the paper reader. Input, bottom memory, and top memory bits are set in the event flag word. Linkage is then made to state action procedure ENABLE.

RDRF. This routine zeroes paper reader status register located in the main memory. Zeroing the register removes tension from the paper tape and allows the operator to move the tape freely through the paper tape reader.

REFIT. This routine is used to improve the readability of screen text by breaking lines at a space between words or at line ending codes and filling gaps in the text. When REFIT is called, the text is scrolled downward according to the routine SCROLD until the initial screen text is all in bottom memory or the scroll memory is not sufficient to allow further transfer. The original data is then scrolled back onto the screen via the SCROLU routine with its associated line break logic.

REG. This routine causes the cursor to regress to the previous column position in the same line or to the last column of the previous line if required. If the cursor is already at the first column of the top line of the screen, a scroll down of one line is performed if sufficient room exists in the bottom memory. If the scroll down is not allowed, the cursor is placed in the upper left corner and a horn is beeped once.

SCROLD. This routine attempts to scroll one line downward. If no data exists in top memory, no action is taken. If top memory does contain data the screen is rolled downward one line, forcing the bottom line into bottom memory and leaving the top screen line blank. The top screen line is then filled with characters from the last block of characters in the top memory.

SCROLU. This routine is used to scroll one line upward. First bottom memory is checked for data. If none exists the procedure is terminated. If the bottom memory does contain data, the contents of the top screen line are forwarded into the top memory, clearing the top screen line. The remaining lines are rolled upward one line, and the bottom screen line is filled from bottom memory.

SEARCH. In this routine a code search is made from the cursor to the end of the screen for a character by character match between the screen text and the search argument which is stored in the search target buffer of the main memory. If successful, the cursor is positioned at the beginning of the matched text code string and the procedure is terminated.

If unsuccessful, an attempt is made to scroll the screen memory upward one line. If not data exists in bottom memory, the cursor is positioned in the lower right corner and the procedure is terminated. If data does exist in the bottom memory, the scrolling is performed and additional data is searched until the search argument is found or the bottom memory has been totally collapsed.

The mechanism of this routine was discussed above in greater detail. A flow diagram showing the logic of the code search routine appears in FIG. 23.

SHIFT. This routine puts the "shift" code into the shift status register in response to an operator stroke of the "shift" key.

SSHIFT. This routine puts the "supershift" code into the shift status register in response to an operator stroke of the "supershift" key.

USHIFT. This routine puts the "unshift" code into the shift status register in response to an operator stroke of the "unshift" key.

WDEL. This routine deletes the word indicated by the cursor position. If the character at the cursor is a null or a diamond, no action is taken. For any other character the cursor is moved to the left until it is determined that it is at the beginning of the word. All the characters to the right of the cursor within the same word are deleted.

XPORT1. When the operator keys the "mag 1" system control key the XPORT1 routine is called. This causes the I/O flag words to be tested to determine if either an input or output command phrase is being defined. If so, a number representing the first magnetic tape unit is set in the unit number bits of the relevant I/O flag word and the message "mag 1" and the current job and take numbers are sent to the appropriate side, input or output, of the format line.

If I/O is not being defined and the clear flag has been set according to CLRENB, mag unit 1 is rewound and initialized, all event and I/O flag words are cleared and the format line is initialized.

If I/O is not being defined and the clear flag is not set, a test is made to determine if mag unit 1 is defined as an output unit. If so, the procedure is terminated with three beeps. If not, the take value of the job/take search stop is set equal to the current take number to terminate the eventual read operation after one take. The define bit and the unit number of mag unit 1 are added to the input flag word. The input, bottom memory, and top memory bits are set in the event flag word. The input side of the format line is updated. Finally, the procedure links to the state action procedure, ENABLE.

XPORT2. Same as XPORT1 except magnetic tape unit 2 is the unit.

XPORT3. Same as XPORT1 except magnetic tape unit 3 is the unit.

F. Cassette Subsystem Programming

The system programming, thus far described, provides an overview of the software environment of the present invention and illustrates some of the many advantages gained by incorporation of the cassette subsystem into a stand-alone intelligent CRT terminal. Much of the software described, including many of the action procedures, is well known in the programming art. A variety of programs are currently available for intelligent CRT editing terminals. The description of system programming and examples as given above provide a context for understanding the programming of the cassette subsystem and show how the incorporation of the cassette subsystem expands the utility, capacity and flexibility of the terminals.

The following is a discussion of a cassette subsystem logic which shows in greater detail the operation of this feature. As previously mentioned, communication between the CPU and the cassette subsystem is via software status registers located in the interface area of the main memory. The cassette subsystem also contains hardware memory areas for status information and character data. Also included within the subsystem is a read only memory area which contains program information for control of the physical operation of the cassette subsystem. These programs which control physical operation of the cassette subsystem are shown in flow diagram form in FIGS. 30 to 35.

Figure 30:
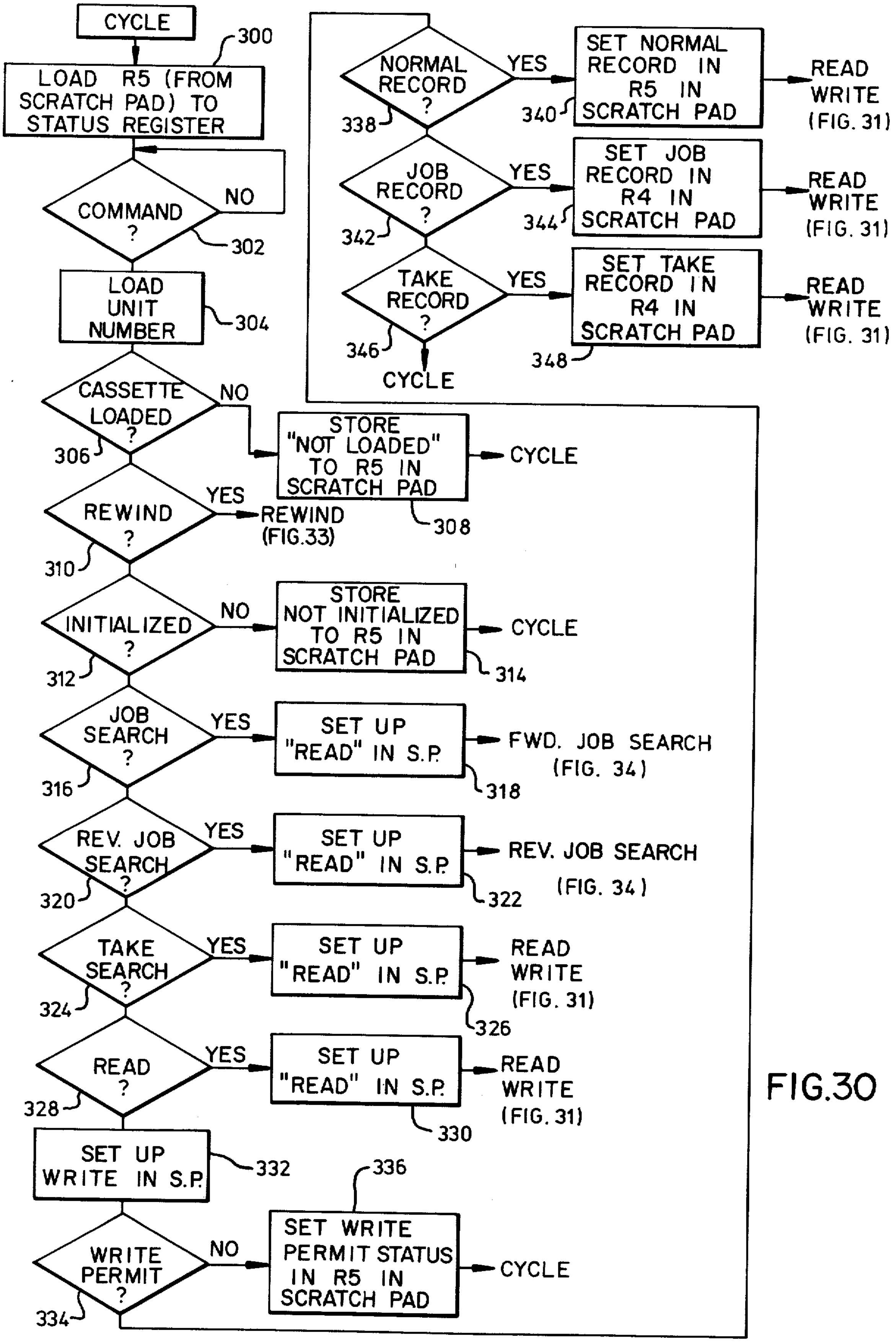

FIG. 30 illustrates the CYCLE program of the cassette subsystem. This program examines the system status as shown in the various status registers, examines commands from the CPU and checks on the cassette system hardware in order to make necessary decisions in determining what cassette subsystem subroutines will be called. The CYCLE program operates independently of the CPU and is in continuous operation whenever the system is functioning.

The cassette subsystem responds to both command information and character code data supplied by the CPU. The CPU in turn responds to status codes posted to the interface registers by the CYCLE routine and character code data provided by the cassette subsystem.

This relationship is more clearly understood by referring to FIG. 30. At the end of every cassette operation, the program counter of the subsystem returns to a beginning of the CYCLE routine. The first operation of this routine, shown in the procedure block 300, is to load the contents of register R5 of the scratch pad memory into the status register. The code in R5 was established at or near the end of the previous cassette operation. It contains information as to type of PRU just processed by the cassette subsystem. The three types of PRU are normal PRU, end of take PRU and end of job PRU. The status register also contains any error messages which need to be transmitted to CPU. Once the operation of the block 300 is performed, the routine moves to the decision block 302. Here the system examines the command status register, a hardware register in the interface containing command information from the CPU. If no command is found in this register the cycle routine continues in a loop examining again and again for a command. If at any time a command is found in the command status register, CYCLE moves to the procedure block 304 where the unit number code is read from the command status register and stored in the unit select register of the cassette subsystem. CYCLE then moves to the decision block 306. At this point the tape transport mechanism is examined to determine whether the magnetic tape has actually been loaded into the chosen drive unit. If it is found that the chosen unit is not loaded, the routine branches to the right to the procedure block 308 where the code which indicates "not loaded" is stored in the R5 register of the scratch pad memory. At this point the program counter returns to the beginning of CYCLE, the R5 code is stored in the status register and the CPU reacts to this information by informing the operator that the commanded magnetic tape unit is not loaded.

If the magnetic tape unit is examined according to the instructions of the block 306 and is found to contain a cassette tape, the routine moves to the decision block 310 and examines the command statement stored in the command status register. This indicates whether or not a rewind of the cassette is to be performed. If a rewind is commanded, the CYCLE routine, branching to the right, calls the REWIND routine which is illustrated in FIG. 33.

If in the decision block 310 it is determined that a rewind was not commanded, the procedure moves onto the decision block 312. In this block the question is asked whether the chosen magnetic tape unit is initialized, i.e., whether a previously commanded tape rewind is complete. If the tape has not been initialized, CYCLE branches to the right and the procedure block 314 causes the "not initialized" code to be stored in the error bits of the R5 register of the scratch pad memory. The program counter returns to the beginning of the CYCLE program which immediately loads the contents of R5 into the status register according to the instructions of the block 300. The CPU reacts to the contents of the error bits in the status register and informs the operator that the tape was not initialized.

If the decision of the block 312 shows that the tape was indeed initialized, CYCLE moves to the decision block 316. In this decision block is the instruction to examine the code in the command status register to determine whether a forward job search has been commanded. Commands for forward and reverse job and take searches are issued originally by the job/take search routine which appears in FIG. 24. If a forward job search was commanded, CYCLE branches to the right and proceeds to the procedure block 318. Instructions of this block are to set up read parameters by transmitting the appropriate code to the scratch pad memory. During processing, cassette subsystem subroutines react to this code stored in the scratch pad memory by causing the system to skip all write steps, turn off the erase head, etc. Once the instructions of the block 318 have been completed, the FORWARD JOB SEARCH cassette subsystem subroutine is called. This appears in FIG. 34.

Figure 34:
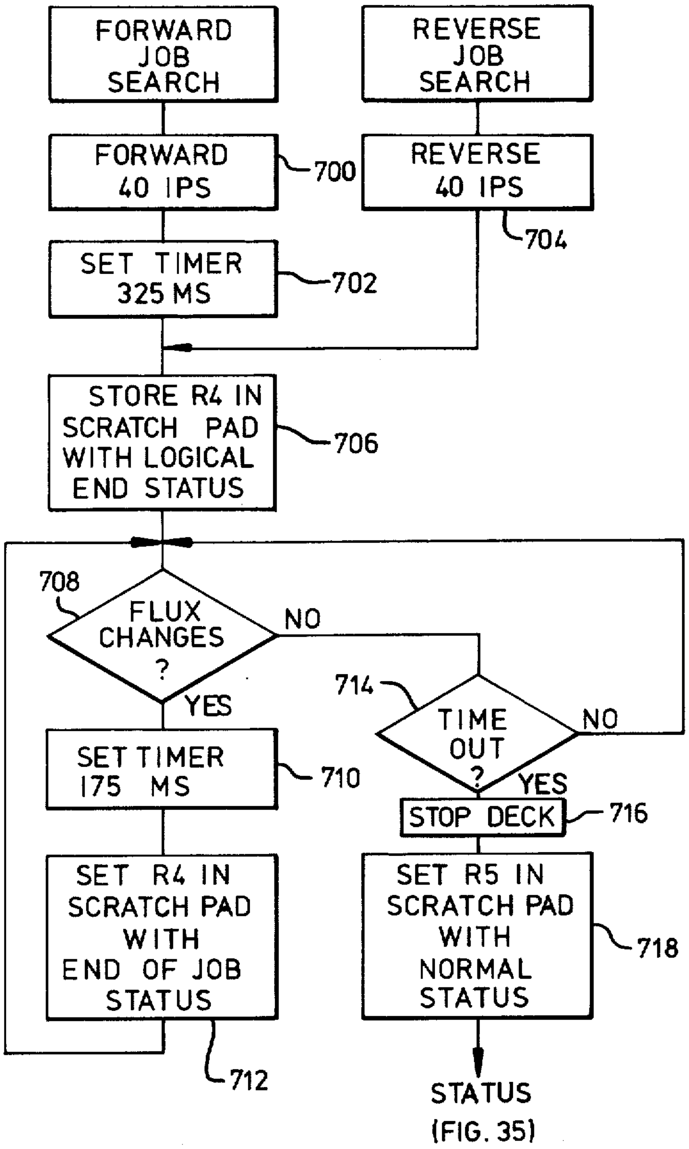

If in the block 316 it is determined that a forward job search was not commanded, CYCLE moves to the decision block 320 where the code in the command register is examined to determine whether a reverse job search has been commanded. If it is found in the block 320 that a reverse job search was commanded, CYCLE branches to the right to the procedure block 322. The procedure of the block 322 is identical to that of the block 318. After the read parameters have been established by the block 322, the REVERSE JOB SEARCH cassette subsystem subroutine, shown in FIG. 34, is called.

If it is determined in the block 320 that no reverse job search was commanded, CYCLE continues to the decision block 324. In this block the code in the command register is examined to determine whether a take search has been commanded. If such a search has been commanded CYCLE branches to the right to the procedure block 326. The contents of this block are identical to the block 318. After the procedure of the block 326 is complete, CYCLE calls READ WRITE which is illustrated in FIG. 31.

If a take search is not requested, CYCLE continues to the decision block 328. This block contains the decision to examine the code in the command status register to determine whether the "read a PRU" code has been set. If such a code is set, CYCLE branches to the right to the procedure block 330 where the read parameters are set up in the same fashion as in the decision block 318. Next READ WRITE, FIG. 31, is called.

If the information in the command register does not indicate that a read operation is to be performed, CYCLE will continue from the decision block 328 to the procedure block 332. Since none of the possible read operations have been commanded above, the procedure of the block 332 will cause the write parameters to be established by sending the appropriate code to R14 of the scratch pad memory. CYCLE will continue to the decision block 334 where the cassette tape is examined to determine whether the cassette is enabled to receive output data. A switch in the cassette drive mechanism is examined to determine whether the plastic tab has been removed from the cassette, signaling that output operations are prohibited. If in the block 334 it is determined that writing is not permitted, CYCLE branches to the right to the procedure block 336. In this procedure block, the read only code is stored in the error bit of the R5 register of the scratch pad memory. Next the program counter re-establishes the beginning of CYCLE. In the procedure block 300 of CYCLE the contents of register R5 of the scratch pad memory are stored into the status register. The CPU reacts to this status information by informing the operator that the chosen magnetic tape unit is enabled for read only.

If the cassette in the chosen magnetic tape unit is enabled for output, i.e., if the plastic tab is in place, CYCLE proceeds to the decision block 338. In this block an examination is made of the command register to determine whether the "write a normal PRU" code exists. Write command codes are set in the command register depending upon the type of PRU to be outputted. This information is obtained and transmitted to the command register by the mag tape output handler, FIG. 17. If the command register indicates that a normal PRU is to be written, CYCLE branches to the right to the procedure block 340. This causes the "write a normal PRU" code to be established in R5 of the scratch pad memory. Next CYCLE proceeds to READ WRITE, FIG. 31.

If, however, in the examination of the block 338 it is found that the write instruction was not for a normal PRU, CYCLE proceeds to the decision block 342. In this block the command register to examined for a "write an end of job PRU" code. If such a code is located, CYCLE branches to the right to the procedure block 344. In the procedure of this block, the "write an end of job PRU" code is transmitted to the R4 register in the scratch pad memory. CYCLE then calls READ WRITE, FIG. 31.

If in the block 342, the "write an end of job PRU" command was not found in the command register, CYCLE moves to the decision block 346. In this decision block a test is made for a "write an end of take PRU" code in the command register. If such code is found, CYCLE branches to the right to the procedure block 348 where the "write an end of take PRU" code is transmitted to R4 of the scratch pad memory. CYCLE then calls READ WRITE, FIG. 31.

If, however, in the decision block 346 a "write an end of take PRU" code was not found in the command register, none of the known commands possibly located in the command register have been found. CYCLE exits by returning the program counter to the beginning of cycle to search again for a command.

Whenever a read or write operation is commanded, the READ WRITE cassette subsystem subroutine, FIG. 31, is called by CYCLE. READ WRITE begins with a number of preliminary steps. In the procedure block 400 a count of 128 is established in the scratch pad memory for comparison with the current byte count of the PRU being processed. Next, in the procedure block 402, the address in main memory to which or from which the CPU desires to read or write is loaded into registers R2 and R3 of the scratch pad memory of the cassette subsystem. In the next procedure block 404 the cassette drive mechanism is instructed to commence advancing the tape at a speed of 10 inches per second. READ WRITE then moves to the procedure block 406 in which the scratch pad memory is examined to determine whether a read or a write command is being processed. If a read command is being processed the interval timer waits for 50 milliseconds and if a write command is being processed the timer waits for 125 milliseconds. This procedure allows for a short gap at the beginning of each magnetic tape. READ WRITE moves to the procedure block 408 which contains the instructions for the cassette subsystem to clear the contents of the read register. READ WRITE then continues to the decision block 410. The logic within this block tests the R14 register in the scratch pad memory to determine whether the read parameters were set by CYCLE.

If the read mode is active, the decision block 410 directs READ WRITE to the decision block 240. In this block the tape is examined for a logical end of data. The internal timer is set for 1.2 seconds and the tape is examined for recorded information. If no bits are found during the 1.2 second interval, READ WRITE branches to the right to the procedure block 422. The procedure of this block sets a logical end of tape code in the status bits of register R5 of the scratch pad memory. READ WRITE continues to the procedure block 424 which commands the tape drive mechanism to stop the deck. READ WRITE next resets the program counter for the start of CYCLE, FIG. 30. The first block 300 of CYCLE causes the contents of R5, the logical end of tape code, to be stored in the status register. The CPU reacts to this status code by informing the operator that the tape is at a logical end.

If within the test of the decision block 420 it is found that the tape is not at a logical end, READ WRITE continues to the decision block 426. In this block a bit counter determines whether an entire 10 bit word has been read. If it has not READ WRITE branches to the left and returns to the head of the decision block 420.

If in the decision block 426 it is determined that an entire word has been read, READ WRITE moves to the procedure block 428. In the block 428 the first byte of a PRU is examined for the end of job and end of take codes. If such a code is detected it is stored in the R4 register of the scratch pad memory. READ WRITE then proceeds to the decision block 430. The decision block 430 tests to determine whether an entire data word has been read into the system. If it has not, the routine branches to the right and continues in a loop as tape continues to move past the read heads. When the test of the block 430 determines an entire data word has been read, READ WRITE proceeds to the decision block 432. In this block the test is made of the scratch pad memory to determine whether the take search code was set in the command register. If it was, READ WRITE branches to the right and skips down to the head of the decision block 438. If a take search is not commanded, READ WRITE goes from the decision block 432 to the procedure block 434. This block contains a procedure to transfer the word which was read into a location in main memory at the address indicated in the scratch pad memory. READ WRITE continues to the procedure block 436 where the main memory address in the scratch pad memory is incremented. After this procedure, READ WRITE moves to the decision block 438. In this block a comparison is made between the number of bytes processed to the number 128 which was stored in the scratch pad memory in the procedure of block 400. The number 128 represents the number of record bytes in a PRU. If it is found in the block 438 that 128 bytes have not yet been processed, READ WRITE branches to the left from the decision block 438 to the head of the decision block 430 so that additional bytes may be processed. If, however, in the test of decision block 438 it is found that an entire PRU (128 bytes) has been processed, READ WRITE calls the cassette subsystem subroutine RETRY, FIG. 32.

Looking back to the decision block 410, if it was determined that the system is not currently in the read mode, i.e., that it is in the write mode, READ WRITE branches to the right to procedure block 440. If the command to the subsystem, stored in R4 of the scratch pad memory by CYCLE, was a "write end of job" or "write end of take" command, the procedure of the block 440 writes the appropriate end of job or end of take code into the write register to set the end of job and end of take byte of the PRU being written on the magnetic tape. READ WRITE then moves to the decision block 442 where a test is made to determine whether the write register has yet been emptied, i.e., whether the coder has yet moved the data contained in the write register serially to the magnetic tape unit designated for output. If the write register is not yet empty the routine branches to the left and continues in a loop to the head of decision block 442. READ WRITE remains in this loop until such time as all the bits have been cleared from the write register. If in the decision block 442 it is determined that the write register is empty, READ WRITE moves to the procedure block 444 where a byte containing a character code is read from the location in main memory designated by the scratch pad memory. This code is stored in the write register. READ WRITE then continues to the procedure block 446. In this block the main memory desires which contains character data to be read is incremented and stored in scratch pad memory registers. READ WRITE then moves on to the decision block 448 which contains a test identical to the one in the decision block 438. Ig 128 character codes have not been processed READ WRITE branches to the left and moves to the head of the decision block 442. READ WRITE continues in the loop which includes the blocks 442–448 until all 128 characters of a PRU have been processed.

When the decision block 448 finally determines that the entire PRU has been processed, READ WRITE moves to the decision block 450. The procedure of this block tests whether the write register is empty. If it is not READ WRITE branches to the left and continues in a loop until the final bit has been moved from the write register to the coder. When finally the test of the decision block 450 determines the write register is empty, the READ WRITE calls RETRY, FIG. 32.

In the RETRY cassette subsystem subroutine, FIG. 32, the first procedure block encountered is the block 500. Here the error status bits of the R5 register are initialized indicating that no errors have been encountered and that the magnetic tape unit is not positioned at the end of the tape. After normal status has been established, RETRY moves to the decision block 502. If the system is in the read mode the procedure of this block tests R4 of the scratch pad memory for an end of job code. If, however, the system is in the write mode, the command register is tested for a write an end of job command code. If the end of job code is not found, RETRY branches to the left and drops down to the decision block 504. In the decision block 504 the question is asked of the scratch pad memory whether a take search code is set. If a take search command code does not exist, RETRY again branches to the left and proceeds to the head of the procedure block 524 which causes the deck to stop and calls the cassette subsystem subroutine STATUS, FIG. 35.

If, however, in the test of the block 504, it is found that the take search code is set, RETRY proceeds to the decision block 506. The decision block 506 tests the R4 register of the scratch pad memory to determine whether a normal PRU, as opposed to an end of take PRU is being processed. It was previously determined in the decision block 502 that an end of job PRU was not being processed. If a normal PRU is being processed, RETRY branches to the right from the decision block 506 and recalls READ WRITE, FIG. 31. If, however, a normal PRU is not being processed, the decision block 506 directs RETRY to the head of the procedure block 524 where the deck is stopped. Finally, the status is posted according to STATUS, FIG. 35, indicating an end of take PRU was just processed.

Returning to the decision block 502, if in examining the R4 register of the scratch pad memory (read mode) or the command register in the interface (write mode) it is determined that an end of job PRU is being processed, RETRY proceeds to the procedure block 508. The procedure of the block 508 is merely to allow a time gap of 900 milliseconds. During this time if the system is in the read mode, 9 inches of tape passes the tape head. If the system is in the write mode a 9-inch gap is erased on the tape. RETRY continues from the procedure block 508 to the decision block 510. In this block, a test is asked of the scratch pad memory to determine whether the system is currently in the write mode. If it is found that the system is not in the write mode, RETRY branches to the right and drops down to the head of the procedure block 524 in which the deck is stopped. Finally, the status is posted according to STATUS, FIG. 35, indicating that an end of job PRU was just read.

If, however, the test of the decision block 510 shows that the system is in the write mode, RETRY proceeds to the head of the procedure block 512. The blocks 512 to 522 of RETRY contain the procedures to establish the end of file (logical end) gap on the magnetic tape which is being written. In the procedure block 512 a random 10 bit byte is stored on the tape at the end of the 9-inch erase gap. This byte merely serves as a position marker. After this tape mark has been inserted, RETRY moves to procedure block 514 where the interval timer is set to measure a 1.4 second interval which allows another 14 inches of tape to pass the tape head. When the timer has timed out, RETRY moves to the procedure block 516 which stops the deck. RETRY next moves to the procedure block 518 which causes the tape drive to initiate movement in a reverse direction at 10 inches per second. As the tape moves in reverse, being erased as it goes, RETRY moves to the decision block 520. The procedure of this block continuously tests for flux changes as the tape passes the read head. A successful test for flux changes indicates that the tape mark set in the procedure block 512 has been encountered on reverse. At the point where the procedure of the block 520 first encounters flux changes, RETRY drops down to the decision block 522 which also tests for flux changes. The procedure of this block continues to test for flux changes until a gap is encountered in the tape. Thus, in the decision block 522, the tape is allowed to move in reverse, erasing as it goes, until the entire 10 bits of the tape mark set in the procedure block 512 have passed the head. Once flux changes are no longer encountered in the test of decision block 522, the tape mark has been erased and RETRY moves to the procedure block 524. In this block the tape deck is caused to stop. Finally, the status register is incremented according to STATUS, FIG. 35, indicating an end of job PRU was just processed.

FIG. 33 is a flow diagram of the REWIND cassette subsystem subroutine. REWIND is used during input-/output initialization. The command code which calls REWIND is originally transmitted to the command register from the software rewind routine, FIG. 19. When the procedure of decision block 310 detects the rewind command code in the command register, CYCLE branches to call REWIND.

The first procedure block of REWIND, the block 600, causes the servo amplifiers and logic to be reset for initiation of rewind, REWIND moves to the procedure block 602 which commands the initiation of reverse tape movement at 40 inches per second. REWIND then moves to the decision block 604 which tests for the end of tape mark, a physical hole near the end of the magentic tape. If the end of tape mark is not found, REWIND branches to the left, returning to the head of the decision block 604. The routine continues in this loop checking for the end of tape mark as the tape moves in reverse. When, eventually, the mark is encountered, REWIND moves from the block 604 to the procedure block 606. In this block the tape is stopped and the deck is reset. Next REWIND moves to the procedure block 608 which commands forward motion of the tape at 10 inches per second. During this slower forward tape movement, the procedure of the decision block 610 searches for the end of tape mark which was passed during the prior reverse motion. The search continues until the test of the block 610 indicates that the end of tape mark is located. At that time REWIND moves to the procedure block 612 which contains instructions for the interval timer to time out a period of 1.4 seconds. At the end of that period, REWIND moves to the procedure block 614 which causes the deck to stop at a point 14 inches beyond the end of tape mark which is at the beginning of the tape. REWIND then moves to the procedure block 616 which causes the message that the tape deck is initialized to be set in the status register. Transmission of this code indicates that the rewind routine has been completed. Finally, REWIND moves to the procedure block 618. In this block the status bits of the R5 register of scratch pad memory are set with the end of job code and REWIND calls CYCLE, FIG. 30.

FIG. 34 is a flow diagram of the FORWARD JOB SEARCH and REVERSE JOB SEARCH cassette subsystem subroutines. These routines are called by CYCLE when the appropriate codes are set in the command register. The routines are essentially identical except for the direction of tape movement during the searching process.

FORWARD JOB SEARCH begins with the procedure block 700 which calls the motion control register to begin forward tape motion at 40 inches per second. FORWARD JOB SEARCH then moves to the procedure block 702. The procedure of this block causes the interval timer to be set for 325 milliseconds. REVERSE JOB SEARCH starts with the procedure block 704. This procedure block contains instructions to initiate reverse tape motion at 40 inches per second. In REVERSE JOB SEARCH no 325 millisecond interval is set in the interval timer because there is no logical end of tape gap to be detected at the beginning of the magnetic tape records.

The remainder of the job search routine, beginning with the procedure block 706, is identical for both forward and reverse job searches. In the procedure block 706 a logical end code is stored in the R4 register of the scratch pad memory. This presumes in advance that a logical end will be the terminus of the search routine unless some event occurs which causes a change in the R4 register. JOB SEARCH next proceeds to the decision block 708. In this block a test is made for flux changes on the tape being read. If such changes do exist, it is not possible that the read head is at the logical end of the tape so JOB SEARCH moves to the procedure block 710 where the interval timer is reset for 175 milliseconds. At this setting, the interval timer can time out during the time it takes an end of job gap to pass the read head. At the 325 millisecond setting the timer could time out only during a logical end gap. After the timer is reset in the procedure block 710, JOB SEARCH moves to the procedure block 712 where the R4 register of the scratch pad memory is set with an end of job code, presuming in advance that an end of job gap will be encountered. JOB SEARCH then returns to the head of the block 708. If flux changes are not detected on the tape, the decision block 708 will cause the JOB SEARCH to proceed to the decision block 714. In this block a test is made to determine whether the timer, which starts at zero every time a flux change is detected, has timed out. If it has not, JOB SEARCH branches to the right and returns to the head of the decision block 708. From the decision block 708 JOB SEARCH will continue in either the loop consisting of blocks 708, 710 and 712 so long as flux changes are detected, or in the loop including blocks 708, and 714 so long as flux changes are not detected. If a sufficient length of blank tape has been processed such that no flux changes were detected in decision block 708 during the course of timing, the "time out" test of the decision block 714 is satisfied. When this occurs, JOB SEARCH moves to the procedure block 716. In this block the tape deck is instructed to stop. JOB SEARCH then moves to the procedure block 718. The procedure of this block is to set the normal status code in the R5 register of the scratch pad memory. JOB SEARCH then calls STATUS, FIG. 35. STATUS posts a system status code for either a logical end or an end of job whenever JOB SEARCH detects tape gaps which correspond to these status conditions. The logical end status is set if no flux changes are ever detected in block 708. The end of job status is posted if any flux changes are detected in that block.

The STATUS cassette subsystem subroutine, FIG. 35, is used to generate a code for CYCLE to place in the status register of the interface. The main CPU examines this register to determine whether a normal PRU, end of take PRU, end of job PRU or logical end of tape was the last situation processed. In the first block of STATUS, the procedure block 800, a test is made of the contents of the R4 register of the scratch pad memory. STATUS then advances to the decision block 802 where the contents of the R4 register are compared to the end of job code to determine whether that is the code set in R4. If it is, STATUS branches to the left and drops down to the head of the procedure block 810. This block causes the contents of the R5 register of the scratch pad memory to be incremented once. The subsequent procedure block 812 causes it to be incremented a second time.

Returning to the decision block 802 if the comparison determines that the code in R4 was not an end of job code, STATUS moves to the decision block 804 where the code is compared with an end of take code to determine whether that is the value stored in R4. If R4 contains an end of take status code, STATUS branches to the right and drops down to the head of the procedure block 812. This block causes a single incrementation of the contents of the R5 register of the scratch pad memory.

Returning to the decision block 804, if upon comparison it is found that the R4 register does not contain an end of take status code, STATUS continues to the decision block 806. In this block a test is made to determine whether the R4 register contains a logical end code. If a logical end code is found, STATUS proceeds to the blocks 808, 810 and 812 where the contents of the R5 register are incremented three times.

If a logical end code does not exist in R4, STATUS branches to the left from the decision block 806 and drops down to the base of procedure block 812. No incrementations are performed. When it is found that none of the comparisons made in the blocks 802, 804 and 806 resulted in a match, it is presumed that the PRU just processed was a normal PRU. The unincremented value of the R5 register is the normal PRU code.

At the end of this routine, CYCLE, FIG. 30, is recalled. The first procedure block of CYCLE, the block 300, causes the newly established status code in R5 of the scratch pad memory to be loaded into the status register on the interface. The CPU of the main system uses this information to increment software registers in main memory which maintain the job and take locations for the various cassette tapes.

The cassette subsystem logic illustrated in the flow diagrams of FIGS. 30 to 35 is consistent with the main system programming previously described. It is, however, only one embodiment of cassette subsystem logic. A reasonably skilled programmer could implement this sequence or a variety of equivalent logic sequences which would permit the practice of the present invention.

While we have shown and described a preferred embodiment of our invention, it will be apparent to those skilled in the art that many changes and modifications may be made without departure from our invention in its broader aspects. We therefore intend the appended claims to cover all such changes and modifications as fall within the true spirit and scope of our invention.

We claim:

1. A typesetting terminal system comprising:

first, second and third tape means receiving and adapted to impart motion to first, second and third recording tapes respectively, said tapes being capable of bearing digitally recorded information, a data processor coupled to said first, second and third tape means, said data processor including memory means for storing information, display means coupled to said memory means for displaying information in said memory means, means for coupling information from a first of said tape means as recorded on a first of said tapes into said memory means for viewing of at least part of the information from the first of said tapes on said display means, means for locating selected information on a second of said tapes, including means for operating the tape means receiving the second of said tapes to impart motion thereto and for positioning the said second of said tapes in response to location of the selected information, means for coupling located information from the said second of said tapes into said memory means for simultaneous viewing in combination with information present on said display means from said first of said tapes, manually operable means for adjusting information in said memory means with said data processor for attaining a desired presentation on said display means including the combination of information from the first and second tapes at an operator controlled cursor location in information from the first tape for said simultaneous viewing, and means for outputting combined information from said memory means to a third of said tape means for recording on a third of said tapes.

2. The typesetting terminal system according to claim 1 wherein information stored on the second of said tapes is stored in operator controllable length groupings having a predetermined gap therebetween, said means for locating selected information including timing means for testing intervals between data when the second of said tapes is moving, and means for indexing the grouping according to the number of gaps detected.

3. The typesetting terminal system according to claim 1 wherein the information on the second of said tapes is stored by operator controllable length groupings wherein the grouping position is identified by a recorded symbol, said means for locating selected information including means for detecting the recorded symbol, and means for indexing the grouping according to the number of symbols detected.

4. The system according to claim 3 wherein said manually operable means includes keyboard means for entering information into a selected tape via said memory means, including entering a said recorded symbol to identify a stored grouping.

5. The typesetting terminal system according to claim 1 wherein said means for locating selected information on the second of said tapes locates such information by content including comparison of a search argument with information read from the second of said tapes.

6. The typesetting terminal system according to claim 5 wherein said means for locating selected information provides the comparison between the search argument and the information read from the second of said tapes one character at a time without regard to contiguity between characters until the search argument is consecutively discovered, said system having means for reverse reading information from said second of said tapes upon such discovery for comparing contiguous characters recorded on the said second of said tapes to indicate identity of comparison.

7. The typesetting terminal system according to claim 1 wherein the information on the second of said tapes is organized in variable length groupings and subgroupings individually selectable by said means for locating selected information.

8. A typesetting terminal system comprising:

a keyboard for entering alphanumeric characters into said system, a display means including a cathode ray tube and character generator means coupled to said cathode ray tube for displaying alphanumeric characters on said cathode ray tube as selected by said keyboard, said display means further including a cursor register for storing coordinates of a cursor indication, said cathode ray tube being responsive thereto for displaying a cursor relative to said alphanumeric characters, joy stick control means operable to enter information into said cursor register for controlling the coordinates stored therein, a plurality of tape transport input devices receiving tapes each comprising plural variable length multiple line records adapted for entrance into said system in combination with characters entered thereinto from said keyboard and from another of said tape transport input devices, an output storage device, a data processor connected to said keyboard, display means and input and output devices, said data processor including memory means for receiving and storing input information from said keyboard and input devices for accessing by said display means and display of input information by said display means, means for entering into said system an input identifying a record contained in a selected one of said tapes, means for causing transport of said tape for search of said record, means for recognizing said record and for interrupting transport of said tape when said record is recognized, means for entering at least a portion of said record into said memory means for access and display by said display means together with information theretofore stored by said memory means as inputted from another of said tape transport input devices and already displayed by said display means for combination with the information theretofore stored and displayed at a location identified by said cursor on said display means to provide a combined output stream, and means for coupling the combined output stream information from said memory means into said output storage device adapting said output device to provide the input to a typesetter apparatus.

9. The typesetting terminal system according to claim 8 wherein each of the tapes received by said input devices comprises a magnetic tape having said plural records magnetically recorded thereon, said system further including a punched paper tape reader input device, and wherein said output storage device comprises a paper tape punch recording an output paper tape.

10. The typesetting terminal system according to claim 8 including a tape transport subsystem for operating said plurality of tape transport input devices, said subsystem including a second data processor provided with a control memory containing a plurality of subroutines for operating said tape transport input devices, including control of the movement thereof, coupling of information thereto and therefrom, and location of information therein including the transport of said tape for search of said record, said second data processor being responsive to control by said terminal system for comparing commands from said terminal system with commands also located in said subsystem control memory for jumping to selected subroutine located in said control memory.

11. The typesetting terminal system according to claim 10 wherein said second data processor includes a data bus for addressing said control memory, a bus enable means for coupling the output of the control memory to said data bus for re-addressing the control memory to an address comprising a previous control memory word.

12. The typesetting terminal system according to claim 10 wherein said subsystem is provided with further memory means for storing commands and status information.

13. The system according to claim 8 including means for entering records into said tapes including symbols for identifying said records, wherein said input identifying a record comprises said symbol.

14. The system according to claim 8 including means for causing said cathode ray tube to provide a display portion on the screen thereof for reporting the operational status of said system.

15. A typesetting terminal system comprising:

a keyboard for entering alphanumeric characters into said system, a display means including a cathode ray tube and character generator means coupled to said cathode ray tube for displaying alphanumeric characters on said cathode ray tube as selected by said keyboard, said display means further including cursor generator means and a manual control therefor, said cathode ray tube being responsive to said manual control for displaying a cursor relative to said alphanumeric characters, a plurality of tape transport input devices receiving tapes each comprising plural variable length records adapted for entrance into said system in combination with characters entered therinto from another tape and said keyboard, an output storage device, a data processor connected to said keyboard, display means and input and output devices, said data processor including memory means for receiving and storing input information from said keyboard and input devices for display by said display means, means for inputting information from a first of said tapes as contained in a first tape transport input device into said memory means for viewing by said display means, means for entering into said system an input identifying a record contained in the second of said tapes as contained in a second of said tape transport input devices, means for serially searching the second of said tapes for recognizing the record thus identified, means for inputting information as recognized on the second of said tapes into said memory means for combination with information theretofore stored in said memory means from the first of said tapes and displayed on said display means at the location in said information selected by the cursor positioned in the displayed information from the first of said tapes on said display means, and means for coupling the thus combined stream of information from said memory means into said output storage device adapting said output device to provide the input to a typesetter apparatus.

16. A typesetting terminal system comprising:

a keyboard for entering alphanumeric characters into said system, a cathode ray tube display means including character generator means for displaying alphanumeric characters as selected by said keyboard, a plurality of memory input devices including serially recorded records including variable length records adapted for entrance into said system in combination with characters entered thereinto from another memory input device and said keyboard for display on said display means, a data processor connected to said keyboard, display means and input devices, said data processor including memory means for receiving and storing input information from said keyboard and input devices for display by said display means, operator controlled means for identifying on the face of said display means a location in said stored input information as displayed by said display means, means for entering into said system an input identifying a said variable length record contained in one of said memory input devices and for causing serial reading of said one of said memory input devices for search of a variable length record thus identified for entry of said variable length record into said memory means under the control of said data processor and combination at said identified location with information theretofore stored in said memory means as derived from another memory input device and as displayed by said display means, and means for coupling the thus combined stream of information from said memory means to provide an input to a typesetter apparatus.

* * * * *